United States Patent
Sakakibara

(10) Patent No.: US 11,770,638 B2
(45) Date of Patent: Sep. 26, 2023

(54) SOLID-STATE ELECTRONIC CIRCUIT, IMAGE PICKUP ELEMENT, METHOD OF CONTROLLING IMAGE PICKUP ELEMENT, AND ELECTRONIC DEVICE

(71) Applicant: Sony Semiconductor Solutions Corporation, Kanagawa (JP)

(72) Inventor: Masaki Sakakibara, Kanagawa (JP)

(73) Assignee: Sony Semiconductor Solutions Corporation, Kawagawa (JP)

( * ) Notice: Subject to any disclaimer, the term of this patent is extended or adjusted under 35 U.S.C. 154(b) by 45 days.

(21) Appl. No.: 16/973,501

(22) PCT Filed: Jul. 5, 2019

(86) PCT No.: PCT/JP2019/026766
§ 371 (c)(1),
(2) Date: Dec. 9, 2020

(87) PCT Pub. No.: WO2020/017353
PCT Pub. Date: Jan. 23, 2020

(65) Prior Publication Data
US 2021/0243399 A1   Aug. 5, 2021

(30) Foreign Application Priority Data

Jul. 18, 2018   (JP) ................. 2018-135160

(51) Int. Cl.
*H04N 25/77*   (2023.01)
*H04N 17/00*   (2006.01)
(Continued)

(52) U.S. Cl.
CPC ........... *H04N 25/77* (2023.01); *H04N 17/002* (2013.01); *H04N 25/767* (2023.01); *H04N 25/75* (2023.01)

(58) Field of Classification Search
CPC .. H04N 5/3745; H04N 5/3742; H04N 17/002; H04N 5/378; H04N 5/37455;
(Continued)

(56) References Cited

U.S. PATENT DOCUMENTS

2005/0286863 A1* 12/2005 Howarth ................ G11B 27/28
386/232
2016/0156865 A1* 6/2016 Hayashi ............... H04N 5/3698
348/302
(Continued)

FOREIGN PATENT DOCUMENTS

| JP | 2008-44120 A | 2/2008 |
| WO | 2016/136448 A1 | 9/2016 |
| WO | 2018/037902 A1 | 3/2018 |

OTHER PUBLICATIONS

International Search Report, International Application No. PCT/JP2019/026766, dated Sep. 5, 2019.
(Continued)

*Primary Examiner* — Michael E Teitelbaum
(74) *Attorney, Agent, or Firm* — Michael Best & Friedrich LLP

(57) ABSTRACT

The present disclosure relates to a solid-state electronic circuit, an image pickup element, a method of controlling the image pickup element, and an electronic device that enable inhibition of a deterioration in yield due to densification of image pickup elements.

Wiring replacement units are provided between a plurality of transfer paths allowing bitwise transfer of a predetermined bit length of time code for use in conversion of a pixel signal corresponding to a quantity of light received in a pixel into a digital signal. In a case where an error has occurred in any of the plurality of transfer paths, replacement with the
(Continued)

transfer path lowest in priority is performed. The present disclosure can be applied to image pickup elements.

11 Claims, 29 Drawing Sheets

(51) Int. Cl.
    *H04N 25/767*     (2023.01)
    *H04N 25/75*     (2023.01)

(58) Field of Classification Search
    CPC ...... H04N 25/77; H04N 25/767; H04N 25/75; H04N 25/772
    See application file for complete search history.

(56) References Cited

U.S. PATENT DOCUMENTS

| | | |
|---|---|---|
| 2018/0013412 A1 | 1/2018 | Kikuchi et al. |
| 2019/0208151 A1 | 7/2019 | Taura |

OTHER PUBLICATIONS

Notification of Transmittal of the International Search Report and the Written Opinion of the International Searching Authority, or the Declaration (PCT/ISA/220), International Application No. PCT/JP2019/026766, dated Sep. 24, 2019.

\* cited by examiner

SOLID-STATE ELECTRONIC CIRCUIT, IMAGE PICKUP ELEMENT, METHOD OF CONTROLLING IMAGE PICKUP ELEMENT, AND ELECTRONIC DEVICE

TECHNICAL FIELD

The present disclosure relates to a solid-state electronic circuit, an image pickup element, a method of controlling the image pickup element, and an electronic device. The present disclosure relates particularly to a solid-state electronic circuit, an image pickup element, a method of controlling the image pickup element, and an electronic device that enable an improvement in yield.

BACKGROUND ART

As a mode advantageous in area efficiency in a case where analog digital (AD) conversion is performed in a limited area, such as in a pixel, in the signal readout mode of an image pickup element, there is a proposed integrating (slope) AD conversion mode with a comparator and a digital circuit at the post stage to the comparator.

As technology for achievement of AD conversion in a limited area with the integrating AD conversion mode, for example, there is a widely known circuit configuration in which one dynamic random access memory (DRAM) circuit is provided as the digital circuit at the post stage, and a slope signal is input to the comparator a plurality of times.

For example, for 8-bit AD conversion, the same slope signal is repeatedly input to the comparator eight times. Then, an operation of storing, in the DRAM circuit, a code of 0 or 1 at the point in time when the output of the comparator is inverted and a readout operation to a memory in a CHIP provided outside a pixel area are repeated eight times. At the point in time of completion of comparison over the entire face, a readout is made outward from the memory in the CHIP.

However, a configuration in which an AD converter is disposed independently per pixel is limitative in circuit-housing area, differently from a configuration having a relatively high flexibility in area, such as a column-parallel configuration in which an AD converter is disposed per pixel column. Thus, it is difficult to produce AD converters meeting the requirements sufficiently.

For example, the rate of determination in comparison is likely to deteriorate or an increase is likely to occur in power consumption for enhancement of performance.

Thus, there is a proposed technology of inhibiting a deterioration in the rate of determination or an increase in power consumption (refer to Patent Document 1).

CITATION LIST

Patent Document

Patent Document 1: International Publication No. 2016/136448

SUMMARY OF THE INVENTION

Problems to be Solved by the Invention

However, in a case where provided is a system having such a circuit configuration, the circuit-layout density rises rapidly along with an increase in the number of pixels, resulting in an increase in the probability of occurrence of circuit failure causing, for example, code failure.

Furthermore, in a case where failure has occurred in pixel data particularly in a solid-state image pickup device, even if the failure is a 1-bit failure, the occurrence of the failure disables the function of the chip, resulting in a deterioration in yield. Thus, it is necessary to reduce the probability of occurrence of failure.

The present disclosure has been made in consideration of such a situation. According to the present disclosure, in particular, even when failure is detected, a circuit having the failure is replaced with a circuit for a bit relatively low in priority and then the influence of the failure is inhibited, so that an improvement can be made in yield.

Solutions to Problems

According to a first aspect of the present disclosure, provided is a solid-state electronic circuit including: a plurality of transfer paths allowing bitwise transfer of a predetermined bit length of digital code after a signal is converted into a digital signal; a determination unit configured to determine presence or absence of abnormality in each of the transfer paths; and a replacement unit configured to replace the plurality of transfer paths for use in transfer of the predetermined bit length of digital code, on the basis of a determination result of the determination unit.

According to a second aspect of the present disclosure, provided are an image pickup element, an image pickup device, and an electronic device each including: a plurality of transfer paths allowing bitwise transfer of a predetermined bit length of time code for use in conversion of a pixel signal corresponding to a quantity of light received in a pixel into a digital signal; a determination unit configured to determine presence or absence of abnormality in each of the transfer paths; and a replacement unit configured to replace the plurality of transfer paths for use in transfer of the predetermined bit length of time code, on the basis of a determination result of the determination unit.

According to the second aspect of the present disclosure, provided is a method of controlling an image pickup device including a plurality of transfer paths allowing bitwise transfer of a predetermined bit length of time code for use in conversion of a pixel signal corresponding to a quantity of light received in a pixel into a digital signal, the method including: determining presence or absence of abnormality in each of the transfer paths; and replacing the plurality of transfer paths for use in transfer of the predetermined bit length of time code, on the basis of a determination result.

According to the first aspect of the present disclosure, after conversion of a signal into a digital signal, bitwise transfer of a predetermined bit length of digital code is performed through a plurality of transfer paths. Determined is the presence or absence of abnormality in each of the transfer paths. On the basis of a determination result, replaced is the plurality of transfer paths for use in transfer of the predetermined bit length of digital code.

According to the second aspect of the present disclosure, bitwise transfer of a predetermined bit length of time code for use in conversion of a pixel signal corresponding to a quantity of light received in a pixel into a digital signal, is performed through a plurality of transfer paths. A determination unit determines the presence or absence of abnormality in each of the transfer paths. A switching unit replaces the plurality of transfer paths for use in transfer of the predetermined bit length of time code, on the basis of a determination result of the determination unit.

Effects of the Invention

According to one aspect of the present disclosure, failure is inhibited from occurring, so that an improvement can be made in yield.

MODE FOR CARRYING OUT THE INVENTION

A preferred embodiment of the present disclosure will be described in detail below with reference to the accompanying drawings. Note that, in the present specification and the drawings, constituent elements having substantially the same functional configurations are denoted with the same reference signs, and thus the duplicate descriptions thereof will be omitted.

Furthermore, the descriptions will be given in the following order.

1. Exemplary Schematic Configuration of Solid-State Image Pickup Device
2. Exemplary Detailed Configuration of Pixel
3. Multiple-Substrate Configuration 1
4. Multiple-Substrate Configuration 2
5. Sectional Structure of Pixel
6. Exemplary Circuit Configuration of Pixel
7. Exemplary Circuit Configuration of Time-Code Input/Output Unit
8. Detailed Configuration for Controlling Time-Code Transfer Units
9. Exemplary Detailed Configurations of Wiring Replacement Units
10. Exemplary Specific Operation of Wiring Replacement Units (Part 1)
11. Exemplary Specific Operation of Wiring Replacement Units (Part 2)
12. Exemplary Configurations of Determination Circuit and ERR-Information Storage Latch
13. Failure Detection/Relief Processing (Part 1)
14. Failure Detection/Relief Processing (Part 2)
15. Output of Transfer Path from which Abnormality is Detected
16. Exemplary Application to Electronic Device
17. Exemplary Usage of Solid-State Image Pickup Device
18. Exemplary Application to Endoscopic Surgery System
19. Exemplary Application to Movable Object <1. Exemplary Schematic Configuration of Solid-State Image Pickup Device>

Figure 1:
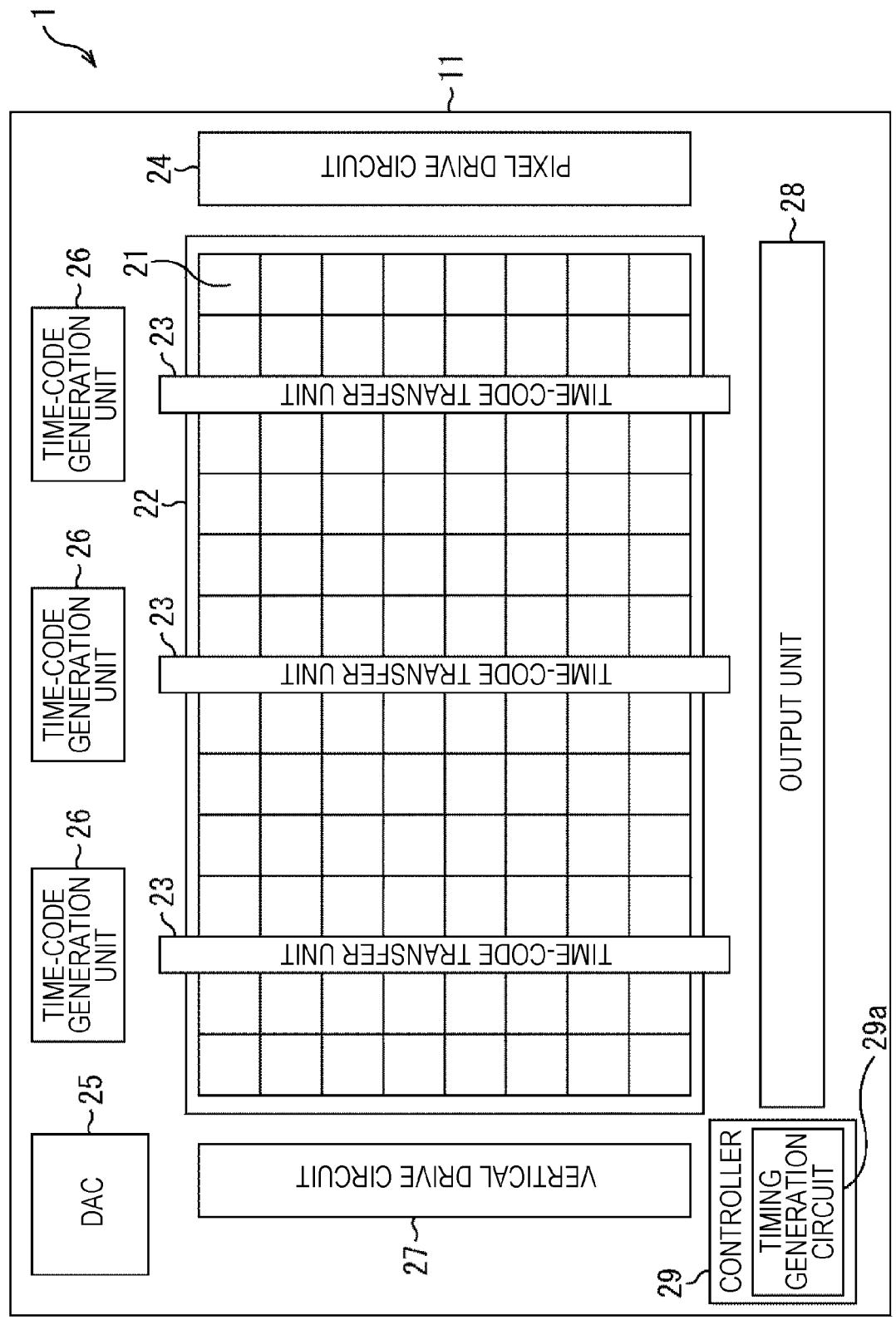
FIG. 1 is a diagram of a schematic configuration of a solid-state image pickup device according to the present disclosure.

FIG. 1 illustrates a schematic configuration of a solid-state image pickup device according to the present disclosure.

A solid-state image pickup device 1 of FIG. 1 includes a semiconductor substrate 11 containing, for example, silicon (Si) as a semiconductor and a pixel array unit 22 including pixels 21 arrayed in a two-dimensional array on the semiconductor substrate 11. The pixel array unit 22 includes time-code transfer units 23 that each transfer a time code generated by a time-code generation unit 26 to each pixel 21. Then, on the periphery of the pixel array unit 22 on the semiconductor substrate 11, a pixel drive circuit 24, a digital analog converter (DAC) 25, time-code generation units 26, a vertical drive circuit 27, an output unit 28, and a controller 29 are formed.

Each of the pixels 21 arrayed in the two-dimensional array includes a pixel circuit 41 and an ADC 42, as described later with reference to FIG. 2. The pixels 21 each generate an electric charge signal corresponding to the quantity of light received by a light-receiving element (e.g., a photodiode) in the pixel and then converts the electric charge signal into a digital pixel signal SIG for output.

The pixel drive circuit 24 drives the pixel circuit 41 (FIG. 2) in each pixel 21. The DAC 25 generates a reference signal (reference voltage signal) REF that is a slope signal that monotonously decreases in level (voltage) in response to the elapse of time, and supplies the reference signal REF to each pixel 21. The time-code generation units 26 each generate a time code for use in conversion of an analog pixel signal SIG into a digital signal in each pixel 21 (AD conversion) and supply the time code to the corresponding time-code transfer unit 23. Because the number of time-code generation units 26 provided to the pixel array unit 22 is two or more, the time-code transfer units 23 provided in the pixel array unit 22 correspond in number to the time-code generation units 26. That is the time-code generation units 26 and the time-code transfer units 23 that transfer the time codes generated by the time-code generation units 26 are in one-to-one correspondence.

On the basis of a timing signal supplied from a timing generation circuit 29a, the vertical drive circuit 27 performs control such that the output unit 28 outputs the digital pixel signal SIG generated in each pixel 21 in a predetermined order. The digital pixel signal SIG output from each pixel 21 is output outward from the solid-state image pickup device 1 through the output unit 28. The output unit 28 performs, as necessary, predetermined digital signal processing, such as black-level correction processing of correcting black level or correlated double sampling (CDS) processing, and then performs output outward.

The controller 29 includes the timing generation circuit 29a including, for example, a timing generator that generates various types of timing signals, and causes the generated various types of timing signals to be supplied to, for example, the pixel drive circuit 24, the DAC 25, and the vertical drive circuit 27.

Furthermore, the controller 29 controls the operations of repeater circuits 401 (FIG. 12) that each control the drive of the corresponding time-code transfer unit 23.

The solid-state image pickup device 1 is provided as above. Note that, as described above, FIG. 1 illustrates all the circuits included in the solid-state image pickup device 1 on one semiconductor substrate 11. However, as described later with reference to FIGS. 3 and 4, the circuits included in the solid-state image pickup device 1 are dividedly disposed on a plurality of semiconductor substrates 11.

<2. Exemplary Detailed Configuration of Pixel>

Next, an exemplary detailed configuration of a pixel 21, the corresponding time-code transfer unit 23, and the periphery thereof will be described with reference to the block diagram of FIG. 2.

The pixel 21 includes a pixel circuit 41 and an analog digital converter (ADC) 42.

The pixel circuit 41 outputs, as an analog pixel signal SIG, an electric charge signal corresponding to the quantity of light received, to the ADC 42. The ADC 42 converts the analog pixel signal SIG supplied from the pixel circuit 41, into a digital signal.

More specifically, the pixel circuit 41 includes a photoelectric conversion unit 91, a transfer unit 92, and a charge-to-voltage conversion unit 93.

The photoelectric conversion unit 91 includes, for example, a light-receiving element that photoelectrically converts received light into electric charge and accumulates the electric charge (e.g., a PD 152 of FIG. 6 to be described later), and is connected to the charge-to-voltage conversion unit 93 through the transfer unit 92.

The transfer unit 92 includes a transfer transistor that transfers the electric charge accumulated by photoelectric conversion in the photoelectric conversion unit 91 to the charge-to-voltage conversion unit 93 with predetermined timing (e.g., a transfer transistor 153 of FIG. 6 to be described later).

The charge-to-voltage conversion unit 93 includes a floating diffusion region and an amplification transistor that convert the electric charge accumulated in the photoelectric conversion unit 91 into voltage for input to a comparator 61 of a comparison unit 51 (e.g., an FD portion 154 and an amplification transistor 155 of FIG. 6 to be described later).

In the pixel 21 provided as above, the comparison unit 51 enables reduction of noise in an output signal with band limitation.

In the pixel 21 provided as above, the electric charge generated by photoelectric conversion in the photoelectric conversion unit 91 is converted into voltage by the charge-to-voltage conversion unit 93 in the pixel circuit 41, and then the voltage is input to the − input terminal of the comparator 61 included in the comparison unit 51. Then, the reference signal REF output from the DAC 25 is input to the + input terminal of the comparator 61 in the comparison unit 51.

The ADC 42 includes the comparison unit 51 and a data storage unit 52.

The comparison unit 51 compares the reference signal REF supplied from the DAC 25 and the pixel signal SIG and outputs an output signal VCO as a comparative-result signal indicating a comparative result. The comparison unit 51 inverts the output signal VCO when the reference signal REF and the pixel signal SIG become equal (in voltage).

The comparison unit 51 includes the comparator 61 and a positive feedback (PFB) circuit (response-speed enhancement unit) 62.

The comparator 61 receives the analog pixel signal SIG output from the pixel circuit 41 and the reference signal REF output from the DAC 25, respectively, through its − input terminal and + input terminal. Then, the comparator 61 compares the analog pixel signal SIG and the reference signal REF, and outputs a predetermined current or voltage as an output signal in a case where the analog pixel signal SIG is higher than the reference signal REF.

The positive feedback circuit (response-speed enhancement unit) 62 is, for example, a positive feedback circuit that feeds back part of its output for addition to its input. Therefore, the positive feedback circuit 62 enables a quick response to the output signal output from the comparator 61.

The data storage unit 52 receives the output signal VCO from the comparison unit 51. In addition, the data storage unit 52 is supplied with a WR signal indicating the write operation of the pixel signal, an RD signal indicating the readout operation of the pixel signal, and a WORD signal for controlling the readout timing of the pixel 21 during the readout operation of the pixel signal, not illustrated, from a selection unit 121 controlled by the vertical drive circuit 27 from the vertical drive circuit 27. Furthermore, through the time-code transfer unit 23, the data storage unit 52 is supplied with the time code generated by the time-code generation unit 26.

The data storage unit 52 includes: an input/output control unit 71 that controls the write operation and readout operation of the time code on the basis of the WR signal and the RD signal supplied from the selection unit 121; and a signal storage unit 72 that stores the time code.

In the write operation of the time code, with the output signal VCO remaining input at Hi (High) from the comparison unit 51 to the input/output control unit 71, the input/output control unit 71 continues writing the time code updated per unit of time, supplied from the time-code transfer unit 23, into the signal storage unit 72. Then, when the output signal VCO being supplied from the comparison unit 51 is inverted to Lo (Low) due to the reference signal REF and the pixel signal SIG equal (in voltage), the input/output control unit 71 stops writing (updating) the time code being supplied and then causes the signal storage unit 72 to retain the time code most recently stored in the signal storage unit 72. The time code stored in the signal storage unit 72 indicates the time when the pixel signal SIG and the reference signal REF became equal, and indicates data indicating that the pixel signal SIG was at the reference voltage at the time, namely, the digitized value of quantity of light. Note that, in the practical operation, as described later, performed is an operation of acquiring the difference between the reset level that is the reference signal and the value of quantity of light including the value of quantity of light and the reset level.

After a sweep of the reference signal REF is completed and the time code is stored in the signal storage unit 72 in each pixel 21 in the pixel array unit 22, the operation of the pixel 21 changes from the write operation to the readout operation.

In the readout operation of the time code, at the readout timing of the pixel 21 based on the WORD signal for controlling the readout timing, supplied from the selection unit 121, the input/output control unit 71 outputs the time code (digital pixel signal SIG) stored in the signal storage unit 72 to the time-code transfer unit 23. The time-code transfer unit 23 transfers the supplied time code in order in the column direction (vertical direction) to supply the output unit 28 with the time code.

The time-code transfer unit 23 includes a transfer path for each bit included in the time code, and the signal storage unit 72 includes a latch per bit. Moreover, the transfer path for each bit included the time-code transfer unit 23 and the latch for each bit included in the signal storage unit 72 are in pairs. Then, in a case where an error occurs in at least any of the transfer paths and latches for the bits, namely, in a case where failure has occurred, the failed latch and transfer path are replaced with the latch for the least significant bit and the corresponding transfer path in the time-code transfer unit 23 for use.

More specifically, the time-code transfer unit 23 includes wiring replacement units 101 and 103 and a time-code input/output unit 102.

The time-code input/output unit 102 is supplied with a digital time code from the time-code generation unit 26, and the signal output from the signal storage unit 72 to the time-code input/output unit 102 is output through a signal processing unit 111 and an output control unit 112 that correspond to the output unit 28.

Furthermore, the photoelectric conversion unit 91, the charge-to-voltage conversion unit 93, and the comparator 61 can be initialized (reset) by the pixel drive circuit (initialization unit) 24.

In a case where an error occurs in at least any of the transfer paths and latches for the bits, namely, in a case where failure has occurred, the wiring replacement units 101 and 103 replace the failed latch and transfer path with the latch for the least significant bit and the corresponding transfer path in the time-code transfer unit 23.

<3. Multiple-Substrate Configuration 1>

The solid-state image pickup device 1 has the circuits separated on a plurality of semiconductor substrates 11. For example, the solid-state image pickup device 1 may have such a configuration as illustrated in FIG. 3.

Figure 3:
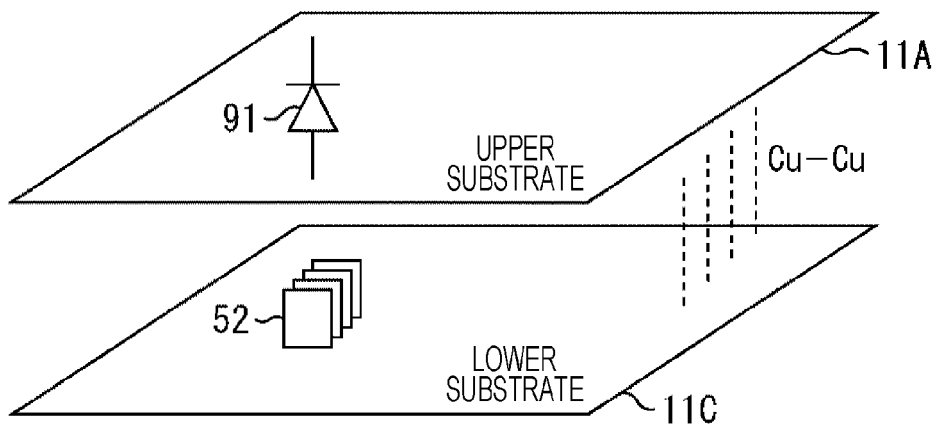
FIG. 3 is a conceptual diagram of two semiconductor substrates layered for the solid-state image pickup device.

FIG. 3 is a conceptual diagram of two semiconductor substrates 11 of an upper substrate 11A and a lower substrate 11C layered for the solid-state image pickup device 1.

At least the pixel circuits 41 including the respective photoelectric conversion units 91 are formed on the upper substrate 11A. At least the data storage units 52 that each store a time code and the time-code transfer units 23 are formed on the lower substrate 11C. For example, the upper substrate 11A and the lower substrate 11C are joined by metallic bonding, such as Cu—Cu.

<4. Multiple-Substrate Configuration 2>

FIG. 3 exemplifies two semiconductor substrates 11 included in the solid-state image pickup device 1. However, the solid-state image pickup device 1 can have three semiconductor substrates 11.

Figure 4:
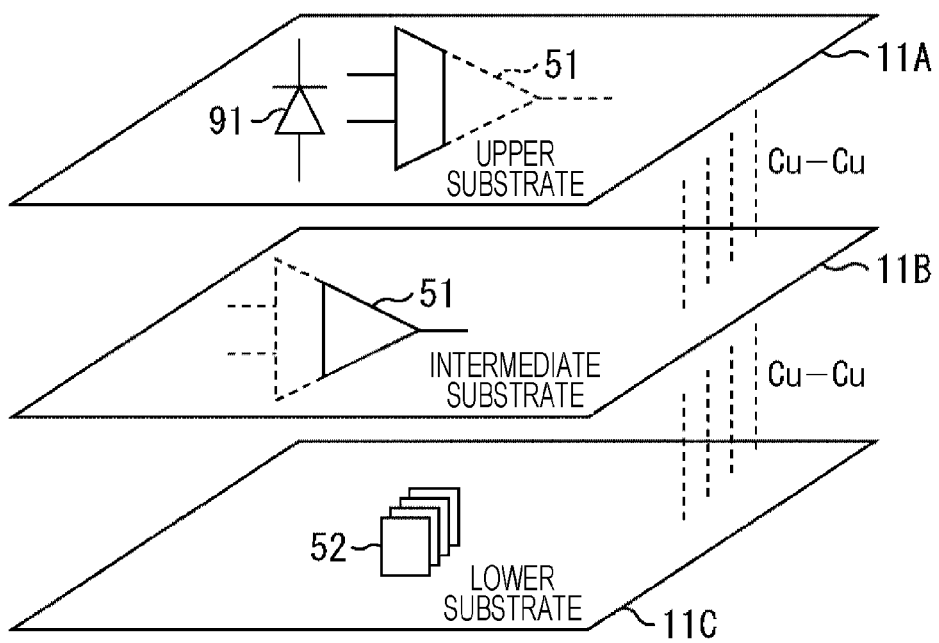
FIG. 4 is a conceptual diagram of three semiconductor substrates layered for the solid-state image pickup device.

FIG. 4 is a conceptual diagram of three semiconductor substrates 11 of an upper substrate 11A, an intermediate substrate 11B, and a lower substrate 11C layered for the solid-state image pickup device 1.

The pixel circuits 41 including the respective photoelectric conversion units 91 and at least a partial circuit of each comparison unit 51 are formed on the upper substrate 11A. At least the data storage units 52 that each stores a time code and the time-code transfer units 23 are formed on the lower substrate 11C. The remaining circuit of each comparison unit 51, not disposed on the upper substrate 11A, is formed on the intermediate substrate 11B. For example, the upper substrate 11A and the intermediate substrate 11B are joined and the intermediate substrate 11B and the lower substrate 11C are joined by metallic bonding, such as Cu—Cu.

<5. Sectional Structure of Pixel>

Next, the sectional structure of the pixel 21 will be described with reference to FIG. 5. Note that, herein, an exemplary configuration including three semiconductor substrates 11 will be described.

Figure 5:
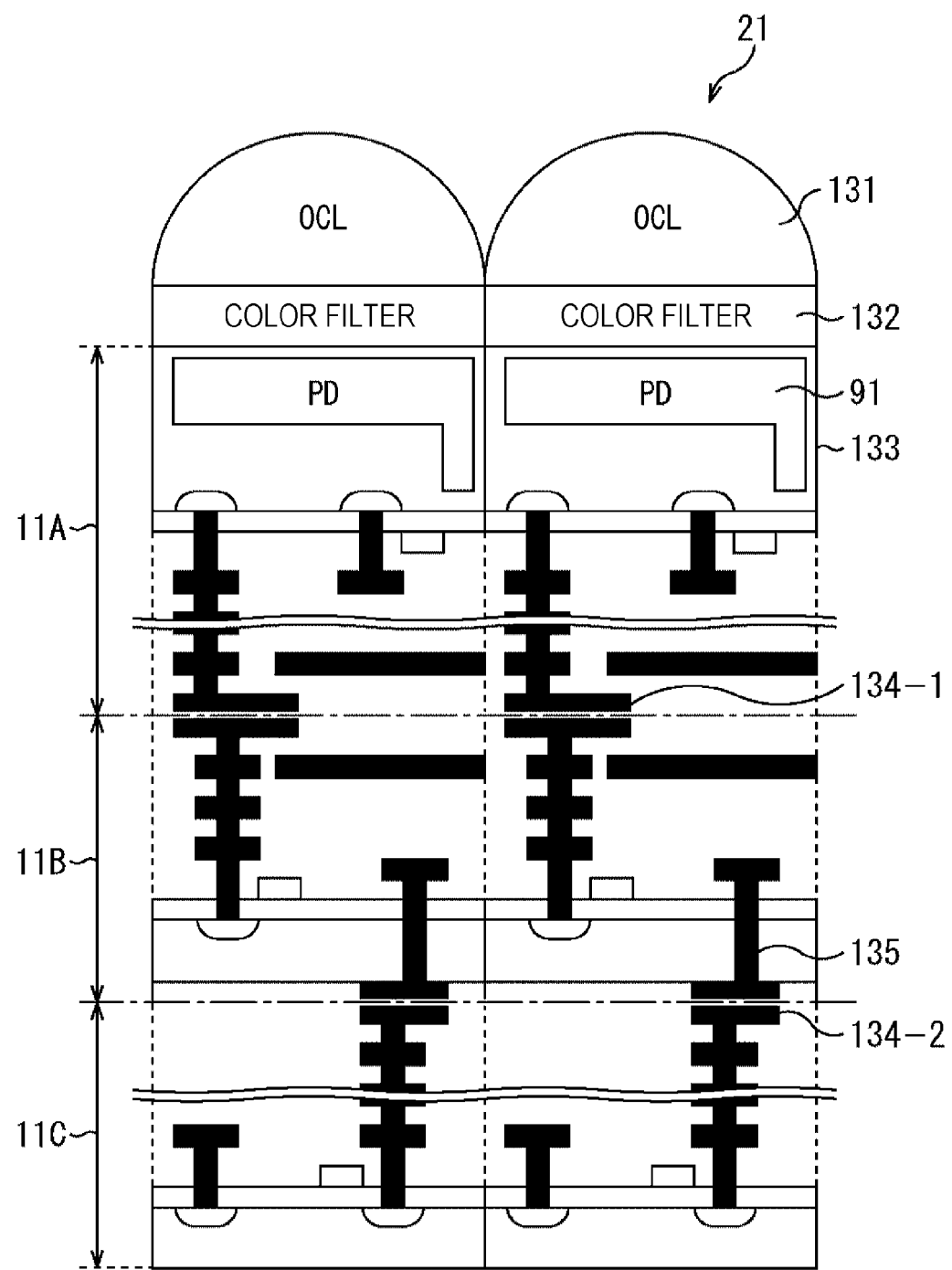
FIG. 5 is an explanatory view of an exemplary side-sectional configuration of pixels.

FIG. 5 illustrates the sectional structure of adjacent two pixels 21. From top in the figure, on chip lenses (OCLs) 131, color filters 132, the upper substrate 11A, the intermediate substrate 11B, and the lower substrate 11C are layered.

The OCLs 131 condense incident light entering from above in the figure onto the image pickup faces of photoelectric conversion units (PDs) 91 provided in a photoelectric conversion layer 133 formed in the upper-face portion (location facing in the incident direction of light) of the upper substrate 11A in the figure.

The color filters 132 each transmit, to the photoelectric conversion unit (PD) 91, the light having wavelengths corresponding to RGB from the incident light condensed by the OCL 131 after entry from above in the figure.

The upper substrate 11A and the intermediate substrate 11B are joined through Cu—Cu joints 134-1 formed by Cu—Cu metallic joining.

Furthermore, the intermediate substrate 11B and the lower substrate 11C are joined through Cu—Cu joints 134-2 formed by Cu—Cu metallic joining through embedded electrodes 135 in the intermediate substrate 11B.

<6. Exemplary Circuit Configuration of Pixel>

Figure 6:
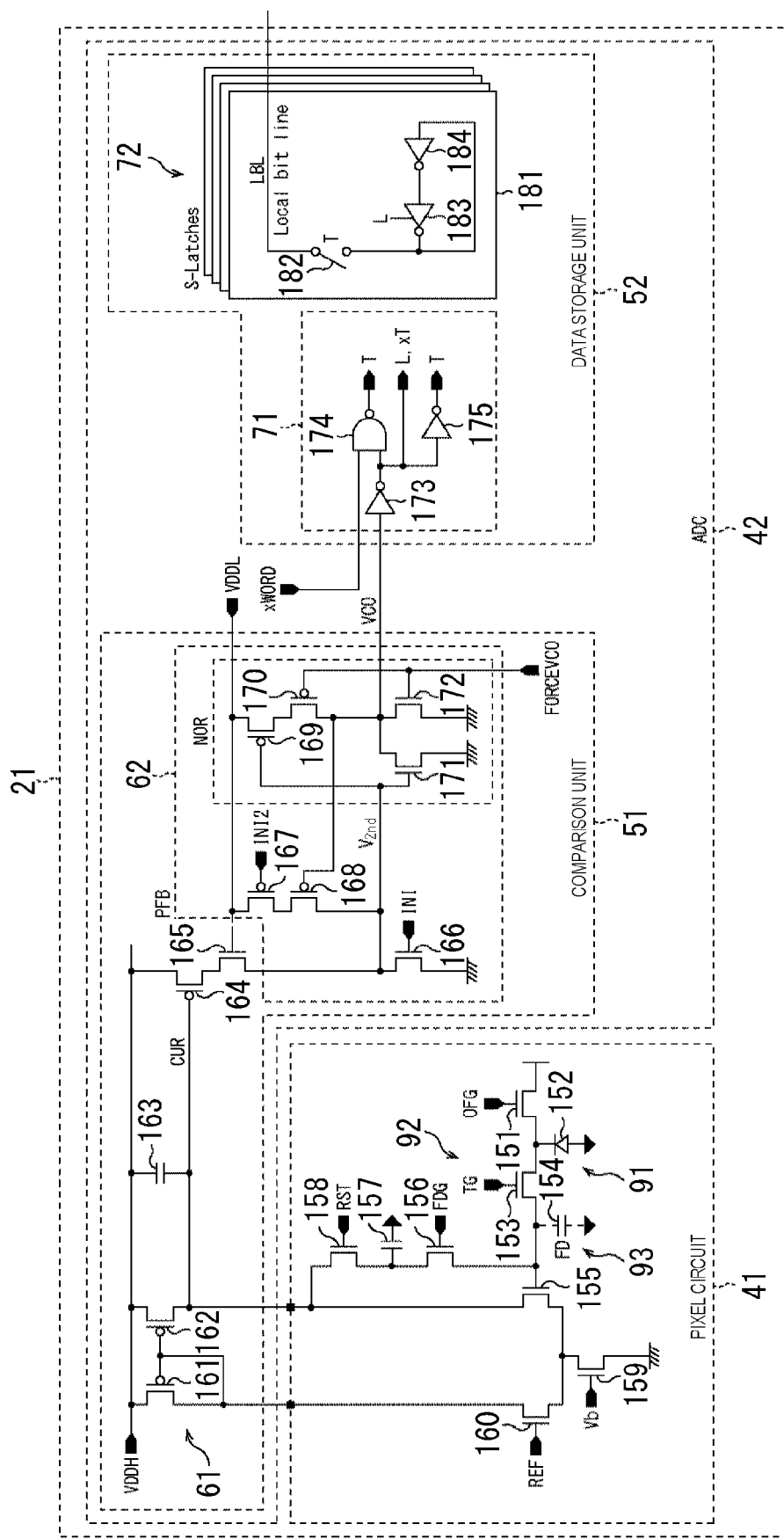
FIG. 6 is a block diagram of an exemplary detailed circuit configuration of a pixel.

FIG. 6 is a diagram of the circuit configuration of the pixel 21 illustrated in FIG. 5.

As illustrated, the pixel 21 includes the pixel circuit 41 including a discharge transistor 151, a photodiode (PD) 152, a transfer transistor 153, a floating diffusion (FD) portion 154, an amplification transistor 155, a connection transistor 156, a capacitor 157, a reset transistor 158, and transistors 159 and 160, formed on the upper substrate (light-receiving-side wafer) 11A. Furthermore, the pixel 21 includes the comparison unit 51 including transistors 161 and 162, a capacitor 163, and transistors 164 to 172, formed the lower substrate 11C (or on the intermediate substrate 11B and the lower substrate 11C) (logic circuit wafers). Moreover, the data storage unit 52 including the input/output control unit 71 including an inverter 173, a NAND circuit 174, and an inverter 175, and the signal storage unit 72 including a plurality of 1-bit latches 181, is formed on the lower substrate 11C (or the intermediate substrate 11B and the lower substrate 11C) (logic circuit wafers).

The PD 152 corresponds to, for example, the photoelectric conversion unit 91 of FIG. 5, and the discharge transistor 151 discharges the electric charge accumulated in the PD 152. The transfer transistor 153 corresponds to the transfer unit 92 of FIG. 5, and transfers the electric charge from the PD 152 to the FD portion 154. The FD portion 154 and the amplification transistor 155 serve as the charge-to-voltage conversion unit 93 of FIG. 5. The connection transistor 156 connects the capacitor 157 to the FD portion 154, so that the electric charge accumulated in the FD portion 154 is reset through the reset transistor 158.

The transistor 159 is supplied with bias Vb, and additionally the transistor 160 is supplied with the reference signal REF. The transistor 160 and the amplification transistor 155 serve as a differential pair. Furthermore, the transistors 161 and 162 serve as a current mirror for the comparator 61 of FIG. 5.

Then, the capacitor 163 serves as a band limiter and is located in the circuit provided between a conductive line for supplying H-level drain power VDDH and a conductive line for outputting an output signal from the comparator 61.

Furthermore, the transistors 166 to 172 serve as a positive feedback (PFB) circuit for the positive feedback circuit (response-speed enhancement unit) 62 of FIG. 6. The positive feedback circuit 62 includes a NOR circuit including the transistors 169 to 172. The inverter 173, the NAND circuit 174, and the inverter 175 serve as the input/output control unit 71 of FIG. 6. Furthermore, the latches 181, the number of which corresponds to a necessary bit length, serve as the signal storage unit 72 of FIG. 6. Each latch 181 includes a switch 182 and inverters 183 and 184.

In the pixel 21 provided as above, for effective noise reduction with the band limitation of the capacitor 163, as illustrated in FIG. 6, desirably, the capacitor 163 is provided at the output of the first stage. For example, the capacitor 163 may be achieved by metallic wiring or with a poly-diffusion MOS structure.

The transistor (NMOS) 166 to which a control signal INI is connected is designed to be larger in leakage current than both of the transistor (PMOS) 164 to which a second-stage input CUR is connected and the transistor (PMOS) 168 that is subjected to positive feedback in series connection with the transistor 167 to which a control signal INI2 is connected. This is because if the transistor (NMOS) 166 is less in the quantity of leakage than the transistors (PMOS) 164 and 168, regardless of the input signal (herein, the second-stage input CUR), unintentionally, a floating portion indicated with Vena of FIG. 6 is inverted due to the difference in current.

Thus, for the transistor (NMOS) 166 that is controlled with INI, inevitably, required is use of a transistor adjusted in threshold for leakage larger in quantity than leakage from the paths of the transistors (PMOS) 164 and 168, so that output resistance R is inevitably low. Increasing the output resistance R is equivalent to facilitating occurrence of an unintended inversion. Thus, it is difficult to achieve a narrow band with a gain of the output resistance R. Therefore, preferably, the capacitor 163 is provided at the output of the first stage for band limitation. Note that, instead of at the first stage, a capacitor as a band limiter (not illustrated) may be provided at the floating portion indicated with Vena of FIG. 6.

<7. Exemplary Circuit Configuration of Time-Code Input/Output Unit>

Figure 7:
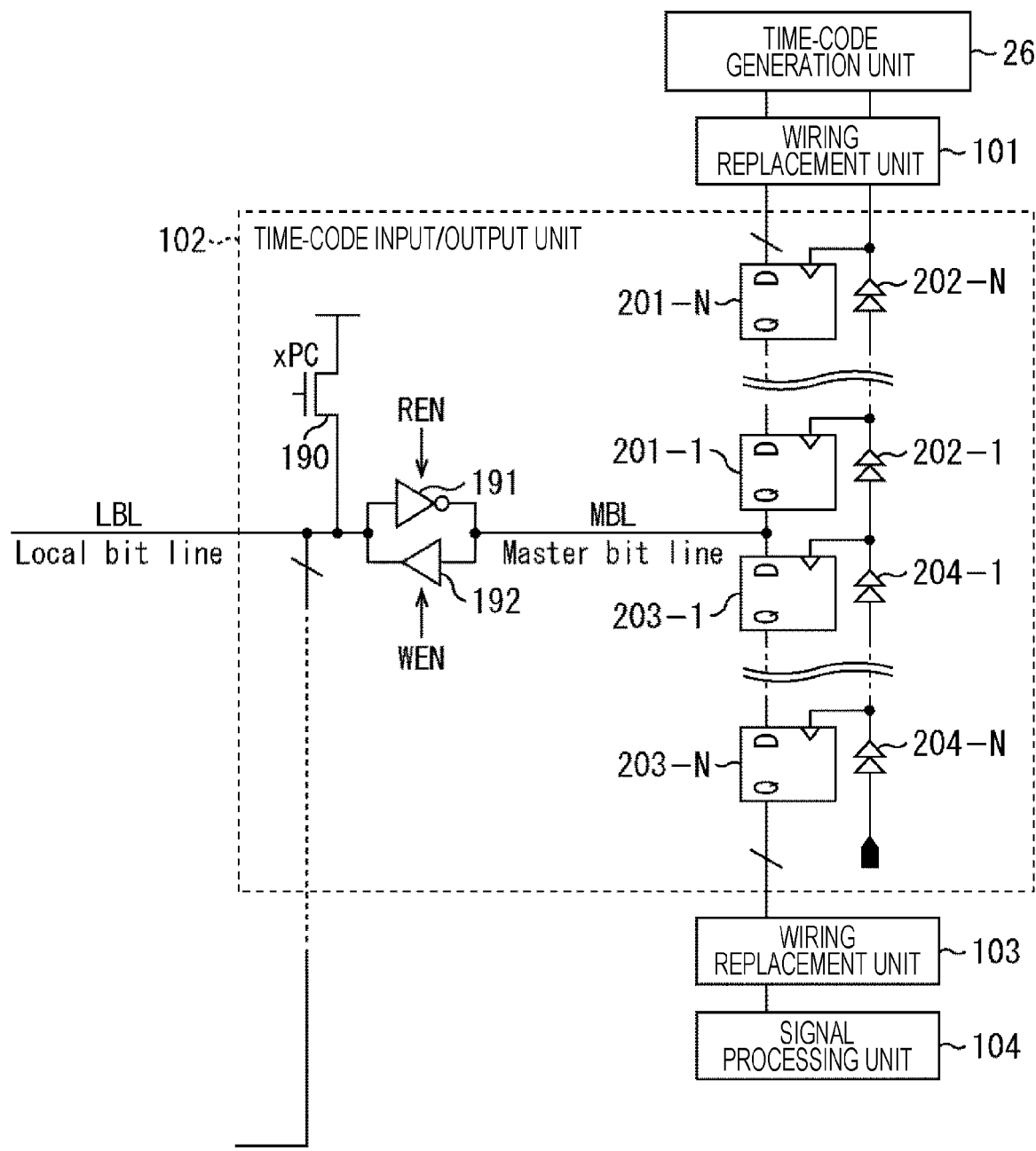
FIG. 7 is a block diagram of an exemplary configuration of a time-code input/output unit.

FIG. 7 is a diagram of the circuit configuration of the time-code input/output unit 102 illustrated in FIG. 5.

As illustrated in FIG. 7, the time-code input/output unit 102 includes a transistor 190, a tri-state inverter 191, a tri-state buffer 192, FF circuits 201-1 to 201-N, buffer circuits 202-1 to 202-N, FF circuits 203-1 to 203-N, and buffer circuits 204-1 to 204-N connected together. Here, sets of the FF circuits and the buffer circuits are provided one-to-one to the latches 181 included in the signal storage unit 72, so that provided is a plurality of sets corresponding to the bit length that the signal storage unit 31 requires.

Furthermore, although a mater bit line (MBL) is output from the FF circuits 203-1 and 201-1 in FIG. 7, a plurality of MBLs may be provided. If a plurality of MBLs is provided, the respective local bit lines (LBLs) that are driven with REN, WEN, and xPC, ahead of the MBLs can be complementarily operated by temporal overlap, so that the time required for readout can be shortened.

Figure 8:
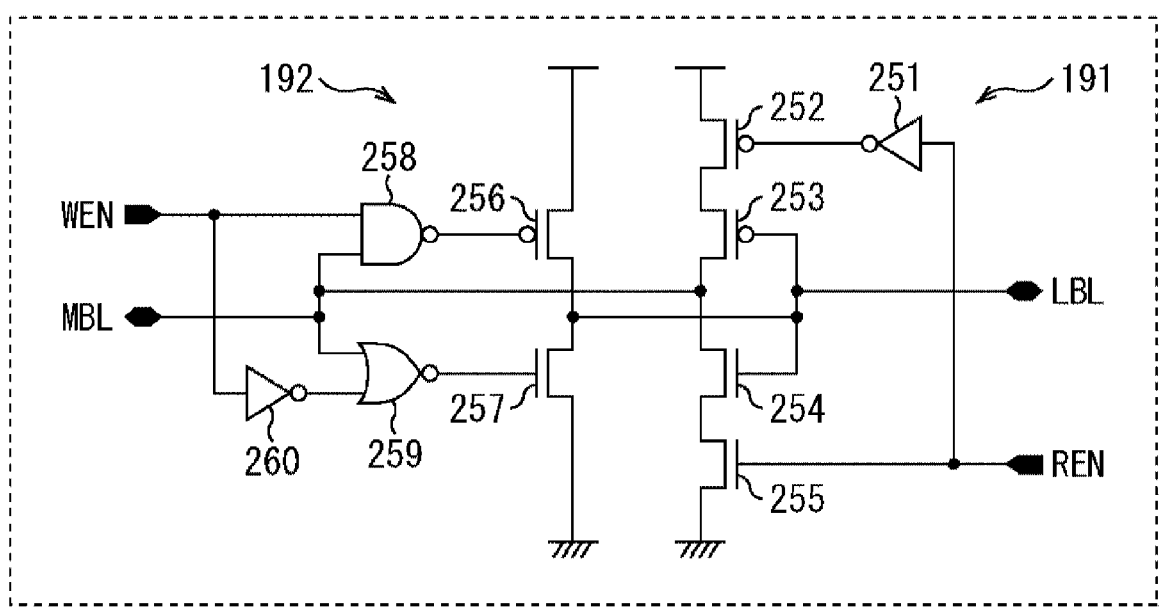
FIG. 8 is a diagram of a transistor-level circuit configuration in the pre-stage portion of the time-code input/output unit.

FIG. 8 is a diagram of the transistor-level circuit configuration of the tri-state inverter 191 and the tri-state buffer 192 included in the pre-stage portion of the time-code input/output unit 102 illustrated in FIG. 7.

As illustrated in FIG. 8, the tri-state inverter 191 and the tri-state buffer 192 include an inverter 251, transistors 252 to 257, a NAND circuit 258, a NOR circuit 259, and an inverter 260 connected together.

Figure 9:
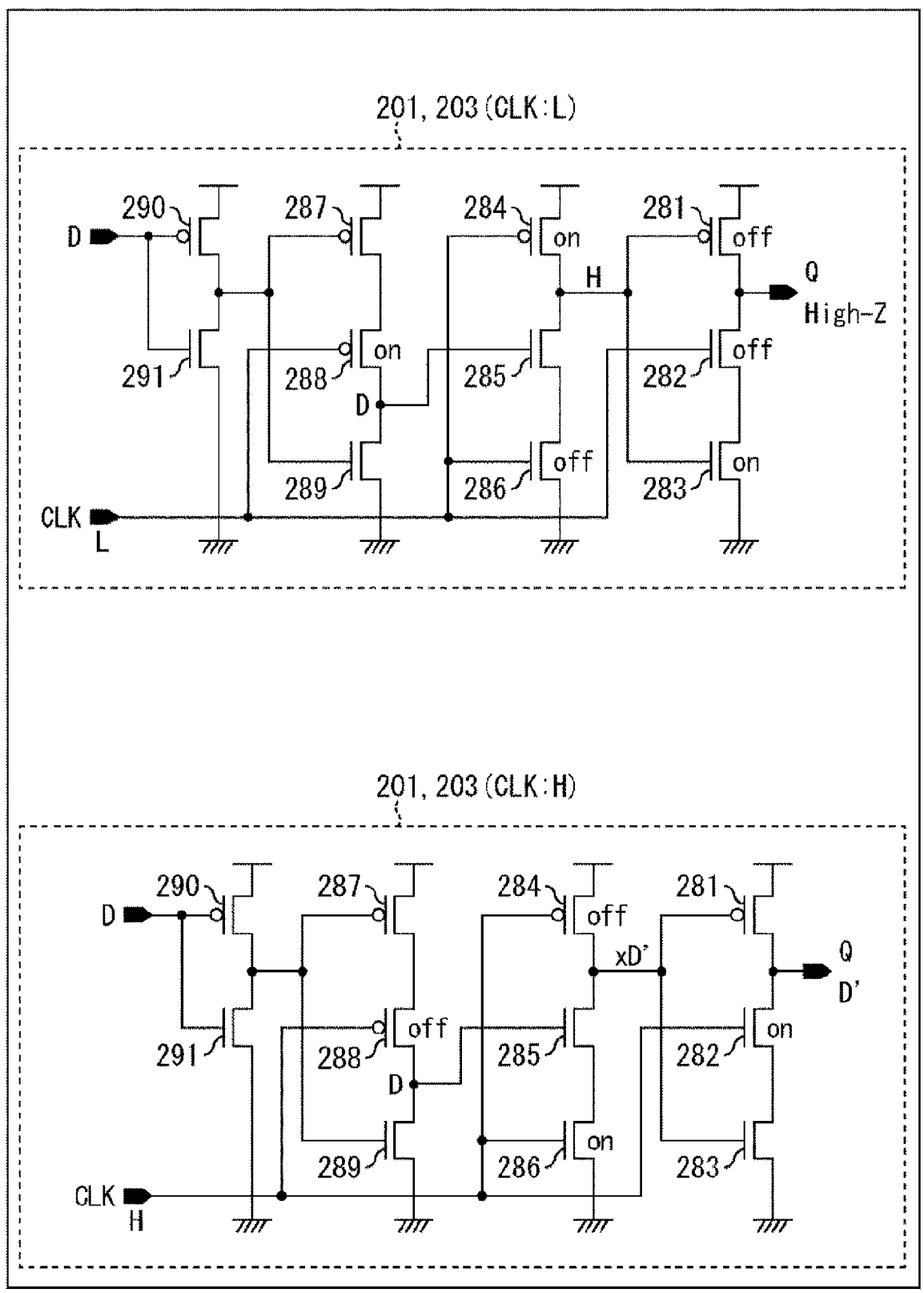
FIG. 9 is a diagram of the transistor-level circuit configuration of each FF circuit.

FIG. 9 is a diagram of the transistor-level circuit configuration of each of the FF circuits 201 and 203 illustrated in FIG. 7. Furthermore, the internal state of each of the FF circuits 201 and 203 with a clock CLK of L is illustrated on the upper side of FIG. 9. The internal state of each of the FF circuits 201 and 203 with a clock CLK of H is illustrated on the lower side of FIG. 9.

As illustrated in FIG. 9, the FF circuits 201 and 203 each include transistors 281 to 291 connected together.

<Exemplary Circuit Configuration of Latch>

Figure 10:
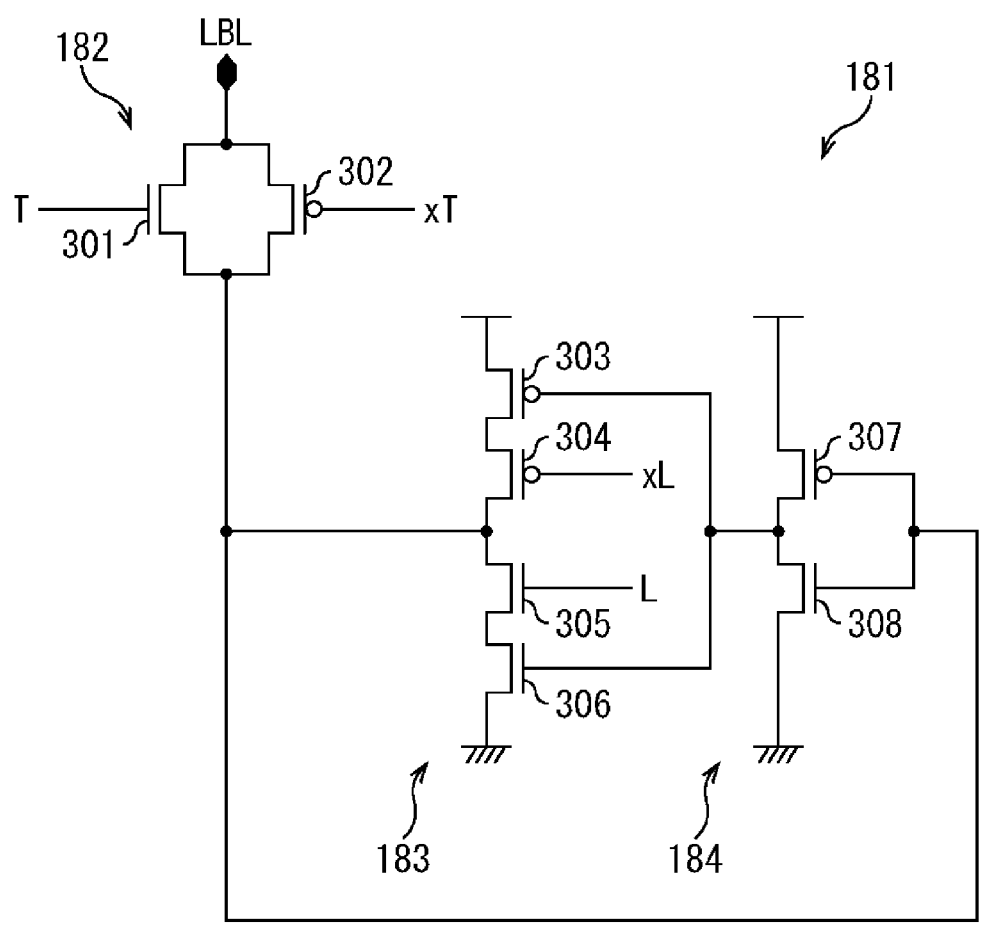
FIG. 10 is a diagram of the transistor-level circuit configuration of a 1-bit latch.

FIG. 10 is a diagram of the transistor-level circuit configuration of each 1-bit latch 181 illustrated in FIG. 6.

As illustrated in FIG. 10, the 1-bit latch 181 includes transistors 301 and 302 that serve as the switch 182, transistors 303 to 306 that serve as the inverter 183, and transistors 307 and 308 that serve as the inverter 184, connected together.

<Exemplary Drive Waveforms>

Figure 11:
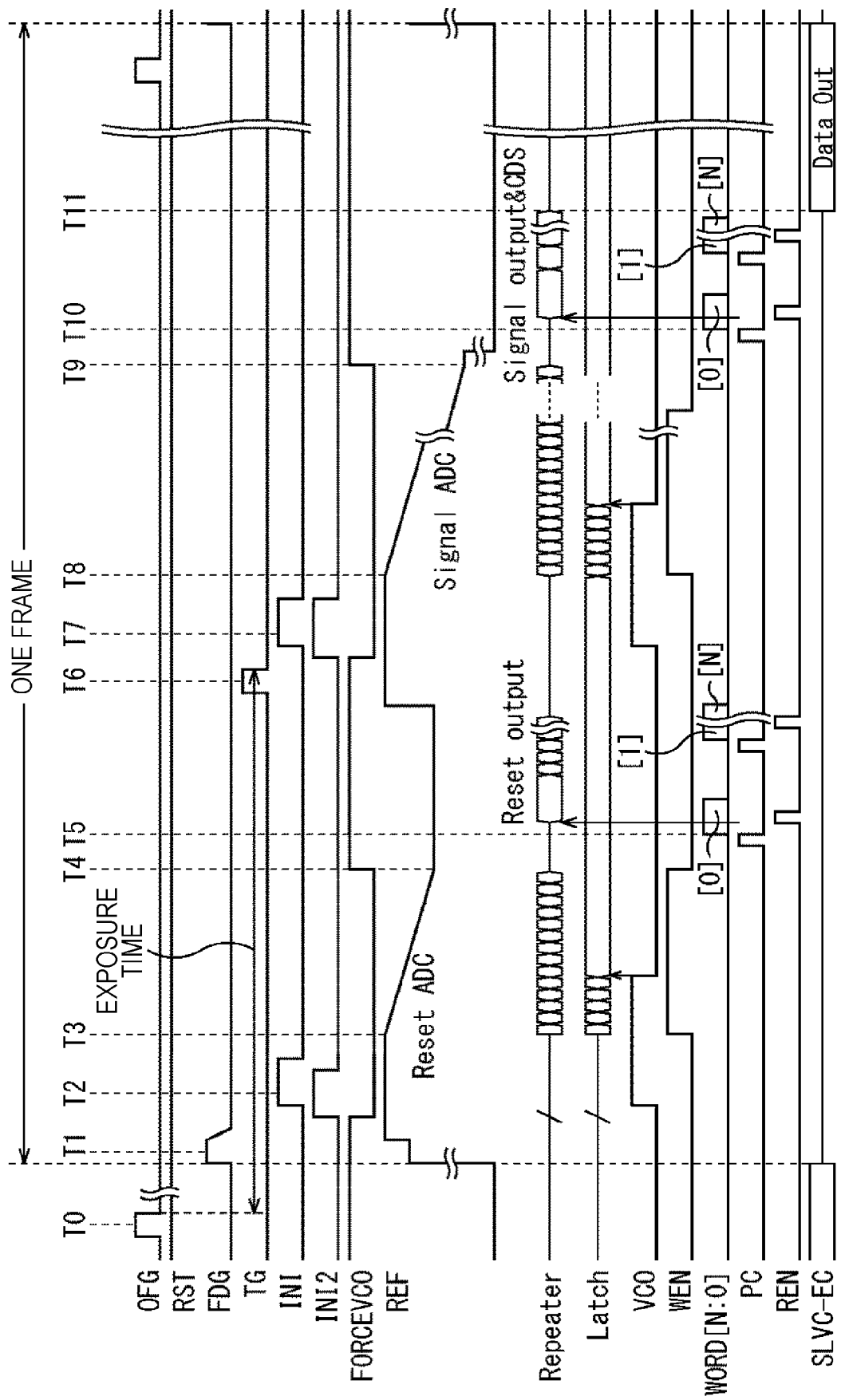
FIG. 11 is a timing chart of exemplary drive waveforms for describing a method of controlling a pixel.

Next, a method of controlling the pixel 21 of FIG. 6 will be described with reference to drive waveforms illustrated in FIG. 11. Note that the write of a code and the drive of the comparator 61 are performed over all the pixels, simultaneously, resulting in a so-called global shutter operation. The readout of the code stored in the signal storage unit 72 (latches 181) is performed in a cluster readout mode, sequentially.

First, at timing TO, as exposure control, the PD 152 is initialized with an OFG signal supplied to the discharge transistor 151. Then, an exposure (accumulation) period ranges from the timing when the OFG signal is turned from ON to OFF to the timing when a TG signal supplied to the transfer transistor 153 is turned from ON to OFF. Furthermore, in a configuration in which no discharge transistor 151 is provided, an exposure (accumulation) period ranges from the timing when the TG signal is turned from ON to OFF in the preceding frame to the next timing when the TG signal is turned from ON to OFF. Note that, although the OFG signal is illustrated with a pulse short in ON period in FIG. 11, a pulse long in ON period or a plurality of pulses with two or more ON periods may be input. Furthermore, from a viewpoint of inhibition of an overflow, as the OFG signal, for example, an intermediate voltage or an intermediate pulse may be used, instead of a binary signal of ON and OFF.

At timing T1, the potential of an REF signal supplied to the transistor 160 is set to the initial voltage of the FD portion 154, and an FDG signal supplied to the connection transistor 156 turned to ON and then to OFF, resulting in initialization of the FD portion 154. In this case, the FDG signal is turned OFF with a rise in the potential of the REF signal, so that the FD portion 154 can be subjected to a soft reset (approximately half reduction of kT/C noise due to gradual transition from a linear region to a saturation region). Furthermore, because the operating range of the FD portion 154 can be made high in voltage, the margin of signal transfer from the PD 152 to the FD portion 154 can be increased with an improvement in the available maximum quantity of electric charge. Furthermore, with the FDG signal supplied to the connection transistor 156, remaining ON, similar control is performed with an RST signal supplied to the reset transistor 158, so that a drop in conversion efficiency can be made by the capacitor 157 connected between the reset transistor 158 and the connection transistor 156. Needless to say, the RST signal and the FDG signal may be controlled simultaneously, instead of being fixed in voltage.

At timing T2, with an INI signal supplied to the transistor 166 and an INI2 signal supplied to the transistor 67, the second-stage floating portion of the comparator 61 is initialized. Herein, although the INI signal and the INI2 signal have been described separately, the INI signal and the INI2 signal may be the same. In a case where the INI signal and the INI2 signal are the same, a merge can be made in wiring, so that an increase can be made in the margin of layout design. Furthermore, a FORCEVCO signal supplied to the transistors 170 and 172 is controlled to bring the output of the comparator 61 into a Ready state, resulting in a state where a signal can be written into the latches 181.

At timing T3, the time-code input/output unit 102 (repeater) that inputs a time code generated by the time-code generation unit 26 and causes output of AD converted pixel data from the signal storage unit 72, is controlled to perform write of the time code from outside to the latches 181, with a WEN signal supplied to the tri-state buffer 192. Simultaneously, the REF signal that is a slope signal that monotonously decreases is input to the transistor 160 such that comparison to the potential of the FD portion 154 is performed. At the timing of inversion, a VCO signal is inverted. Then, at the timing, the time code having been continuously written is stored in the latches 181, and the write operation to the corresponding latch 181 stops.

The positive feedback circuit (response-speed enhancement unit) 62 that is a positive feedback circuit is provided such that the VCO signal operates even when the current at the pre-stage of the comparator 61 is several nanoamperes. Therefore, the output of the pre-stage of the comparator 61 is received first by the second-stage transistor 164, so that a high power supply rejection ratio (PSRR) can be achieved. Subsequently, with connection to the transistor 166 that is a high-voltage NMOS type, the voltage of the floating portion $V_{2nd}$ downstream of the transistor 166 is controlled to be below gate potential. For the gate potential, the same power as the post-stage logic circuit can be used, but a different voltage may be used. Furthermore, positive feedback is established to the floating portion Vena by the NOR circuit that is controlled with a test signal and the FORCEVCO signal as a function of preventing malfunction, so that fast transition can be achieved. Here, because the time-code input/output unit 102 includes flip-flops in multistage connection as illustrated in FIG. 7, the time code that is written into the latches 181 has a fixed offset shifted by 1 code at each location. However, as described later, the same offset is superimposed at the signal level by computation of CDS, so that the offset of the time code that is written into the latches 181 canceled.

At timing T4 when the slope of the REF signal drops to an arbitrary voltage, AD conversion at the reset level in all the pixels 21 is completed. Note that, regarding the comparator 61 in which no inversion has occurred because of a reason of some kind, forcible inversion with the FORCE-VCO signal prevents the post-stage readout processing from being influenced. Examples of the reason of some kind for no inversion include circuit trouble and the potential below the voltage at the time of slope completion due to strong light to the PD 152. Then, along with completion of AD conversion, bringing the voltage of the REF signal to a low potential, such as GND, enables the constant current of the comparator 61 to be zero. Thus, until the potential of the REF signal rises and the constant current flows in the comparator 61 again, power consumption can be inhibited.

At timing T5, the AD converted pixel data (digital data) stored in the latches 181 is read outward. For example, because of areal reasons, the latches 181 are produced in a size close to processable minimum dimensions. Thus, NMOS and PMOS are not balanced in driving force. Therefore, depending on whether the internal signal of each latch 181 is "H" or "L" or depending on whether the local bit line (LBL) of the readout destination is "H" or "L", difference occurs in readout capacity (time). Furthermore, depending on the impedance of the LBL, there is concern about variation of the signal of the latch 181 at the time of signal readout of the latch 181. In order to address such concern, control is performed such that the external impedance of the latch 181 increases to the latch 181 at the time of readout of a latch signal with the transistor 190 that is controlled with an xPC signal.

Here, an NMOS transistor is higher in transconductance gm than a PMOS transistor. Thus, changing the LBL from "H" to "L" by an NMOS transistor is faster in operation than changing the LBL from "L" to "H" by a PMOS transistor. Thus, each time before readout with the xPC signal, the LBL is preset to "H" by setting to power first. Then, because of no difference from the preset value in a case where the readout signal is "H" in readout from the latch 181, no influence is received even in a case where the capacity of PMOS is low. Thus, the driving force of PMOS may be low. Meanwhile, in a case where the readout signal from the latch 181 is "L", the potential of the LBL pre-charged to "H" is decreased by NMOS. However, a minimum-sized transistor has difficulty in securing sufficient transconductance gm. Thus, in general, an increase is made in gate width W, resulting disadvantageously in an increase in area cost.

Thus, the resistance of the switch 182 provided at the output of each latch 181 is gained above that at the time of write, so that the impedance of the LBL is gained to the inverters 183 and 184 inside the latch 181. Specifically, the switch 182 provided at the output of the latch 81 is controlled at the time of write such that both of the transistor (NMOS) 301 and the transistor (PMOS) 302 are turned ON. Meanwhile, the switch 182 is controlled at the time of readout such that only the transistor (NMOS) 301 is turned ON. This arrangement enables fast and robust signal readout without an increase in the size of a large number of NMOS transistors inside the latch 181. Then, the signal read out to the LBL is read out to a flip-flop by turning an REN signal ON with an AD conversion clock at L. After turning the REN signal OFF, the AD conversion clock is input, so that the signal is transferred to the output on a bucket brigade basis. Furthermore, for CDS, performed is temporary writing to a memory, such as a static random access memory (SRAM), not illustrated, provided inside the solid-state image pickup device 1.

At timing T6, the voltage of the REF signal is returned to the high level and the TG signal supplied to the transfer transistor 153 is turned ON, so that the electric charge of the PD 152 is transferred to the FD portion 154.

Processing similar to the processing from timing T2 to timing T5 is performed from timing T7 to timing T10, so that AD conversion at the signal level is performed. Then, at timing T10, at the time of output at the signal level, the reset level temporarily stored in the SRAM is read out and subtraction is performed between the reset level and the signal level. This arrangement enables cancellation of a series of circuit noise including fixed pattern noise of the comparator 61 and the time-code input/output unit 102 and random noise of the pixel 21 and the comparator 61 (correlated double sampling (CDS)).

At timing T11, through a signal readout circuit, for example, through a high-speed serial interface, such as scalable low voltage signaling with embedded clock (SLVS-EC), performed is processing of transmission outward from the solid-state image pickup device 1. Note that processing of narrowing a data band, such as signal compression, may be performed at the pre-stage of the processing.

The pixel 21 is driven with the control method as above, so that reduction of noise in the output signal and enhancement in speed to the output signal can be achieved.

Note that adopted can be a configuration in which the signal storage unit 72 stores a code at the reset level and a code at the signal level of received light both and then the code at the reset level and the code at the signal level of received light are output sequentially or simultaneously by a plurality of repeaters, the number of which is two or more, outward from the solid-state image pickup device 1. Furthermore, as the solid-state image pickup device 1 including the comparison units 51, adopted may be a layered structure of two semiconductor wafers or three semiconductor wafers or a layered structure of four or more semiconductor wafers. Furthermore, for variable resolution of AD conversion, with the slope of the REF signal kept constant in gradient, code transition with the AD conversion clock is controlled so as to be fine at the time of low illumination and so as to be coarse at the time of high illumination. Thus, an improvement can be made in power efficiency with reduction of the number of times of circuit transition. Moreover, as not illustrated, in a case where control signals become insufficient in settling due to a large number of pixels and a large number of circuits inside the solid-state image pickup device 1, an improvement may be made appropriately in signal drive capacity, such as buffering, to perform circuit adjustment within the category of designing.

<8. Detailed Configuration for Controlling Time-Code Transfer Units>

Next, a detailed configuration for controlling the time-code transfer units 23 will be described with reference to FIG. 12.

The configuration for controlling the time-code transfer units 23 is referred to as repeater circuits 401-1 to 401-$m$. The repeater circuits 401-1 to 401-$m$ provided are identical in number to the time-code transfer units 23 provided. An m number of repeater circuits are provided in FIG. 12. Note that, in a case where the repeater circuits 401-1 to 401-$m$ require not particularly distinguishing, the repeater circuits 401-1 to 401-$m$ are referred to as repeater circuits 401. Similar manners apply to other configurations.

The repeater circuits 401 each include a time-code generation unit 26, a time-code transfer unit 23, and a signal processing unit 111.

The time-code transfer unit 23 includes wiring replacement units 101 and 103 and a time-code input/output unit 102. Furthermore, the wiring replacement units 101 and 103 and the time-code input/output unit 102 in the time-code transfer unit 23 are provided with 1-bit transfer paths for a bit length of (n+1). In FIG. 12, a time-code transfer 1-bit column (Bit_0) 441-0 that is a transfer path for the 0-th-bit data of the time code (time code [0]) to a time-code transfer 1-bit column (Bit_n) 441-$n$ through which the n-th-bit data of the time code (time code [n]) is transferred, each are indicated as a transfer path. That is the time-code transfer 1-bit column (Bit_n) 441-$n$ is indicated as a transfer path through which the n-th-bit data (bit_n) of the time code (time code [n]) is transferred. Furthermore, although FIG. 12 exemplifies that the time code has a bit length of (n+1), a bit length different therefrom may be provided.

The wiring replacement units 101 and 103 replace, as necessary, the time-code transfer 1-bit column (Bit_0) 441-0 to the time-code transfer 1-bit column (Bit_n) 441-$n$, on the basis of a selection signal from a data-line selection-signal generation circuit 413 in the controller 29, and the data for each bit of the time code generated by the time-code generation unit 26 is transferred. Then, the wiring replacement unit 103 outputs transfer results REP_out0 to REP_outn for the bits to determination circuits 421-0 to 421-$n$, respectively, and to the controller 29.

More specifically, in a case where no error has occurred in any of the time-code transfer 1-bit column (Bit_0) 441-0 to the time-code transfer 1-bit column (Bit_n) 441-$n$, on the basis of the signal from the data-line selection-signal generation circuit 413, the wiring replacement units 101 and 103 use, without any change, the time-code transfer 1-bit column (Bit_0) 441-0 to the time-code transfer 1-bit column (Bit_n) 441-n, and the data for each bit of the time code is transferred. However, in a case where an error has occurred in the transfer path for any bit of the time-code transfer 1-bit column (Bit_0) 441-0 to the time-code transfer 1-bit column (Bit_n) 441-n, due to failure detection/relief processing to be described later, the transfer path for the bit in which the error has occurred is allocated so as to be replaced with the transfer path of the time-code transfer 1-bit column 441 for the bit lowest in priority, and the data is transferred. Here, the bit lowest in priority indicates, for example, the transfer path for the least significant bit. The transfer path of the E-th-bit time-code transfer 1-bit column (Bit E) 441 in which the error has occurred, is allocated to the time-code transfer 1-bit column (Bit_0) 441-0 (replaced with the time-code transfer 1-bit column (Bit_0) 441-0), and transfer is performed.

The signal processing unit 111 includes the determination circuits 421-0 to 421-n, an ERR-information storage latch 422, and a FUSE-information generation circuit 423. The determination circuits 421-0 to 421-n compare the transfer results of the time-code transfer 1-bit column (Bit_0) 441-0 to the time-code transfer 1-bit column (Bit_n) 441-n, respectively, with expected values, to determine presence or absence of occurrence of an error in each transfer path. Then, determination results are stored in the ERR-information storage latch 422.

Figure 2:
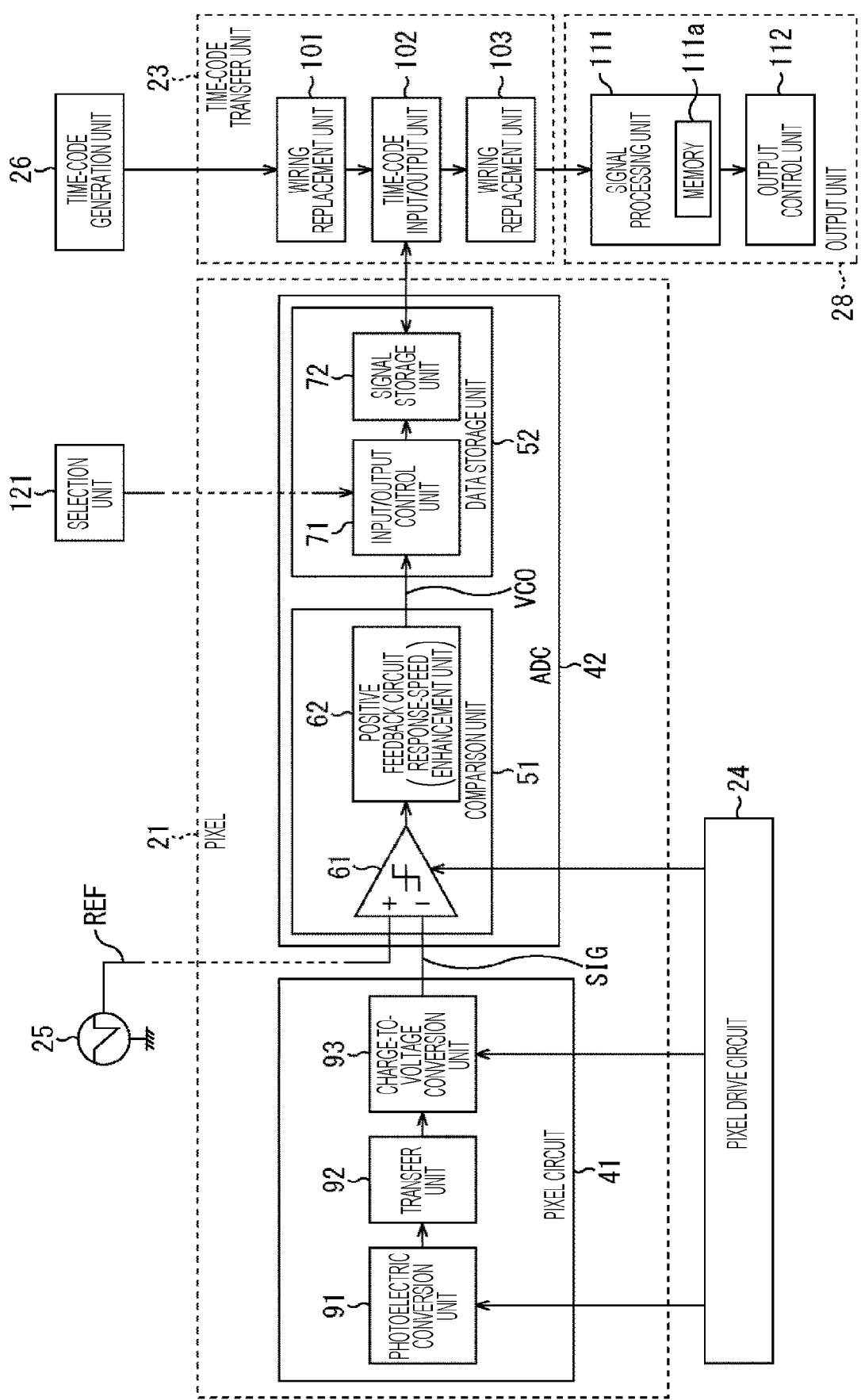
FIG. 2 is a block diagram of an exemplary detailed configuration of a pixel, a time-code transfer unit, and the periphery thereof.

The ERR-information storage latch 422 corresponding in configuration to a memory 111a of FIG. 2, latches the presence or absence of occurrence of an error to each of the bits of the time-code transfer 1-bit column (Bit_0) 441-0 to the time-code transfer 1-bit column (Bit_n) 441-n, namely, in each transfer path, and additionally supplies the determination results to the FUSE-information generation circuit 423, on the basis of address information from the controller 29.

On the basis of the determination results supplied from the ERR-information storage latch 422, the FUSE-information generation circuit 423 generates FUSE information including information of the determination results each indicating the presence or absence of an error in the transfer path. Then, the FUSE-information generation circuit 423 stores the FUSE information into a FUSE circuit 412 and additionally outputs the FUSE information to a control-signal generation circuit 411.

In a case where the FUSE information includes a transfer path causing an error, the control-signal generation circuit 411 supplies the data-line selection-signal generation circuit 413 with, as a relief measure, a control signal indicating an instruction for rearrangement of transfer paths by replacement of the transfer path in which the error has occurred among the time-code transfer 1-bit column (Bit_0) 441-0 to the time-code transfer 1-bit column (Bit_n) 441-n with the time-code transfer 1-bit column 441 for the bit lowest in priority.

The data-line selection-signal generation circuit 413 supplies a selection signal to the wiring replacement units 101 and 103 to perform control such that any transfer paths of the transfer paths for a bit length of (n+1) of the time-code transfer 1-bit column (Bit_0) 441-0 to the time-code transfer 1-bit column (Bit_n) 441-n are replaced and the time code is transferred.

More specifically, as default, the data-line selection-signal generation circuit 413 controls the wiring replacement units 101 and 103 such that the time code for a bit length of (n+1) is transferred through the transfer paths of the time-code transfer 1-bit column (Bit_0) 441-0 to the time-code transfer 1-bit column (Bit_n) 441-n without any replacement of the transfer paths, namely, without any change.

Furthermore, when a control signal including a selection signal indicating execution of a relief measure is received from the control-signal generation circuit 411, the data-line selection-signal generation circuit 413 reads out the FUSE information stored in the FUSE circuit 412 and controls the wiring replacement units 101 and 103 such that the transfer path in which the error has occurred is replaced with the time-code transfer 1-bit column (Bit_0) 441-0 for the bit lowest in priority among the transfer paths of the time-code transfer 1-bit column (Bit_0) 441-0 to the time-code transfer 1-bit column (Bit_n) 441-n and the time code for a bit length of (n+1) is transferred. Note that the bit low in priority may be set in advance or may be allowed to be set arbitrarily by a user.

<9. Exemplary Detailed Configurations of Wiring Replacement Units>

Next, exemplary detailed configurations of the wiring replacement units 101 and 103 will be described with reference to FIGS. 13 and 14. Note that, in the following description, in each time-code transfer 1-bit column 441 in FIGS. 13 to 16, the time code is defined to be transferred from top down in the corresponding figure. That is the transfer direction of the time code of the time-code transfer 1-bit columns 441 in FIGS. 13 to 16 are opposite to the transfer direction of the time code of the time-code transfer 1-bit columns 441 in FIG. 12.

Figure 13:
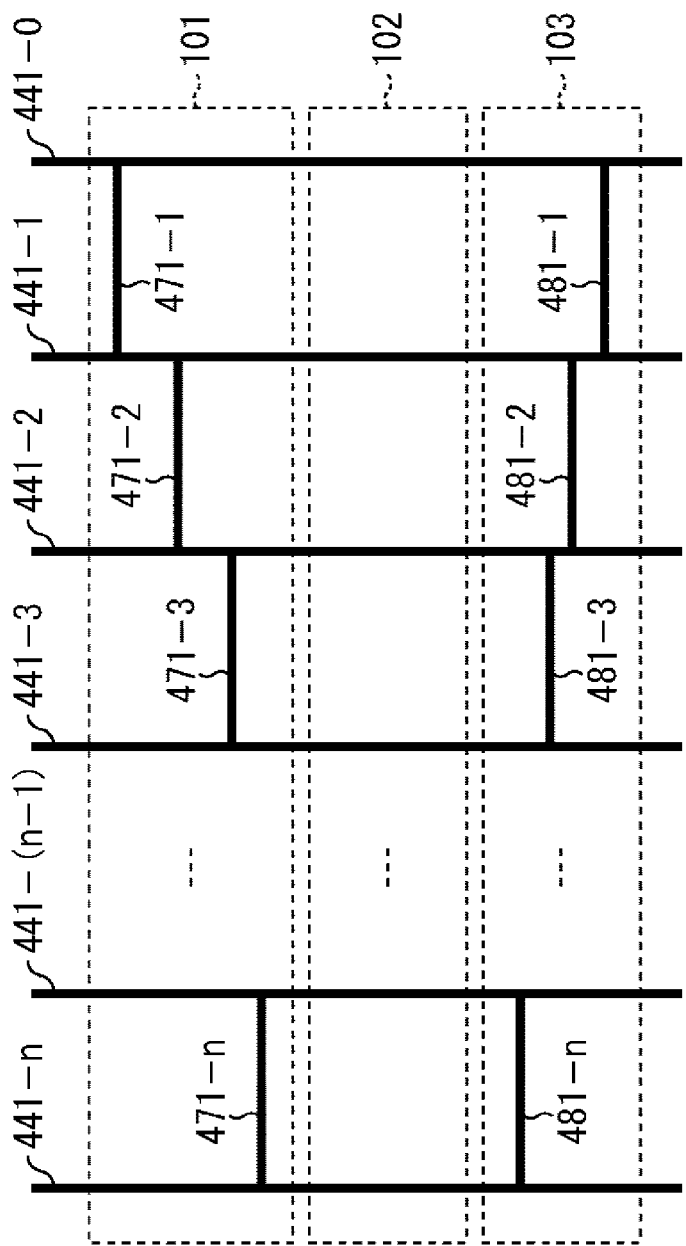
FIG. 13 is an explanatory diagram of respective exemplary configurations of wiring replacement units of FIG. 12.
Figure 14:
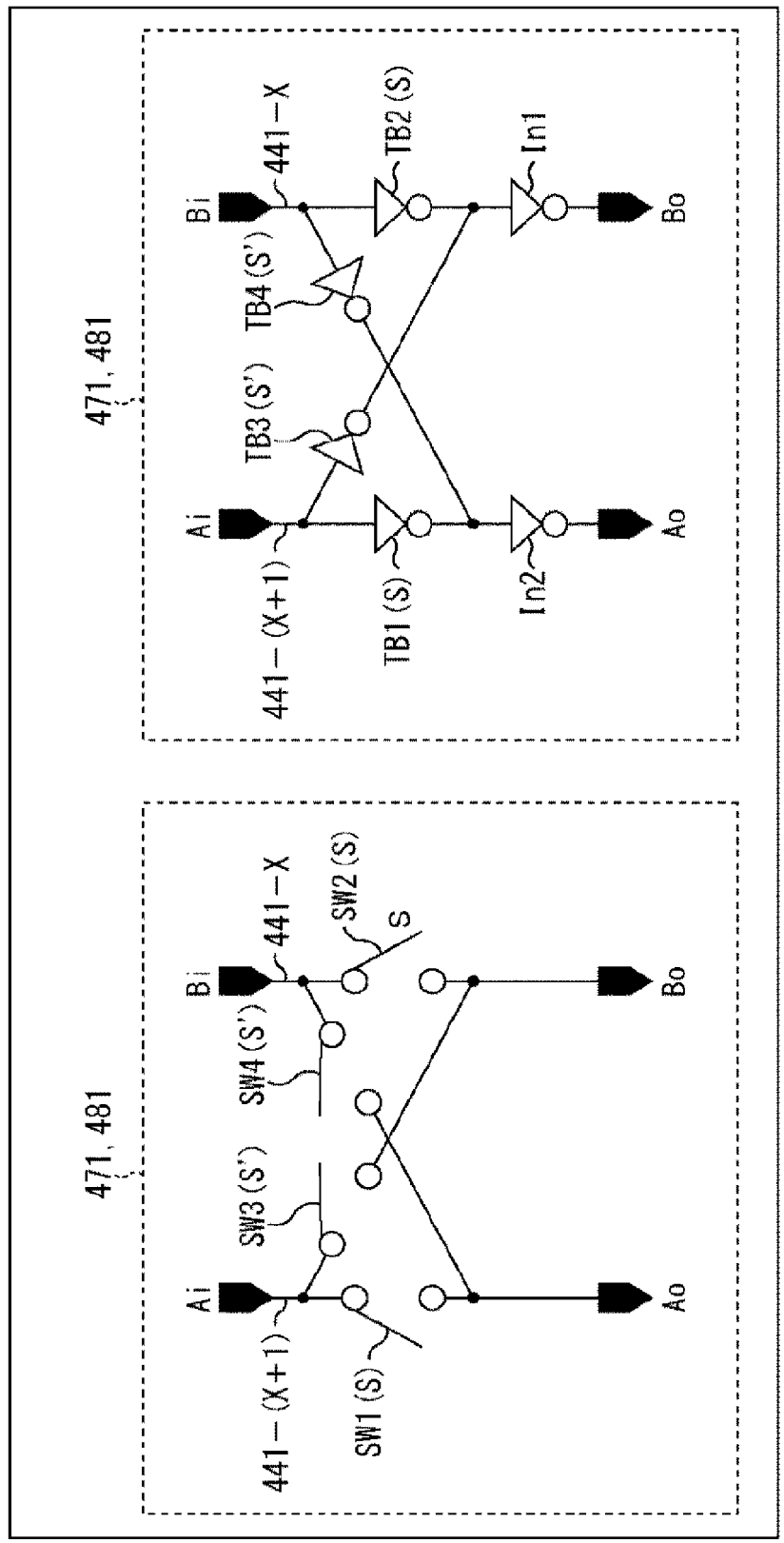
FIG. 14 is an explanatory diagram of exemplary specific circuit configurations of each wiring replacement unit of FIG. 13.

As illustrated in FIG. 13, for example, the wiring replacement unit 101 includes replacement circuits 471-1 to 471-n each provided between the corresponding time-code transfer 1-bit columns among the time-code transfer 1-bit columns 441-0 to 441-n.

More specifically, as illustrated in FIG. 13, the replacement circuit 471-1 is provided between the time-code transfer 1-bit columns 441-0 and 441-1. The replacement circuit 471-2 is provided between the time-code transfer 1-bit columns 441-1 and 441-2 and is closer to the output side (wiring replacement unit 103) than the replacement circuit 471-1 is.

Similarly, the replacement circuit 471-3 is provided between the time-code transfer 1-bit columns 441-2 and 441-3 and is closer to the output side than the replacement circuit 471-2 is. The replacement circuit 471-4 is provided between the time-code transfer 1-bit columns 441-3 and 441-4 and is closer to the output side than the replacement circuit 471-3 is. The replacement circuit 471-n is provided between the time-code transfer 1-bit columns 441-(n−1) and 441-n and is closer to the output side than the replacement circuit 471-(n−1) is.

Furthermore, as illustrated in FIG. 13, for example, the wiring replacement unit 103 includes replacement circuits 481-1 to 481-n each provided between the corresponding time-code transfer 1-bit columns among the time-code transfer 1-bit columns 441-0 to 441-n.

More specifically, as illustrated in FIG. 13, the replacement circuit 481-1 is provided between the time-code transfer 1-bit columns 441-0 and 441-1. The replacement circuit 481-2 is provided between the time-code transfer 1-bit columns 441-1 and 441-2 and is closer to the input side (wiring replacement unit 101) than the replacement circuit 481-1 is.

Similarly, the replacement circuit 481-3 is provided between the time-code transfer 1-bit columns 441-2 and 441-3 and is closer to the input side than the replacement circuit 481-2 is. The replacement circuit 481-4 is provided between the time-code transfer 1-bit columns 441-3 and 441-4 and is closer to the input side than the replacement circuit 471-3 is. The replacement circuit 481-n is provided between the time-code transfer 1-bit columns 441-(n−1) and 441-n and is closer to the input side than the replacement circuit 481-(n−1) is.

That is, between the replacement circuits 471-1 to 471-n of the wiring replacement unit 101 and the replacement circuits 481-1 to 481-n of the wiring replacement unit 103, the replacement circuit 471-m and the replacement circuit 481-m are mutually axisymmetric across the time-code input/output unit 102.

<Exemplary Configurations of Replacement Circuits>

The replacement circuits 471 and 481 each have, for example, an exemplary configuration illustrated on the left or right of FIG. 14.

In FIG. 14, adjacent time-code transfer 1-bit columns 441-(x+1) and 441-x are provided left and right. The input side and output side of the time code of the time-code transfer 1-bit column 441-(x+1) are indicated with terminals Ai and Ao, respectively. The input side and output side of the time code of the time-code transfer 1-bit column 441-x are indicated with terminals Bi and Bo, respectively.

On the left of FIG. 14, the replacement circuits 471 and 481 each include switches SW1(S) and SW2(S) that turn open or close by a control signal S and switches SW3(S') and SW4(S') that turn open or close by a control signal S' inverted to the control signal S.

Here, the switch SW1(S) is connected between the terminals Ai and Ao, and turns open or close between the terminals Ai and Ao by the control signal S. Furthermore, the switch SW2(S) is connected between the terminals Bi and Bo, and turns open or close between the terminals Bi and Bo by the control signal S.

Furthermore, the switch SW3(S') is connected between the terminals Ai and Bo, and turns open or close between the terminals Ai and Bo by the control signal S'. Furthermore, the switch SW4(S') is connected between the terminals Bi and Ao, and turns open or close between the terminals Bi and Ao by the control signal S'.

In such a configuration, when SW1(S) and SW2(S) are turned on by the control signal S, the switches SW3(S') and SW4(S') are turned off by the control signal S'. Thus, the time code [x+1] for the (x+1)-th bit column input through the terminal Ai on the time-code transfer 1-bit column 441-(x+1) is output through the terminal Ao. The time code [x] for the x-th bit column input through the terminal Bi on the time-code transfer 1-bit column 441-x is output through the terminal Bo.

Meanwhile, when the switches SW1(S) and SW2(S) are turned off by the control signal S, the switches SW3(S') and SW4(S') are tuned on by the control signal S'.

In this case, regarding the time code [x+1] for the (x+1)-th bit column and the time code [x] for the x-th bit column that are transferred, respectively, on the time-code transfer 1-bit columns 441-(x+1) and 441-x, the bit columns are replaced by SW3 and SW4.

Thus, the time code [x+1] for the (x+1)-th bit column input through the terminal Ai on the time-code transfer 1-bit column 441-(x+1) is output through the terminal Bo on the time-code transfer 1-bit column 441-x, namely, as the time code [x] for the (x+1)-th bit column through the terminal Bo. The time code [x] for the x-th bit column input through the terminal Bi on the time-code transfer 1-bit column 441-x is output as the time code [x+1] for the (x+1)-th bit column through the terminal Ao on the time-code transfer 1-bit column 441-(x+1).

That is the switching of the switches SW1 to SW4 included in each of the replacement circuits 471 and 481 is controlled as necessary by the control signal S, so that the time code [x] for the x-th bit column and the time code [x+1] for the (x+1)-th bit column that are transferred on the adjacent time-code transfer 1-bit columns 441-(x+1) and 441-x can be output in the normal order of bit columns or can be output with the adjacent bit columns replaced.

On the right of FIG. 14, the replacement circuits 471 and 481 each have an exemplary configuration in which tri-state inverters TB1 to TB4 and inverters In1 and In2 are provided instead of the switches SW1 to SW4 on the left of FIG. 14.

That is, when the tri-state inverters TB1(S) and TB2(S) are turned on by control with the control signal S, the tri-state inverters TB3(S') and TB4(S') are turned off by control with the control signal S' inverted to the control signal S.

In this case, the time code [x] for the x-th bit column and the time code [x+1] for the (x+1)-th bit column that are transferred on the time-code transfer 1-bit columns 441-(x+1) and 441-x are output, respectively, as the time code [x] for the x-th bit column and the time code [x+1] for the (x+1)-th bit column.

Meanwhile, when the tri-state inverters TB1 and TB2 are turned off by the control signal S, the tri-state inverters TB3 and TB4 are turned on.

In this case, the time code [x] for the x-th bit column and the time code [x+1] for the (x+1)-th bit column that are transferred on the time-code transfer 1-bit columns 441-(x+1) and 441-x are replaced and output, respectively, as the time code [x+1] for the (x+1)-th bit column and the time code [x] for the x-th bit column.

That is the replacement circuits 471 and 481 on the left of FIG. 14 have substantially the same functional configuration as the replacement circuits 471 and 481 on the right of FIG. 14 have. Note that the tri-state inverters TB1 to TB4 can be made smaller in impedance than the switches SW1 to SW4.

<10. Exemplary Specific Operation of Wiring Replacement Units (Part 1)>

Next, an exemplary specific operation of the wiring replacement units 101 and 103 will be described with reference to FIG. 15.

Figure 15:
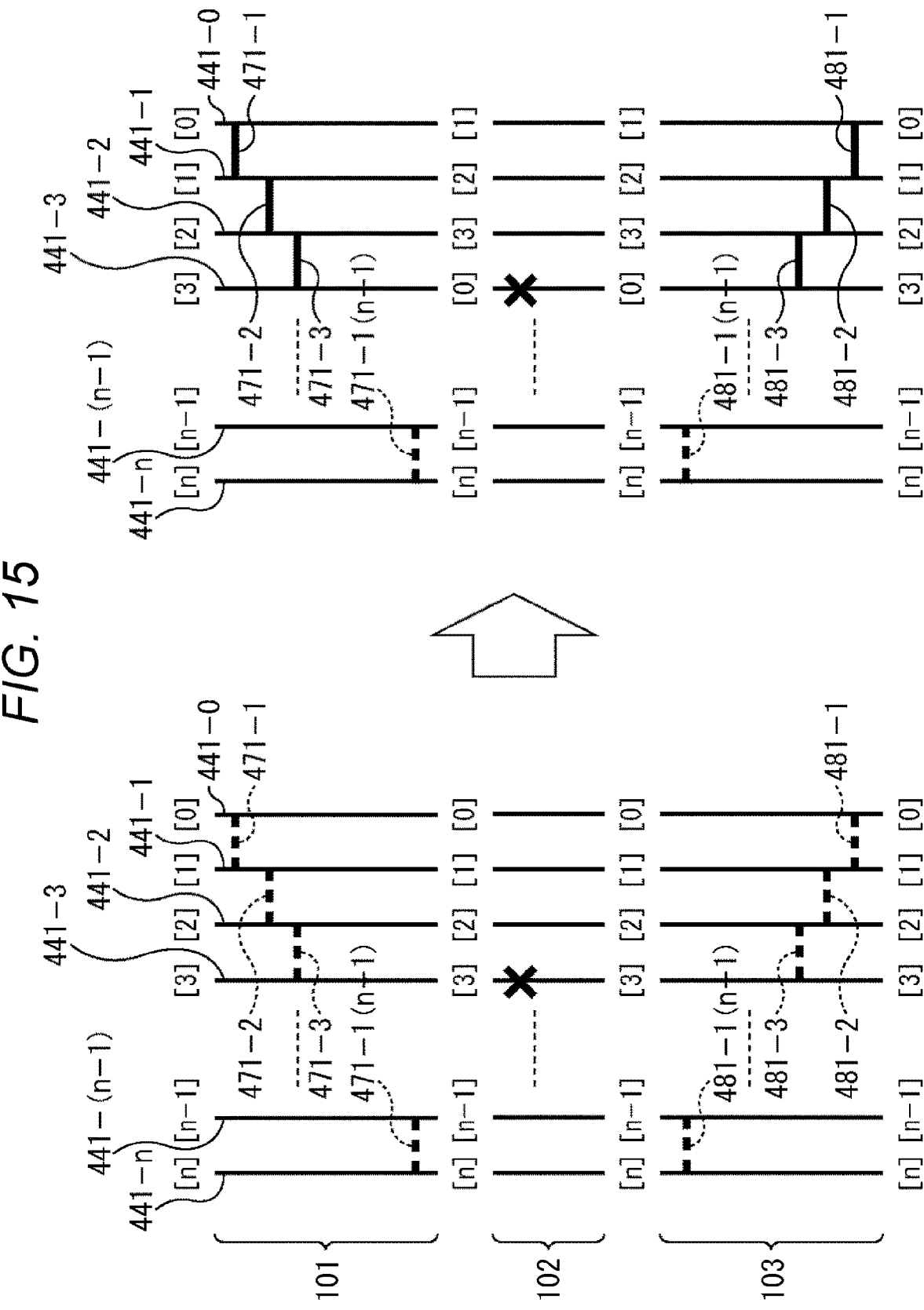
FIG. 15 is an explanatory diagram of a first exemplary specific operation of the wiring replacement units of FIG. 12.

On the left of FIG. 15, from top, the configuration of the wiring replacement unit 101, the configuration of the time-code input/output unit 102, and the configuration of the wiring replacement unit 103 are illustrated. In the wiring replacement unit 101, the time codes [0] to [n] in order from the right in the figure are input to the corresponding bit columns of the time-code transfer 1-bit columns 441-0 to 441-n. Furthermore, on the left of FIG. 15, any replacement circuits 471 and 481 indicated with dotted lines in the wiring replacement units 101 and 103 have not been replaced.

Furthermore, the wiring replacement unit 101 includes, from the right in the figure, the replacement circuits 471-1 to 471-n each provided between the corresponding time-code transfer 1-bit columns among the time-code transfer 1-bit columns 441-0 to 441-n.

Furthermore, similarly, the wiring replacement unit 103 includes, from the right in the figure, the replacement circuits 481-1 to 481-n each provided between the corresponding time-code transfer 1-bit columns among the time-code transfer 1-bit columns 441-0 to 441-n.

In such a configuration, a case where an error has occurred due to a cause of some kind as indicated with a cross mark in the fourth time-code transfer 1-bit column 441-3 from the right in the middle part on the left of FIG. 15 will be given. Here, the state of occurrence of an error indicates the state where a signal input to a time-code transfer 1-bit column 441 disagrees with the signal output therefrom.

In this case, the time code [3] that is transferred through the time-code transfer 1-bit column 441-3 cannot be transferred properly without any change. Thus, as illustrated on the right of FIG. 15, each of the replacement circuits 471-1 to 471-3 among the replacement circuits 471-1 to 471-*n* in the wiring replacement unit 101 is controlled such that the time codes that are transferred through the adjacent time-code transfer 1-bit columns 441 are allowed to be replaced. On the right of FIG. 15, each of the replacement circuits 471 and 481 indicated with solid lines indicates that the time codes that are transferred through the adjacent time-code transfer 1-bit columns 441 are allowed to be replaced.

That is the time code [0] of the time-code transfer 1-bit column 441-0 is transferred to the time-code transfer 1-bit column 441-1 and the time code [1] of the time-code transfer 1-bit column 441-1 is transferred to the time-code transfer 1-bit column 441-0 by the replacement circuit 471-1, so that the transfer codes [0] and [1] are replaced.

After that, the time code [0] of the time-code transfer 1-bit column 441-1 is transferred to the time-code transfer 1-bit column 441-2 and the time code [2] of the time-code transfer 1-bit column 441-1 is transferred to the time-code transfer 1-bit column 441-1 by the replacement circuit 471-2, so that the transfer codes [0] and [2] are replaced.

Moreover, after that, the time code [0] of the time-code transfer 1-bit column 441-2 is transferred to the time-code transfer 1-bit column 441-3 and the time code [3] of the time-code transfer 1-bit column 441-3 are transferred to the time-code transfer 1-bit column 441-2 by the replacement circuit 471-3, so that the transfer codes [0] and [3] are replaced.

Therefore, as illustrated in the middle part on the right of FIG. 15, in the time-code input/output unit 102, the time code [0] regarded as lowest in priority is transferred through the time-code transfer 1-bit column 441-3 in which the error occurs. The other time codes [1] to [3] are transferred, respectively, through the time-code transfer 1-bit columns 441-0 to 441-2, in which no error has occurred, each time-code transfer 1-bit column being lower by 1 bit in order to the intended time-code transfer 1-bit column 441 for use in transfer.

Note that, if the time code is output with this arrangement, as illustrated in the middle part on the right of FIG. 15, the time codes [1] to [3] each shifted lower by 1-bit in order are output.

Thus, as illustrated in the lower part on the right of FIG. 15, each of the replacement circuits 481-1 to 481-3 of the wiring replacement unit 103 replaces the time codes of the time-code transfer 1-bit columns adjacent thereto among the time codes [0] to [3] of the time-code transfer 1-bit columns 441-0 to 441-3, to return the time codes to the original bit positions.

That is the time code [0] of the time-code transfer 1-bit column 441-3 is transferred to the time-code transfer 1-bit column 441-2 and the time code [3] of the time-code transfer 1-bit column 441-2 is transferred to the time-code transfer 1-bit column 441-3 by the replacement circuit 481-3, so that the transfer codes [0] and [3] are replaced.

After that, the time code [0] of the time-code transfer 1-bit column 441-2 is transferred to the time-code transfer 1-bit column 441-1 and the time code [2] of the time-code transfer 1-bit column 441-1 is transferred to the time-code transfer 1-bit column 441-2 by the replacement circuit 481-2, so that the transfer codes [0] and [2] are replaced.

Moreover, after that, the time code [0] of the time-code transfer 1-bit column 441-1 is transferred to the time-code transfer 1-bit column 441-0 and the time code [1] of the time-code transfer 1-bit column 441-0 is transferred to the time-code transfer 1-bit column 441-1 by the replacement circuit 481-1, so that the transfer codes [0] and [1] are replaced.

Therefore, as illustrated in the lower part on the right of FIG. 15, the time code [0] regarded as lowest in priority is transferred through the time-code transfer 1-bit column 441-3, in which the error occurs, in the time-code input/output unit 102 and then is output from the original time-code transfer 1-bit column 441-0 through the wiring replacement unit 103. The other time codes [1] to [3] are transferred, respectively, through the time-code transfer 1-bit columns 441-0 to 441-2, in which no error has occurred, each time-code transfer 1-bit column being lower by 1 bit in order to the intended time-code transfer 1-bit column 441 for use in transfer. After that, the time codes [1] to [3] are output, respectively, from the original time-code transfer 1-bit columns 441-1 to 441-3 through the wiring replacement unit 103.

Due to a series of operations of the wiring replacement units 101 and 103 described above, the time code for the bit column [0] regarded as lowest in priority is transferred through the time-code transfer 1-bit column 441-3, in which the error occurs, in the time-code input/output unit 102 and then is output from the original time-code transfer 1-bit column 441-0 through the wiring replacement unit 103. Furthermore, the time codes for the other bit columns [1] to [3] are transferred, respectively, through the time-code transfer 1-bit columns 441-0 to 441-2 for the bit columns [0] to [2] in the time-code input/output unit 102, each time-code transfer 1-bit column being lower by 1 bit in order to the intended time-code transfer 1-bit column 441 for use in transfer. Then, the time codes for the bit columns [1] to [3] are output, respectively, from the original time-code transfer 1-bit columns 441-1 to 441-3 through the wiring replacement unit 103.

That is the wiring replacement unit 101 performs control such that the time code for the least significant bit column, lowest in priority, is allocated to the time-code transfer 1-bit column 441 in which the error has occurred and the time codes for the other bit columns are allocated to the time-code transfer 1-bit columns 441 in which no error has occurred, namely, the time-code transfer 1-bit columns 441 being lower by 1 bit in order, in the time-code input/output unit 102.

Then, the wiring replacement unit 103 performs control such that the time code for each bit in the time-code input/output unit 102 is allocated so as to return to the time-code transfer 1-bit column 441 for the original bit column.

As a result, the time code for the bit column low in priority is transferred through the time-code transfer 1-bit column 441 in which the error has occurred and the time codes for the other bit columns relatively high in priority are transferred through the time-code transfer 1-bit columns 441 in which no error has occurred, in the time-code input/output unit 102.

This arrangement enables, even if an error occurs in the time-code transfer 1-bit columns 441 due to a cause of some kind, transfer of the time code with no large deterioration in accuracy and without preparation of a spare time-code transfer 1-bit column 441 against occurrence of an error. In particular, this effect is notable in a case where a large number of time-code transfer units are provided.

Note that the example in which the time code for the least significant bit column is output through the time-code transfer 1-bit column 441 in which the error has occurred, has been given above. Alternatively, wiring may be replaced such that the time code for the bit column lowest in priority or the time code for a bit column low in priority pursuant thereto is output through the time-code transfer 1-bit column 441 in which the error has occurred.

<11. Exemplary Specific Operation of Wiring Replacement Units (Part 2)>

The case where an error has occurred in one of the time-code transfer 1-bit columns 441 has been exemplarily described above. As a solution for a case where errors have occurred one-to-one in a plurality of columns, a number of wiring replacement units 101 in tandem and a number of wiring replacement units 103 in tandem, the numbers of which correspond to the number of columns to be solved, are only required to be provided.

Thus, next, an exemplary specific operation of two wiring replacement units 101 in tandem and two wiring replacement units 103 in tandem in a case where errors have occurred one-to-one in two time-code transfer 1-bit columns 441, will be described with reference to FIG. 16.

Figure 16:
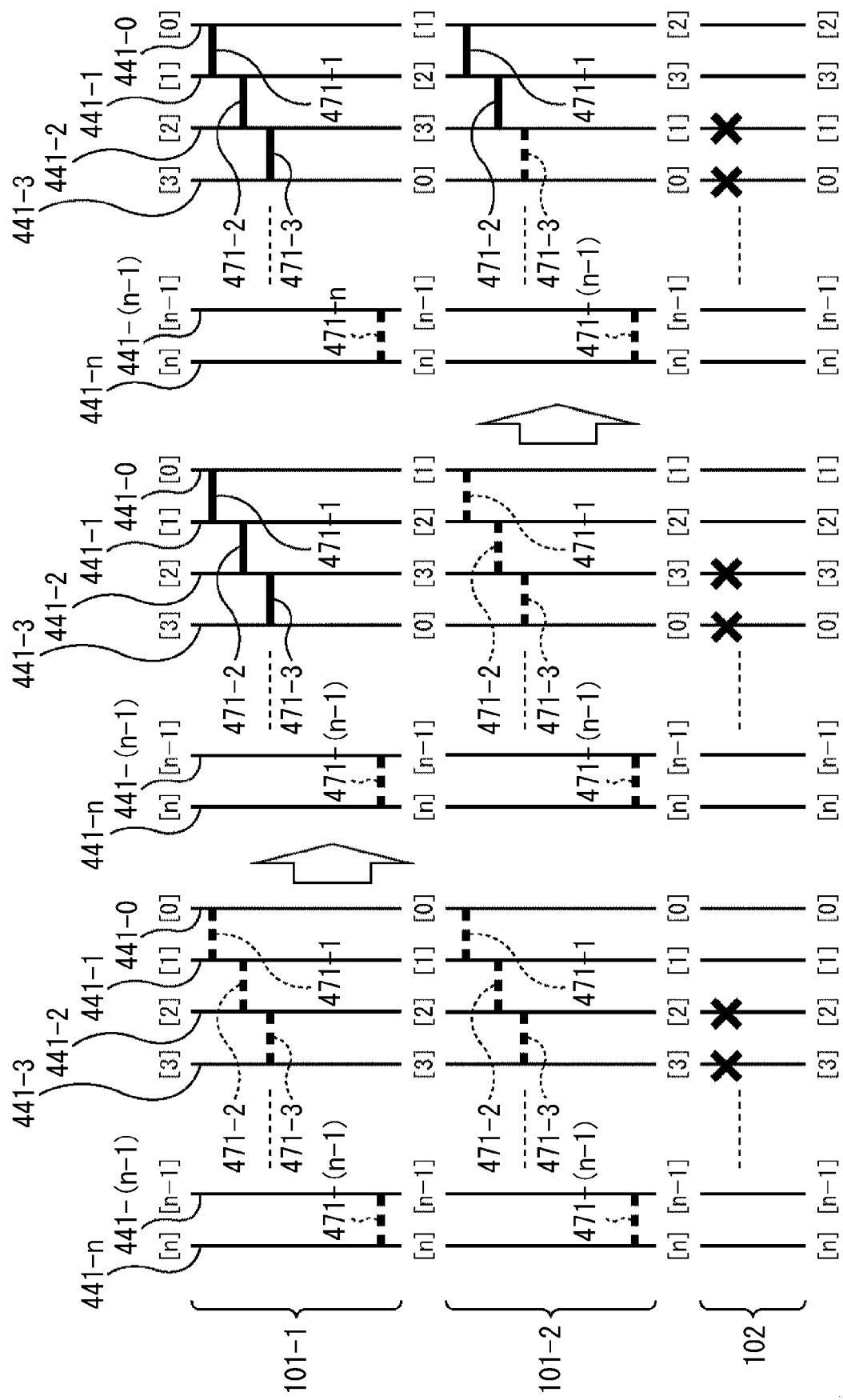
FIG. 16 is an explanatory diagram of a second exemplary specific operation of the wiring replacement units of FIG. 12.

In the upper part of FIG. 16, the wiring configuration of the replacement circuits 471-1 to **471-*n* in the first wiring replacement unit 101-1 is illustrated. In the middle part of FIG. 16, the wiring configuration of the replacement circuits 471-1 to 471-*n* in the second wiring replacement unit 101-2** is illustrated.

Furthermore, in the lower part of FIG. 16, the configuration inside the time-code input/output unit 102 is illustrated.

As illustrated at the lower left of FIG. 16, a case where errors have occurred in the time-code transfer 1-bit columns 441-2 and 441-3 in the time-code input/output unit 102 will be given.

In this case, first, as illustrated in the upper middle part of FIG. 16, the replacement circuits 471-1 to 471-3 in the first wiring replacement unit 101-1 are each controlled such that the time codes between the adjacent time-code transfer 1-bit columns 441 are replaced. That is, in the upper middle part of FIG. 16, the replacement circuits 471-1 to 471-3 of the first wiring replacement unit 101-1 are indicated with solid lines. Note that, herein, as illustrated at the center of FIG. 16, the replacement circuits 471-1 to 471-3 of the second wiring replacement unit 101-2 are indicated with dotted lines because replacement is not allowed.

This arrangement causes, as illustrated in the lower middle part of FIG. 16, allocation of the time code [0] to the time-code transfer 1-bit column 441-3 and allocation of the time codes [1] to [3] shifted lower by 1-bit in order, respectively, to the time-code transfer 1-bit column 441-0 to 441-2, as described with reference to FIG. 15.

Next, as illustrated in the middle right part of FIG. 16, the replacement circuits 471-1 and 471-2 in the second wiring replacement unit 101-2 are each controlled such that the time codes between the adjacent time-code transfer 1-bit columns 441 are replaced.

This arrangement causes, as illustrated in the lower right part of FIG. 16, allocation of the time code [1] to the time-code transfer 1-bit column 441-2 and allocation of the time codes [1] and [2] further shifted lower by 1-bit in order, respectively, to the time-code transfer 1-bit column 441-0 and 441-1.

As a result, as illustrated in the lower right part of FIG. 16, the time code [0] for the least significant bit and the time code [1] for the bit second lowest in order, relatively low in priority, are allocated, respectively, to the time-code transfer 1-bit columns 441-3 and 441-2 in which the errors have occurred.

After that, if any change is not made, the respective bit positions of the time codes [0] to [4] remain shifted. Thus, as described with reference to FIG. 15, processing reverse to the replacement processing in the wiring replacement units 101-1 and 101-2 is performed to return the time codes [0] to [4] to the original bit positions, in the wiring replacement units 103-1 and 103-2 (not illustrated).

The processing of returning to the original bit positions by the wiring replacement units 103-1 and 103-2 (not illustrated) is reverse to the processing described with reference to FIG. 16. With reference to FIG. 15, the processing in the single wiring replacement unit 103 and the substantial processing are repeated. Thus, the description thereof will be omitted.

Note that, in a case where errors for 2 bits or more occur, provision of a larger number of wiring replacement units 101 in tandem and a larger number of wiring replacement units 103 in tandem enables the case to be coped with.

<12. Exemplary Configurations of Determination Circuit and ERR-Information Storage Latch>

Next, exemplary configurations of a determination circuit 421 and an ERR-information storage latch 422 will be described with reference to FIG. 12.

The determination circuit 421 includes a switch 491, inverters 492 to 494, AND circuits 495 and 496, and an OR circuit 497. Furthermore, the ERR-information storage latch 422 includes a flip-flop circuit.

The switch 491 selects Hi or Low that is set in advance as an expected value, to output the expected value to the inverter 492.

The inverter 492 outputs the inverted signal of the expected value supplied from the switch 491, to the inverter 493 and the AND circuit 496.

The inverter 493 outputs the inverted signal of the output of the inverter 492 to the AND circuit 495. That is the inverter 493 outputs the expected value itself to the AND circuit 495.

The inverter 494 outputs the inverted signal of the transfer result REP_out of the time-code transfer 1-bit column (Bit_n) **441-*n* to the AND circuit 495**.

The AND circuit 495 outputs the AND of the respective output signals of the inverters 493 and 494 to the OR circuit 497. That is the AND circuit 495 outputs a Hi signal when the expected value and the inverted signal of the transfer result REP_out agree with each other.

The AND circuit 496 outputs, to the OR circuit 497, the logical result of AND of the transfer result REP_out of the time-code transfer 1-bit column (Bit_n) **441-*n* and the output signal of the inverter 492. That is the AND circuit 496** outputs a Hi signal when the inverted signal of the expected value and the transfer result REP_out agree with each other.

The OR circuit 497 outputs the logical result of OR of the respective output signals of the AND circuits 495 and 496 to the ERR-information storage latch 422 including the flip-flop circuit such that the logical result of OR is latched as ERR information.

Figure 17:
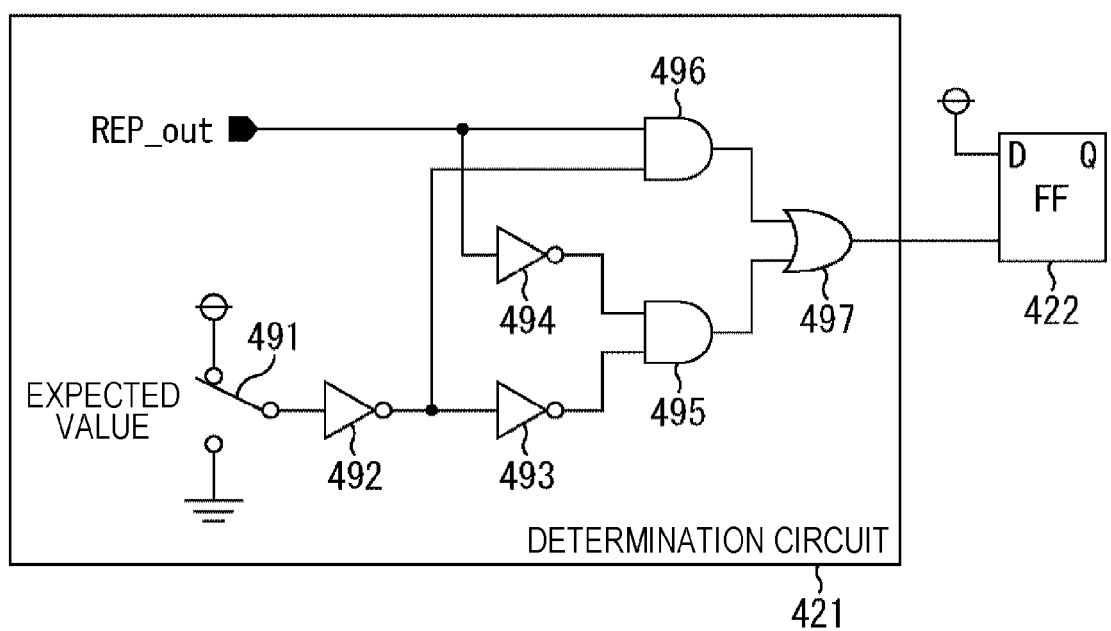
FIG. 17 is an explanatory diagram of an exemplary configuration of a determination circuit and an ERR-information storage latch of FIG. 12.

With such a configuration as in FIG. 17, the determination circuit 421 outputs Low when the expected value and the transfer result REP_out of the time-code transfer 1-bit column (Bit_n) **441-*n* agree with each other. Meanwhile, the determination circuit 421** outputs Hi when the expected value and the transfer result REP_out of the time-code transfer 1-bit column (Bit_n) 441-*n* disagree with each other.

Then, the determination result of the OR circuit 497 is latched in the ERR-information storage latch 422.

<13. Failure Detection/Relief Processing (Part 1)>

Figure 18:
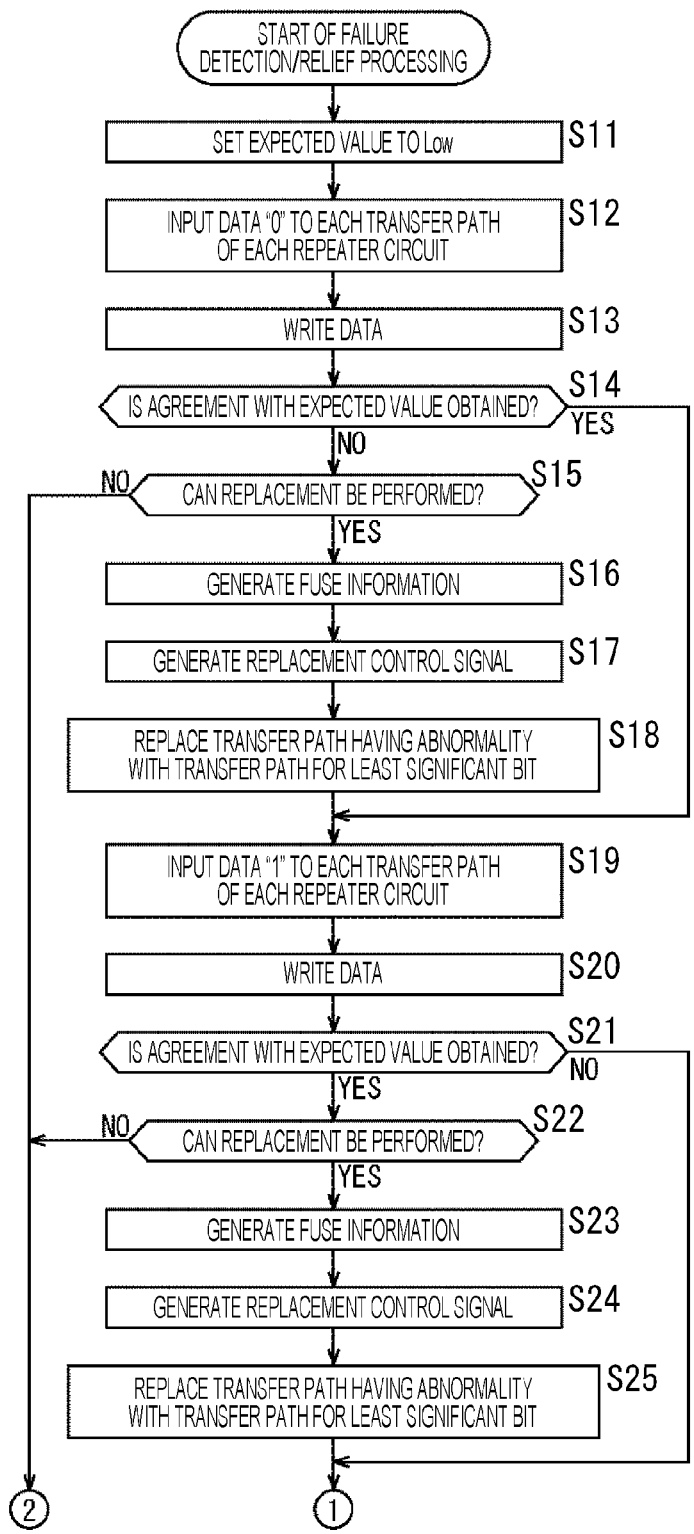
FIG. 18 is an explanatory flowchart of first failure detection/relief processing with the time-code transfer unit of FIG. 12.

Next, failure detection/relief processing will be described with reference to the flowcharts of FIGS. 18 and 19. Note that the failure detection/relief processing to be described herein enables relief up to 1 bit that is detected in the transfer paths but is not available to relief of 2 bits or more because of a single wiring replacement unit 101 and a single wiring replacement unit 103.

In step S11 (FIG. 18), the controller 29 controls the switch 491 of the determination circuit 421 for each bit such that the expected value is set to Low.

In step S12, on the basis of an operation instruction in test mode, the controller 29 controls the data-line selection-signal generation circuit 413 such that the replacement circuits 471-1 to 471-*n* in the wiring replacement unit 101 and the replacement circuits 481-1 to 481-*n* in the wiring replacement unit 103 do not perform replacement between the adjacent time-code transfer 1-bit columns (Bit_0) 441.

Then, on the basis of an operation instruction in test mode, the controller 29 controls the time-code generation unit 26 such that the data for each bit of the time code, set to 0, is output to the corresponding transfer path among the respective transfer paths of the time-code transfer 1-bit column (Bit_0) 441-0 to the time-code transfer 1-bit column (Bit_n) 441-*n*.

In step S13, the FF circuits 201-1 to 201-N and the FF circuits 203-1 to 203-N included in the respective transfer paths of the time-code transfer 1-bit column (Bit_0) 441-0 to the time-code transfer 1-bit column (Bit_n) 441-*n* sequentially repeat processing of writing the time code in the latch for each bit in the signal storage unit 72 of the data storage unit 52 and additionally transfer the time code, so that the transfer results REP_out0 to REP_outn are output to the determination circuits 421-0 to 421-*n* for the bits.

In step S14, the controller 29 controls the determination circuit 421 for each bit to determine whether or not the expected value and the transfer result agree with each other and to store the determination result in the ERR-information storage latch 422. Herein, because the expected value for each bit is Low, each of the transfer results REP_out0 to REP_outn for the bits of the time code is correct to be 0. Thus, in a case where disagreement occurs (in a case where any of REP_out0 to REP_outn is 1), it is determined that abnormality has occurred on a transfer path included in the time-code transfer 1-bit column (Bit_0) 441-0 to the time-code transfer 1-bit column (Bit_n) 441-*n*. The processing proceeds to step S15.

In step S15, the controller 29 determines whether or not the abnormality in the time-code transfer 1-bit columns 441 is 1 bit (not 2 bits or more) and replacement can be performed by the replacement circuits 471 and 481. More specifically, the controller 29 reads out the FUSE information stored in the FUSE circuit 412 and determines whether replacement can be performed on the basis of a bit length of transfer path in which the error has already occurred and the abnormality detected in the time-code transfer 1-bit columns 441. Herein, because the single wiring replacement unit 101 and the single wiring replacement unit 103 are provided, a replaceable bit length is 1 bit. For example, in a case where a bit length of time-code transfer 1-bit column 441 having abnormality is 1 bit, namely, a bit length of time-code transfer 1-bit column 441 having abnormality is not 2 bits or more, it is determined that replacement can be performed. The processing proceeds to step S16.

In step S16, the controller 29 supplies address information to the ERR-information storage latch 422 to supply ERR information including bit information regarding the error having occurred to the FUSE-information generation circuit 423. On the basis of the ERR information, the FUSE-information generation circuit 423 generates FUSE information indicating the transfer path in which the error has occurred. The FUSE-information generation circuit 423 stores the FUSE information in the FUSE circuit 412 and additionally notifies the control-signal generation circuit 411 of the occurrence of the error.

In step S17, the control-signal generation circuit 411 generates a replacement control signal and notifies the data-line selection-signal generation circuit 413 of the replacement control signal.

In step S18, on the basis of the FUSE information stored in the FUSE circuit 412, the data-line selection-signal generation circuit 413 with the replacement control signal controls the wiring replacement units 101 and 103. As described with reference to FIG. 15, the replacement circuits 471 and 481 in the wiring replacement units 101 and 103 are controlled such that the transfer path in which the error has occurred is replaced with the transfer path of the time-code transfer 1-bit column 441 for the least significant bit in the time-code input/output unit 102 among the time-code transfer 1-bit column (Bit_0) 441-0 to the time-code transfer 1-bit column (Bit_n) 441-*n*, resulting in reconfiguration of a transfer path.

Note that, in step S14, in a case where the expected value and the transfer result REP_out agree with each other, no abnormality is detected. Thus, the processing in steps S15 and S18 is skipped.

In step S19, on the basis of an operation instruction in test mode, the controller 29 controls the data-line selection-signal generation circuit 413 such that the replacement circuits 471-1 to 471-*n* in the wiring replacement unit 101 and the replacement circuits 481-1 to 481-*n* in the wiring replacement unit 103 do not perform replacement between the adjacent time-code transfer 1-bit columns (Bit_0) 441.

Then, on the basis of an operation instruction in test mode, the controller 29 controls the time-code generation unit 26 such that the data for each bit of the time code, set to 1, is output to the corresponding transfer path among the respective transfer paths of the time-code transfer 1-bit column (Bit_0) 441-0 to the time-code transfer 1-bit column (Bit_n) 441-*n*.

In step S20, the FF circuits 201-1 to 201-N and the FF circuits 203-1 to 203-N included in the respective transfer paths of the time-code transfer 1-bit column (Bit_0) 441-0 to the time-code transfer 1-bit column (Bit_n) 441-*n* sequentially repeat processing of writing the time code in the signal storage unit 72 of the data storage unit 52 and additionally transfer the time code, so that the transfer result REP_out is output to the determination circuit 421 for each bit.

In step S21, the controller 29 controls the determination circuit 421 for each bit to determine whether or not the expected value and the transfer result agree with each other and to store the determination result in the ERR-information storage latch 422. Herein, because the expected value for each bit is Low, each of the transfer results REP_out0 to REP_outn for the bits of the time code is correct to be 1. Thus, in a case where agreement occurs (in a case where any of REP_out0 to REP_outn is 0), it is determined that abnormality has occurred on a transfer path included in the time-code transfer 1-bit column (Bit_0) 441-0 to the time-code transfer 1-bit column (Bit_n) 441-n. The processing proceeds to step S22.

In step S22, the controller 29 determines whether or not the abnormality in the time-code transfer 1-bit columns 441 is 1 bit (not 2 bits or more) and replacement can be performed by the replacement circuits 471 and 481. More specifically, the controller 29 reads out the FUSE information stored in the FUSE circuit 412 and determines whether replacement can be performed on the basis of a bit length of transfer path in which the error has already occurred and the abnormality detected in the time-code transfer 1-bit columns 441. Herein, because the single wiring replacement unit 101 and the single wiring replacement unit 103 are provided, a replaceable bit length is 1 bit. For example, in a case where a bit length of time-code transfer 1-bit column 441 having abnormality is 1 bit, namely, a bit length of time-code transfer 1-bit column 441 having abnormality is not 2 bits or more, it is determined that replacement can be performed. The processing proceeds to step S23.

In step S23, the controller 29 supplies address information to the ERR-information storage latch 422 to supply ERR information including bit information regarding the error having occurred to the FUSE-information generation circuit 423. On the basis of the ERR information, the FUSE-information generation circuit 423 generates FUSE information indicating the transfer path in which the error has occurred. The FUSE-information generation circuit 423 stores the FUSE information in the FUSE circuit 412 and additionally notifies the control-signal generation circuit 411 of the occurrence of the error.

In step S24, the control-signal generation circuit 411 generates a replacement control signal and notifies the data-line selection-signal generation circuit 413 of the replacement control signal.

In step S25, on the basis of the FUSE information stored in the FUSE circuit 412, the data-line selection-signal generation circuit 413 with the replacement control signal controls the wiring replacement units 101 and 103. As described with reference to FIG. 15, the replacement circuits 471 and 481 in the wiring replacement units 101 and 103 are controlled such that the transfer path in which the error has occurred is replaced with the transfer path of the time-code transfer 1-bit column 441 for the least significant bit in the time-code input/output unit 102 among the time-code transfer 1-bit column (Bit_0) 441-0 to the time-code transfer 1-bit column (Bit_n) 441-n, resulting in reconfiguration of a transfer path.

Note that, in step S21, in a case where the expected value and the transfer result REP_out disagree with each other, no abnormality is detected. Thus, the processing in steps S22 to S25 is skipped.

In step S26 (FIG. 19), the controller 29 controls the switch 491 of the determination circuit 421 for each bit such that the expected value is set to Hi.

In step S27, on the basis of an operation instruction in test mode, the controller 29 controls the time-code generation unit 26 such that the data for each bit of the time code, set to 0, is output to the corresponding transfer path among the respective transfer paths of the time-code transfer 1-bit column (Bit_0) 441-0 to the time-code transfer 1-bit column (Bit_n) 441-n.

In step S28, the FF circuits 201-1 to 201-N and the FF circuits 203-1 to 203-N included in the respective transfer paths of the time-code transfer 1-bit column (Bit_0) 441-0 to the time-code transfer 1-bit column (Bit_n) 441-n sequentially repeat processing of writing the time code in the signal storage unit 72 of the data storage unit 52.

In step S29, the FF circuits 201-1 to 201-N and the FF circuits 203-1 to 203-N included in the respective transfer paths of the time-code transfer 1-bit column (Bit_0) 441-0 to the time-code transfer 1-bit column (Bit_n) 441-n sequentially repeat processing of reading out the data of the time code latched from the signal storage unit 72 of the data storage unit 52 and additionally transfer the time code, so that the transfer result REP_out is output to the determination circuit 421 for each bit.

In step S30, the controller 29 controls the determination circuit 421 for each bit to determine whether or not the expected value and the transfer result agree with each other and to store the determination result in the ERR-information storage latch 422. Herein, because the expected value for each bit is Hi, each of the transfer results REP_out0 to REP_outn for the bits of the time code is correct to be 0. Thus, in a case where agreement occurs (in a case where any of REP_out0 to REP_outn is 1), it is determined that abnormality has occurred in the bit in the signal storage unit 72 of the data storage unit 52 corresponding to a transfer path included in the time-code transfer 1-bit column (Bit_0) 441-0 to the time-code transfer 1-bit column (Bit_n) 441-n. The processing proceeds to step S31.

In step S31, the controller 29 determines whether or not the abnormality in the time-code transfer 1-bit columns 441 is 1 bit (not 2 bits or more) and replacement can be performed by the replacement circuits 471. More specifically, the controller 29 reads out the FUSE information stored in the FUSE circuit 412 and determines whether replacement can be performed on the basis of a bit length of transfer path in which the error has already occurred and the abnormality detected in the time-code transfer 1-bit columns 441. Herein, because the single wiring replacement unit 101 and the single wiring replacement unit 103 are provided, a replaceable bit length is 1 bit. For example, in a case where a bit length of time-code transfer 1-bit column 441 having abnormality is 1 bit, it is determined that replacement can be performed. The processing proceeds to step S32.

In step S32, the controller 29 supplies address information to the ERR-information storage latch 422 to supply ERR information including bit information regarding the error having occurred to the FUSE-information generation circuit 423. On the basis of the ERR information, the FUSE-information generation circuit 423 generates FUSE information indicating the transfer path in which the error has occurred. The FUSE-information generation circuit 423 stores the FUSE information in the FUSE circuit 412 and additionally notifies the control-signal generation circuit 411 of the occurrence of the error.

In step S33, the control-signal generation circuit 411 generates a replacement control signal and notifies the data-line selection-signal generation circuit 413 of the replacement control signal.

In step S33, on the basis of the FUSE information stored in the FUSE circuit 412, the data-line selection-signal generation circuit 413 with the replacement control signal controls the wiring replacement units 101 and 103. As described with reference to FIG. 15, the replacement circuits 471 and 481 in the wiring replacement units 101 and 103 are controlled such that the transfer path in which the error has occurred is replaced with the transfer path of the time-code transfer 1-bit column 441 for the least significant bit in the time-code input/output unit 102 among the time-code transfer 1-bit column (Bit_0) 441-0 to the time-code transfer 1-bit column (Bit_n) 441-*n*, resulting in reconfiguration of a transfer path.

Note that, in step S30, in a case where the expected value and the transfer result REP_out agree with each other, no abnormality is detected. Thus, the processing in steps S31 and S34 is skipped.

In step S35, on the basis of an operation instruction in test mode, the controller 29 controls the time-code generation unit 26 such that the data for each bit of the time code, set to 1, is output to the corresponding transfer path among the respective transfer paths of the time-code transfer 1-bit column (Bit_0) 441-0 to the time-code transfer 1-bit column (Bit_n) 441-*n*.

In step S36, the FF circuits 201-1 to 201-N and the FF circuits 203-1 to 203-N included in the respective transfer paths of the time-code transfer 1-bit column (Bit_0) 441-0 to the time-code transfer 1-bit column (Bit_n) 441-*n* sequentially repeat processing of writing the time code in the signal storage unit 72 of the data storage unit 52.

In step S37, the FF circuits 201-1 to 201-N and the FF circuits 203-1 to 203-N included in the respective transfer paths of the time-code transfer 1-bit column (Bit_0) 441-0 to the time-code transfer 1-bit column (Bit_n) 441-*n* sequentially repeat processing of reading out the data of the time code latched from the signal storage unit 72 of the data storage unit 52 and additionally transfer the time code, so that the transfer result REP_out is output to the determination circuit 421 for each bit.

In step S38, the controller 29 controls the determination circuit 421 for each bit to determine whether or not the expected value and the transfer result agree with each other and to store the determination result in the ERR-information storage latch 422. Herein, because the expected value for each bit is Hi, each of the transfer results REP_out0 to REP_outn for the bits of the time code is correct to be 1. Thus, in a case where disagreement occurs (in a case where any of REP_out0 to REP_outn is 0), it is determined that abnormality has occurred in the bit in the signal storage unit 72 of the data storage unit 52 corresponding to a transfer path included in the time-code transfer 1-bit column (Bit_0) 441-0 to the time-code transfer 1-bit column (Bit_n) 441-*n*. The processing proceeds to step S39.

In step S39, the controller 29 determines whether or not the abnormality in the time-code transfer 1-bit columns 441 is 1 bit (not 2 bits or more) and replacement can be performed by the replacement circuits 471. More specifically, the controller 29 reads out the FUSE information stored in the FUSE circuit 412 and determines whether replacement can be performed on the basis of a bit length of transfer path in which the error has already occurred and the abnormality detected in the time-code transfer 1-bit columns 441. Herein, because the single wiring replacement unit 101 and the single wiring replacement unit 103 are provided, a replaceable bit length is 1 bit. For example, in a case where a bit length of time-code transfer 1-bit column 441 having abnormality is 1 bit, it is determined that replacement can be performed. The processing proceeds to step S40.

In step S40, the controller 29 supplies address information to the ERR-information storage latch 422 to supply ERR information including bit information regarding the error having occurred to the FUSE-information generation circuit 423. On the basis of the ERR information, the FUSE-information generation circuit 423 generates FUSE information indicating the transfer path in which the error has occurred. The FUSE-information generation circuit 423 stores the FUSE information in the FUSE circuit 412 and additionally notifies the control-signal generation circuit 411 of the occurrence of the error.

In step S41, the control-signal generation circuit 411 generates a replacement control signal and notifies the data-line selection-signal generation circuit 413 of the replacement control signal.

In step S42, on the basis of the FUSE information stored in the FUSE circuit 412, the data-line selection-signal generation circuit 413 with the replacement control signal controls the wiring replacement units 101 and 103. As described with reference to FIG. 15, the replacement circuits 471 and 481 in the wiring replacement units 101 and 103 are controlled such that the transfer path in which the error has occurred is replaced with the transfer path of the time-code transfer 1-bit column 441 for the least significant bit in the time-code input/output unit 102 among the time-code transfer 1-bit column (Bit_0) 441-0 to the time-code transfer 1-bit column (Bit_n) 441-*n*, resulting in reconfiguration of a transfer path.

Note that, in step S38, in a case where the expected value and the transfer result REP_out agree with each other, no abnormality is detected. Thus, the processing in steps S39 and S42 is skipped.

In step S43, the controller 29 causes specification of the FUSE information stored in the FUSE circuit 412.

Note that, in steps S15, S22, S31, and S39, in a case where the detected abnormality has a bit length of 2 bits or more, the time-code transfer unit 23 is not available because of the error. Thus, in step S44, the trouble flag is turned on and then the processing finishes. That is, in this case, the time-code transfer unit 23 has difficulty in functioning properly. Thus, the solid-state image pickup device 1 is processed as a defective.

Through the processing in steps S11 to S25 in the above processing, determined is the presence or absence of abnormality on the respective transfer paths through which the time code is transferred, set to the time-code transfer 1-bit column (Bit_0) 441-0 to the time-code transfer 1-bit column (Bit_n) 441-*n*. If a transfer path in which abnormality has occurred is detected, reconstructed is a transfer path resulting from replacement of the transfer path from which the abnormality is detected with the transfer path for the least significant bit.

In this case, because failure detection is performed with the generated time code being switched between 0 and 1, abnormality fixed to 0 or abnormality fixed to 1 on a transfer path can be individually detected.

Furthermore, through the processing in steps S26 to S42, determined is the presence or absence of abnormality in the latches, used in the signal storage unit 72 in the data storage unit 52, for the bits corresponding to the respective transfer paths through which the time code is transferred, set to the time-code transfer 1-bit column (Bit_0) 441-0 to the time-code transfer 1-bit column (Bit_n) 441-*n*. If a latch in which abnormality has occurred is detected, reconstructed is a latch corresponding to a transfer path resulting from replacement of the transfer path from which the abnormality is detected with the transfer path for the least significant bit.

In this case, because failure detection is performed with the generated time code being switched between 0 and 1, abnormality fixed to 0 or abnormality fixed to 1 on a transfer path can be individually detected.

That is, in the above processing, abnormality in the transfer paths and abnormality in the latches are individually determined. In a case where abnormality is detected in any thereof, the transfer path for the bit from which the abnormality is detected is replaced with the transfer path for the least significant bit and then a transfer path resulting from the replacement and the corresponding latch are used, resulting in reconstruction of a transfer path and a latch.

As a result, for example, execution of the above failure detection/relief processing before product shipment enables inhibition of a deterioration in yield, for example, due to a disconnection in the wiring of an image pickup element high in density, so that a reduction can be made in product cost.

Furthermore, for example, after product shipment, regular execution of the failure detection/relief processing described above in the product in use and replacement of transfer paths at the point in time when failure is detected enable an improvement in the durability of the product.

Moreover, the FUSE circuit 412 retains FUSE information in the solid-state image pickup device 1 as above. Alternatively, FUSE information only may be acquired as data at the time of product examination, and the data together with the chip may be shipped to a user. Then, the user may carry out circuit relief control.

Furthermore, for example, with the difference in priority between bits, each bit may be weighted in accordance with its priority, and a bit to be relieved may be limited to higher-order bits larger than a predetermined weight. Then, the transfer path for a higher-order bit in which failure has occurred may be replaced with the transfer path for a lower-order bit small in weight, namely, low in priority.

<14. Failure Detection/Relief Processing (Part 2)>

The failure detection/relief processing in a case where a single wiring replacement unit 101 and a single wiring replacement unit 103 are provided has been described above. As described with reference to FIG. 16, multiple wiring replacement units 101 in tandem and multiple wiring replacement units 103 in tandem may be provided. Thus, failure detection/relief processing in a case where a plurality of wiring replacement units 101 in tandem and a plurality of wiring replacement units 103 in tandem are provided will be described next with reference to the flowcharts of FIGS. 20 and 21.

Figure 19:
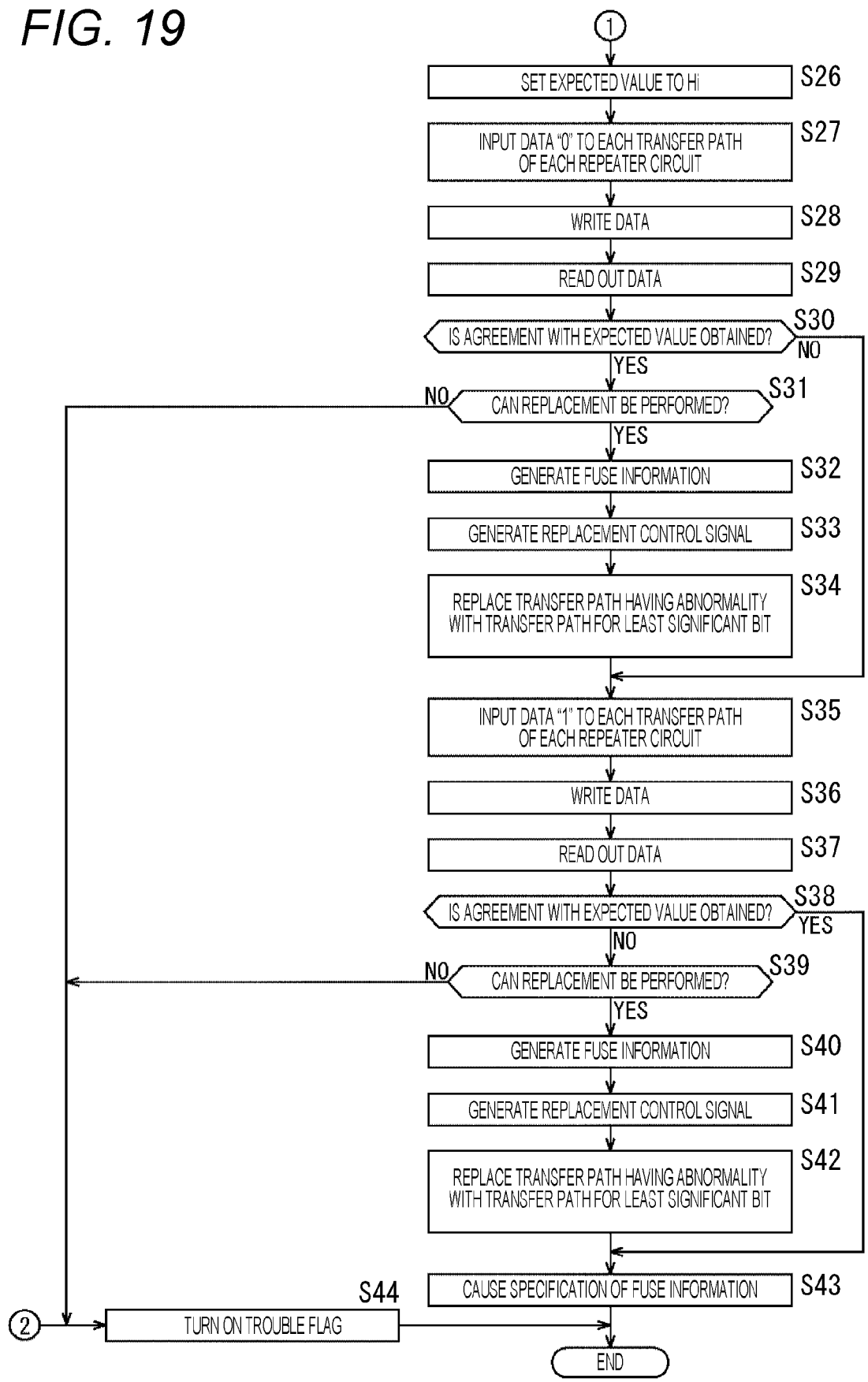
FIG. 19 is an explanatory flowchart of the first failure detection/relief processing with the time-code transfer unit of FIG. 12.
Figure 20:
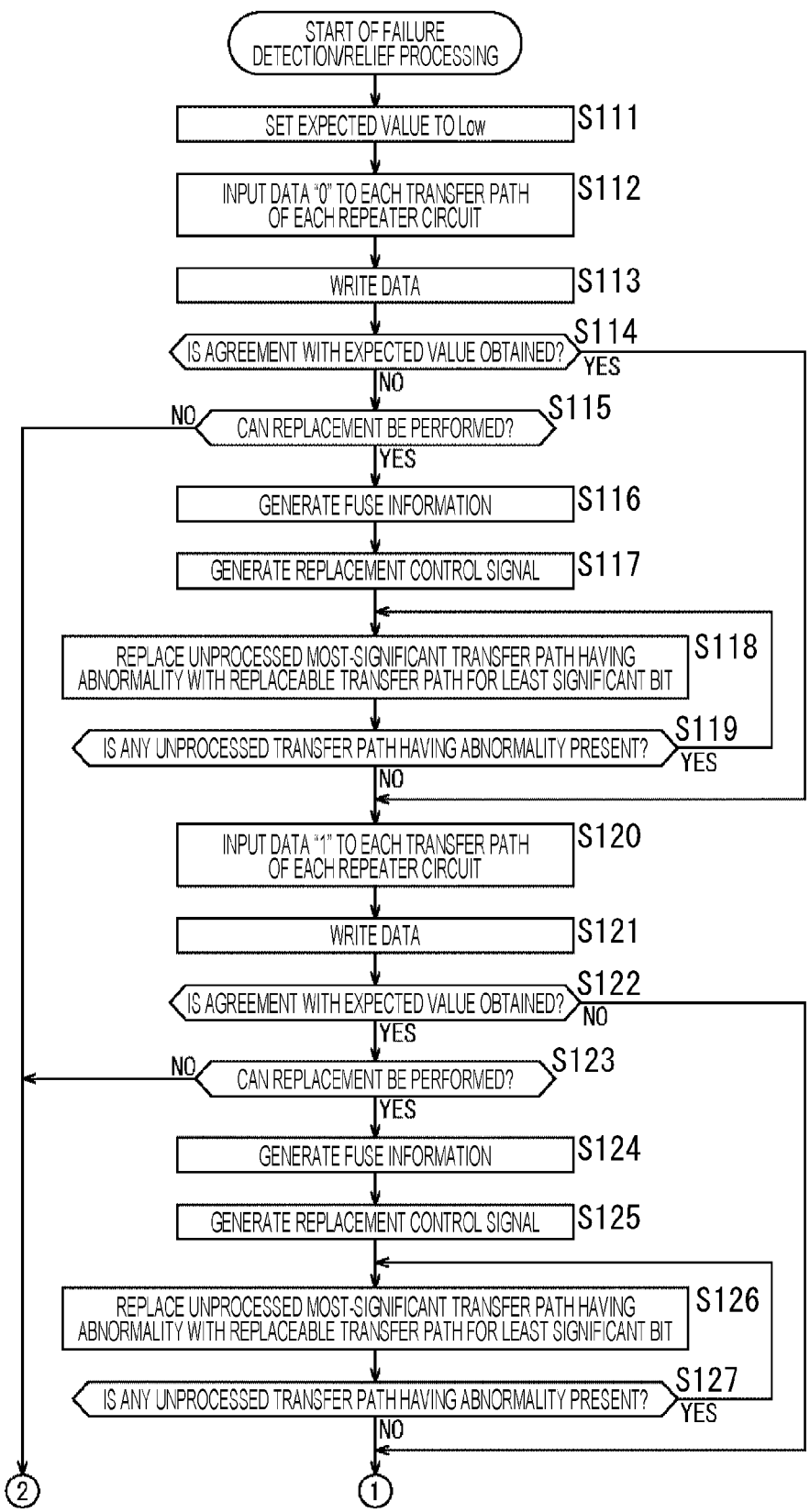
FIG. 20 is an explanatory flowchart of second failure detection/relief processing with the time-code transfer unit of FIG. 12.
Figure 21:
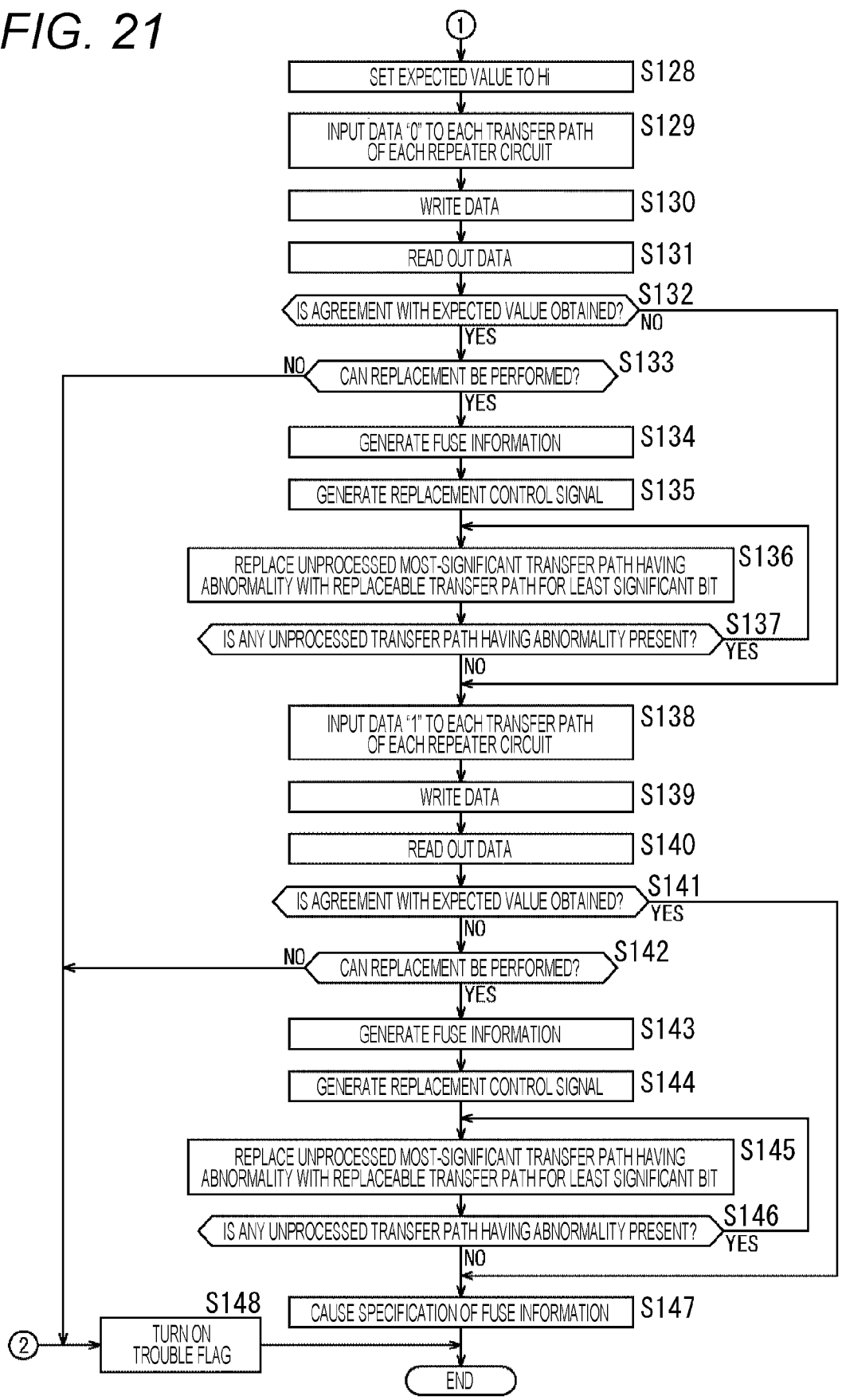
FIG. 21 is an explanatory flowchart of the second failure detection/relief processing with the time-code transfer unit of FIG. 12.

Note that the processing in steps S111 to S117, S120 to S125, S128 to S135, S138 to S144, S147, and S148 in the flowcharts of FIGS. 20 and 21 is similar to the processing in steps S11 to S17, S19 to S24, S26 to S33, S35 to S41, S43, and S44 in the flowcharts of FIGS. 19 and 20. Thus, the description thereof will be appropriately omitted.

That is, in the processing in steps S111 to S114 (FIG. 20), comparison with the expected value is performed. When the presence or absence of abnormality on the transfer paths is detected, the processing proceeds to step S115.

In step S115, on the basis of whether or not a bit length of time-code transfer 1-bit column having abnormality is not more than the respective numbers of wiring replacement units 101 and 103 in tandem, the controller 29 determines whether or not replacement can be performed by the replacement circuits 471 in the wiring replacement units 101 and the replacement circuits 481 in the wiring replacement units 103. More specifically, the controller 29 reads out the FUSE information stored in the FUSE circuit 412 and determines whether replacement can be performed on the basis of a bit length of transfer path in which an error has already occurred and the abnormality detected in the time-code transfer 1-bit columns 441. That is, for example, in a case where n number of wiring replacement units 101 in tandem and n number of wiring replacement units 103 in tandem are provided, a replaceable bit length is n bits. For example, in a case where a bit length of time-code transfer 1-bit column 441 having abnormality is n bits or less, it is determined that replacement can be performed. The processing proceeds to step S116.

In step S116, the controller 29 supplies address information to the ERR-information storage latch 422 to supply ERR information including bit information regarding the error having occurred to the FUSE-information generation circuit 423. On the basis of the ERR information, the FUSE-information generation circuit 423 generates FUSE information indicating the transfer paths in which the error has occurred. The FUSE-information generation circuit 423 stores the FUSE information in the FUSE circuit 412 and additionally notifies the control-signal generation circuit 411 of the occurrence of the error.

In step S117, the control-signal generation circuit 411 generates a replacement control signal and notifies the data-line selection-signal generation circuit 413 of the replacement control signal.

In step S118, on the basis of the FUSE information stored in the FUSE circuit 412, the data-line selection-signal generation circuit 413 with the replacement control signal controls the wiring replacement units 101 and 103 such that the transfer path for the most significant bit among the unprocessed transfer paths of the time-code transfer 1-bit columns (Bit_0) 441 from which the abnormality is detected is replaced with the replaceable transfer path for the least significant bit, resulting in reconfiguration of a transfer path.

In step S119, on the basis of the FUSE information stored in the FUSE circuit 412, the data-line selection-signal generation circuit 413 with the replacement control signal determines whether or not any transfer path having not been subjected to replacement to a lower-order bit is present among the transfer paths of the time-code transfer 1-bit columns (Bit_0) 441 from which the abnormality is detected.

In step S119, in a case where an unprocessed transfer path is present, the processing goes back to step S118, and similar processing is repeated.

Then, in step S119, in a case where replacement of all the transfer paths of the time-code transfer 1-bit columns (Bit_0) 441 from which the abnormality is detected, through the processing in step S118 has been completed, the processing proceeds to step S120.

Note that, in steps S123 to S127 (FIG. 20), S132 to S136 (FIG. 21), and steps S140 to S144 (FIG. 21), sequentially, repeated is processing of replacing the transfer path and latch for the most significant bit in order among the transfer paths of the time-code transfer 1-bit columns (Bit_0) 441 and the latches which from abnormality is detected in similar processing, respectively, with the replaceable transfer path and latch for the least significant bit.

In the above processing, abnormality in the transfer paths and abnormality in the latches are individually determined. In a case where abnormality is detected in any thereof, the plurality of transfer paths for a plurality of bits from which the abnormality is detected and the plurality of latches for a plurality of bits from which the abnormality is detected are replaced, respectively, with the plurality of transfer paths for lower-order bits and the plurality of latches for lower-order bits. A plurality of transfer paths resulting from the replacement and the corresponding latches are used, resulting in reconstruction of a plurality of transfer paths and latches.

As a result, for example, execution of the above failure detection/relief processing before product shipment enables inhibition of a deterioration in yield, for example, due to a disconnection in the wiring of an image pickup element high in density, so that a reduction can be made in product cost.

<15. Output of Transfer Path from Which Abnormality is Detected>

According to the above processing, for a transfer path and a latch from which abnormality is detected, use of the transfer path and the latch for a lower-order bit enables minimization of an error occurring in the signal through the transfer path and the latch from which the abnormality is detected.

Here, for example, in a case where a bit length of transfer path from which abnormality is detected is 1 bit, an abnormal signal is output only to the least significant bit. Thus, no noticeable error is generated on a displayed image.

However, in a case where a time-code transfer 1-bit column (Bit_0) 441 for 1 bit has broken down, a signal for the least significant bit with the time-code transfer 1-bit column (Bit_0) 441 as a transfer path does not vary. Thus, after CDS, the pixel value is fixed to 0.

This state is not noticeable in a display device for 8-bit display. However, in a case where a gain is applied for image enhancement, the pixel having the pixel value fixed to 0 is likely to be noticeable.

Thus, a signal of 0/1 may be randomly superimposed on the output signal for the least significant bit replaced with the time-code transfer 1-bit column (Bit_0) 441 from which the abnormality is detected.

This arrangement causes equivalent superimposition of noise onto the output signal, resulting in a state where no fixed pattern is viewed. Thus, the pixel with the least significant bit fixed to 0 can be prevented from being noticeable.

Figure 22:
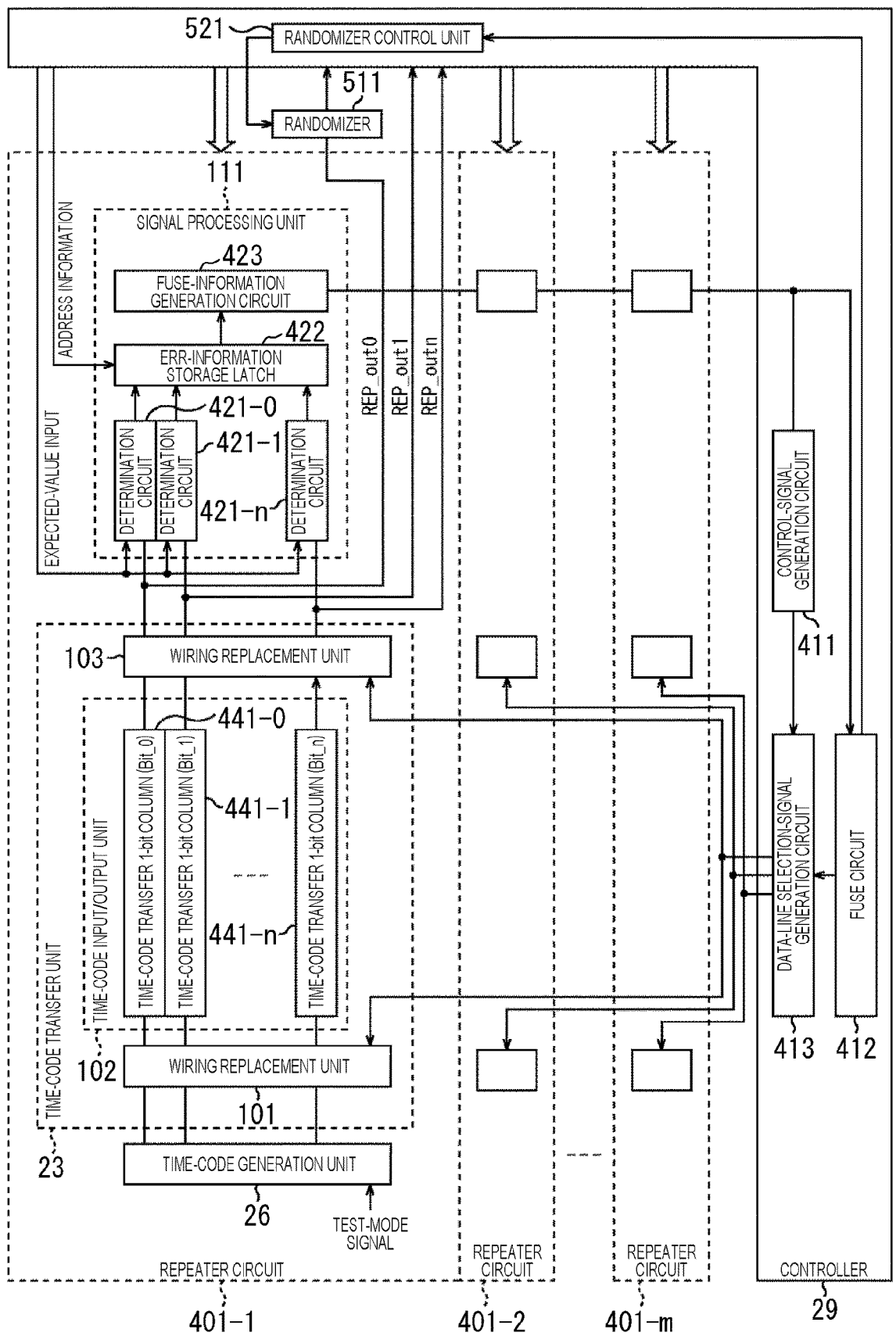
FIG. 22 is an explanatory diagram of a second exemplary detailed configuration for controlling the time-code transfer unit of the present disclosure.

FIG. 22 illustrates an exemplary detailed configuration for controlling time-code transfer units 23 such that a signal of 0/1 is randomly superimposed onto an output signal for the least significant bit replaced with a time-code transfer 1-bit column (Bit_0) 441 from which abnormality is detected.

Figure 12:
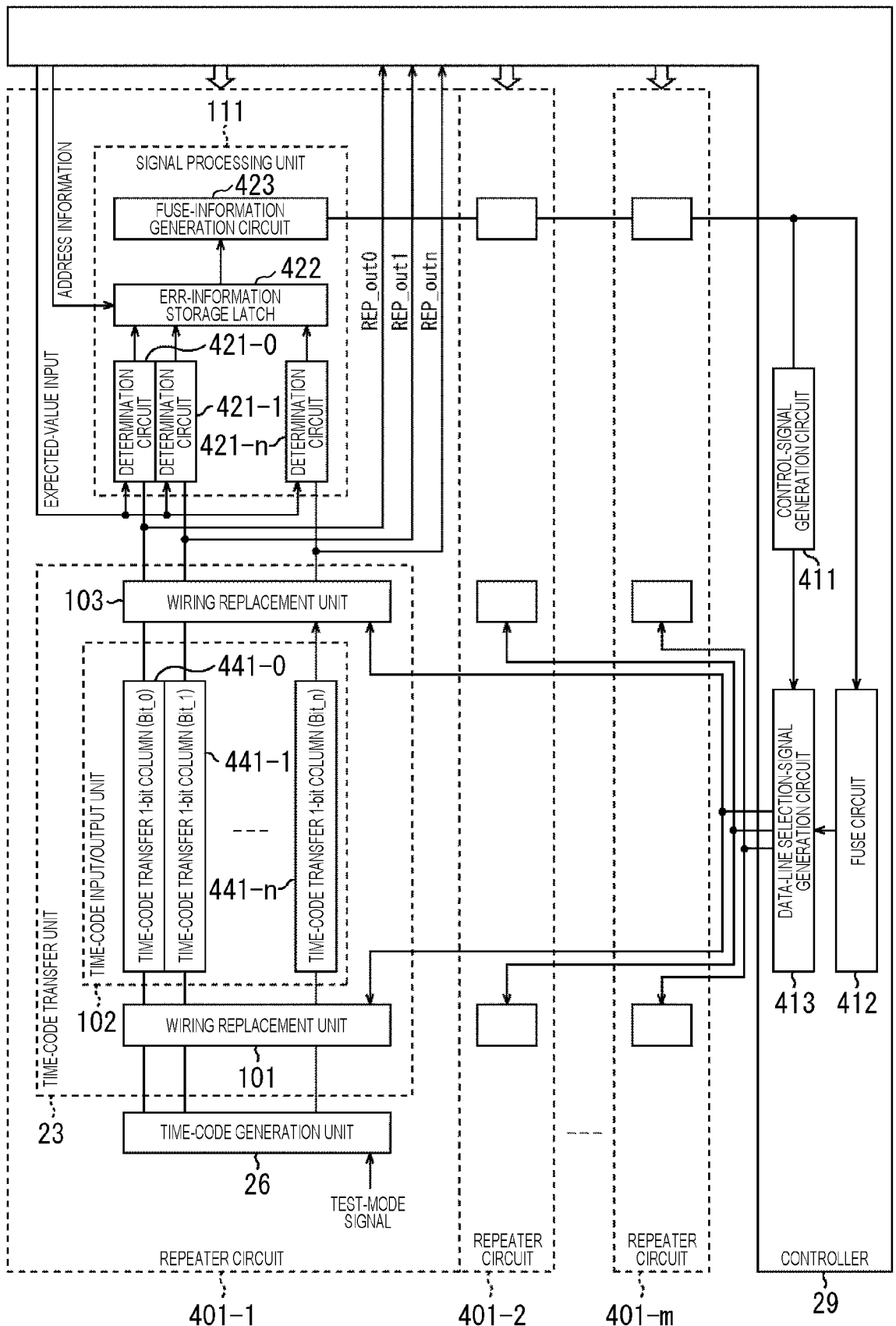
FIG. 12 is an explanatory diagram of a first exemplary detailed configuration for controlling the time-code transfer unit of the present disclosure.

Note that, in FIG. 22, configurations having the same functions as those of FIG. 12 are denoted with the same reference signs, and thus the descriptions thereof will be appropriately omitted.

That is the detailed configuration for controlling the time-code transfer units 23 in FIG. 22 is different from that of FIG. 12 in that a randomizer 511 is provided on the path through which the transfer result REP_out0 for the least significant bit is transferred and additionally a randomizer control unit 521 that controls the randomizer 511 is provided to the controller 29.

After abnormality is detected in a time-code transfer 1-bit column (Bit_0) 441 and replacement of transfer paths is performed, when a signal from the transfer path from which the abnormality is detected is output to the transfer result REP_out0 for the least significant bit, the randomizer 511 is controlled by the randomizer control unit 521 so as to output 0 or 1 randomly, instead of the signal.

On the basis of the FUSE information stored in the FUSE circuit 412, the randomizer control unit 521 turns on the randomizer 511 to output a random value of 0 or 1 in a case where abnormality is detected in any of the time-code transfer 1-bit columns (Bit_0) 441, and causes output of the transfer result REP_out0 without any change in a case where no abnormality is detected.

<Exemplary Configuration of Randomizer>

Next, an exemplary configuration of the randomizer 511 will be described with reference to FIG. 23.

The randomizer 511 includes FF circuits 541-1 to 541-15, XOR circuits 542 and 543, and a switch 544.

The FF circuits 541-1 to 541-15 each have an output terminal Q connected to an input terminal D of the FF circuit 541 at the post stage thereof. Furthermore, the output terminals of the FF circuits 541-14 and 541-15 are connected to the input terminals of the XOR circuit 542. Moreover, the output terminal of the XOR circuit 542 is connected to the input terminal D of the FF circuit 541-1 and one of the input terminals of the XOR circuit 543.

The other input terminal of the XOR circuit 543 is connected to a terminal 544a of the switch 544. Furthermore, a terminal 544b of the switch 544 is connected to the output terminal of the XOR circuit 543. Moreover, the switch 544 is connected to the terminal from which the transfer result REP_out0 of the time code [0] for the least significant bit is output.

The initial values of the FF circuits 541 are randomly set, so that 0 or 1 is sequentially randomly output from the output terminal of the XOR circuit 542.

With such a configuration, when the switch 544 is connected to the terminal 544a, the randomizer 511 is turned on. Then, the XOR of the transfer result REP_out0 of the time code [0] for the least significant bit and an output result from the output terminal of the XOR circuit 542 is output, so that the randomizer 511 can output 0 or 1 randomly even in a case where the time code [0] is a fixed value.

Furthermore, when the switch 544 is connected to the terminal 544b, the transfer result REP_out0 of the time code [0] for the least significant bit is output without any change.

Moreover, the randomizer control unit 521 controls the switch 544 on (connection to the terminal 544a) or off (connection to the terminal 544b). Thus, the randomizer control unit 521 controls the switch 544 on for connection to the terminal 544a in a case where abnormality is detected in any of the time-code transfer 1-bit columns (Bit_0) 441, and controls the switch 544 off for connection to the terminal 544b in a case where no abnormality is detected in any of the time-code transfer 1-bit columns (Bit_0) 441.

Figure 23:
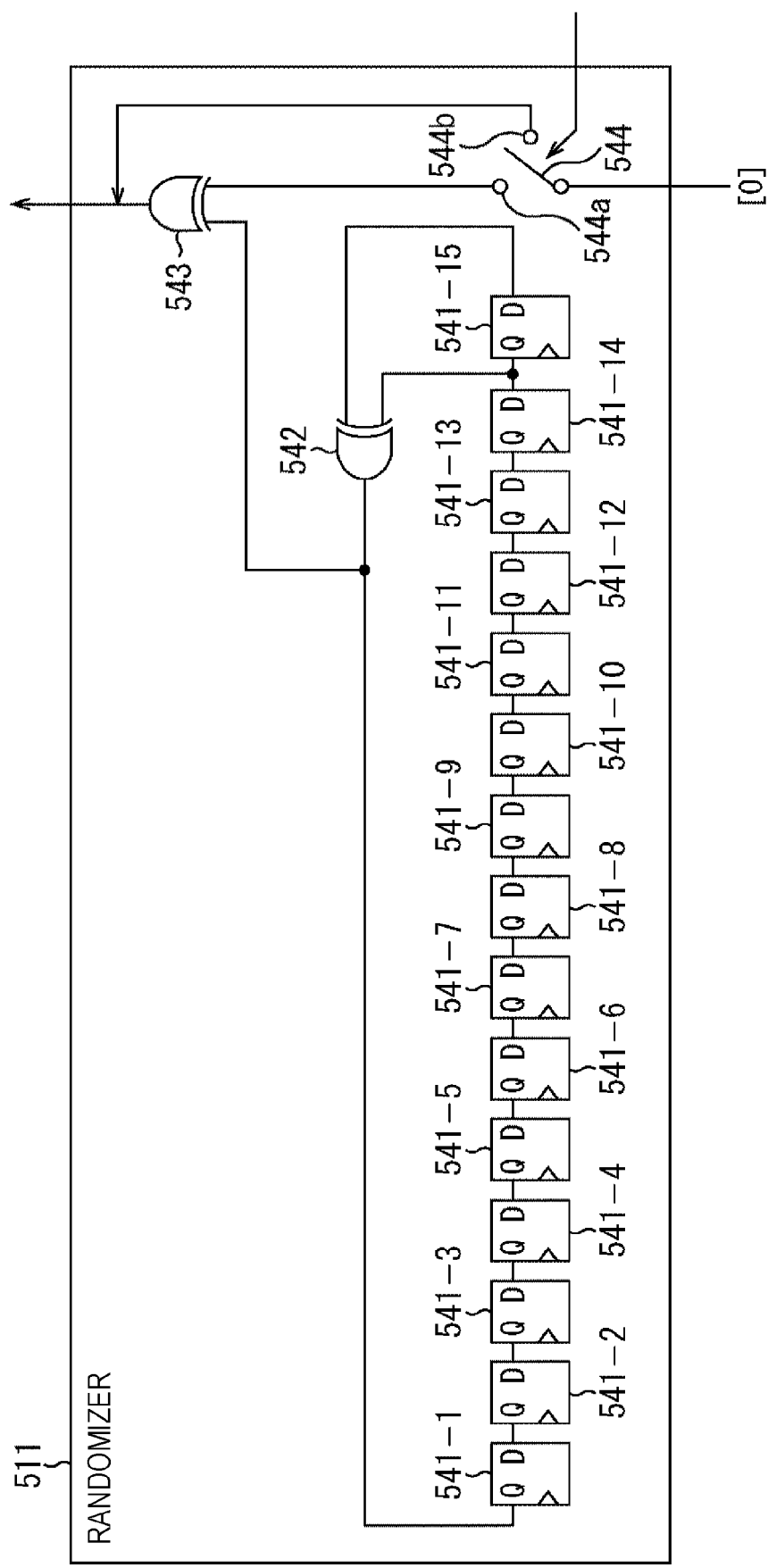
FIG. 23 is an explanatory diagram of an exemplary configuration of a randomizer of FIG. 22.

Note that, although the number of FF circuits 541 included in the randomizer 511 is 15 in FIG. 23, due to determination based on the primitive polynomial of a linear-feedback shift register, FF circuits the number of which is not 15 and computation thereof may be provided.

<Least-Significant-Bit Output Control Processing>

Figure 24:
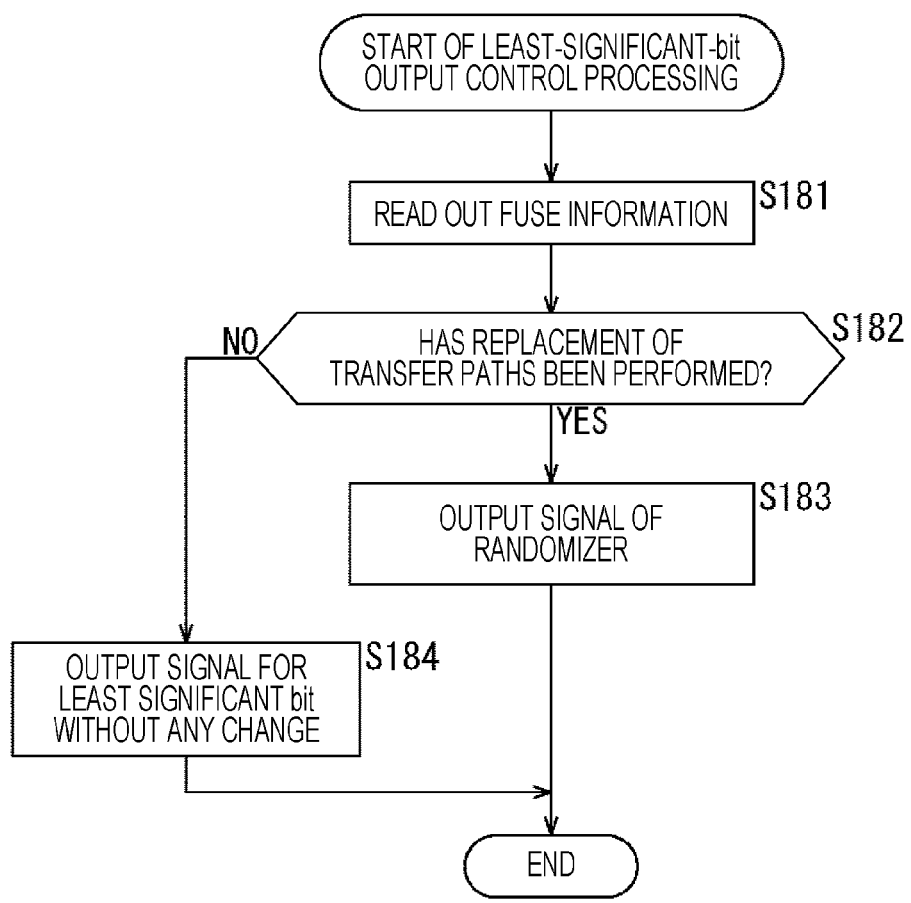
FIG. 24 is an explanatory flowchart of least-significant-bit output control processing by the randomizer of FIG. 23.

Next, least-significant-bit output control processing by the randomizer control unit 521 will be described with reference to the flowchart of FIG. 24.

In step S181, the randomizer control unit 521 reads out the FUSE information stored in the FUSE circuit 412.

In step S182, on the basis of the FUSE information, the randomizer control unit 521 determines whether or not abnormality is detected in any of the time-code transfer 1-bit columns (Bit_0) 441 and the transfer path and latch thereof have been replaced with the transfer path and latch for the least significant bit.

In step S182, in a case where it is determined that replacement has been performed, the processing proceeds to step S183.

In step S183, the randomizer control unit 521 controls the switch 544 such that the switch 544 is connected to the terminal 544a.

Through this processing, 0 or 1 is randomly output from the randomizer 511, so that the transfer result REP_out0 of the time code [0] for the least significant bit is replaced with 0 or 1 randomly.

Meanwhile, in step S182, in a case where it is determined that no replacement has been performed, the processing proceeds to step S184.

In step S184, the randomizer control unit 521 controls the switch 544 such that the switch 544 is connected to the terminal 544b.

Through this processing, the transfer result REP_out0 of the time code [0] for the least significant bit is output without any change from the randomizer 511.

According to the above processing, in a case where replacement of transfer paths has been performed, 0 or 1 is output randomly, instead of the transfer result REP_out0 of the time code [0] for the least significant bit. Thus, occurrence of an error from the pixel having a fixed value can be prevented from being noticeable on an image. Furthermore, in a case where no replacement of transfer paths has been performed, the transfer result REP_out0 of the time code [0] for the least significant bit is output without any change.

Note that the example in which, with a single wiring replacement unit 101 and a single wiring replacement unit 103 provided, abnormality in a 1-bit transfer path is detected and replacement is performed, has been given above. In a case where a plurality of wiring replacement units 101 in tandem and a plurality of wiring replacement units 103 in tandem are provided, a number of randomizers 511 enabling replacement are only required to be provided one-to-one to the outputs of lower-order bits.

That is, in a case where, with (k+1) number of wiring replacement units 101 in tandem and (k+1) number of wiring replacement units 103 in tandem provided, replacement can be performed to transfer paths for a bit length of (k+1), the randomizer 511 is only required to be provided to each of the transfer results REP_out0 to REP_outk for the least significant bit to the k-th bit.

Note that the present configuration can be applied not only to area ADCs and column ADCs but also to general solid-state image pickup devices that transfer signals. Furthermore, the present configuration can be applied not only to solid-state image pickup devices but also to general electronic circuits that transfer signals having A/D converted digital values.

<16. Exemplary Application to Electronic Device>

The solid-state image pickup device 1 described above can be applied to various types of electronic devices, such as an image pickup device, such as a digital still camera or a digital video camera, a mobile phone having an image pickup function, and other devices each having an image pickup function.

Figure 25:
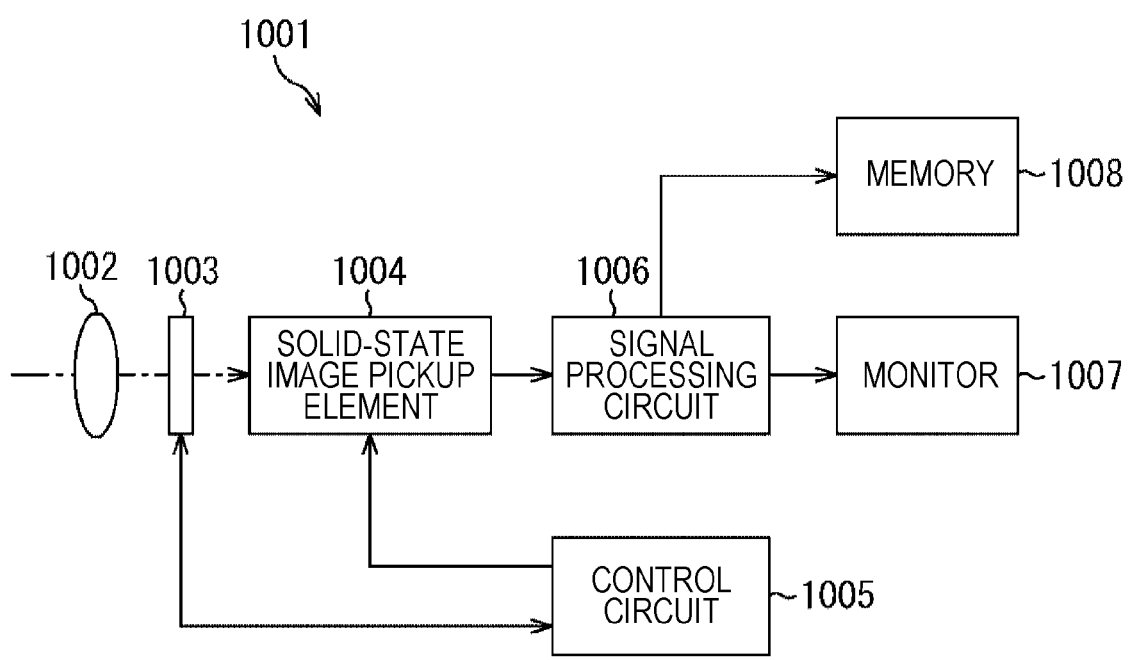
FIG. 25 is a block diagram of an exemplary configuration of an image pickup device as an electronic device to which the solid-state image pickup device of the present disclosure is applied.

FIG. 25 is a block diagram of an exemplary configuration of an image pickup device as an electronic device to which the present technology is applied.

An image pickup device 1001 illustrated in FIG. 25 includes an optical system 1002, a shutter device 1003, a solid-state image pickup element 1004, a drive circuit 1005, a signal processing circuit 1006, a monitor 1007, and a memory 1008, and is capable of capturing a still image or a moving image.

The optical system 1002 includes one lens or a plurality of lenses, and leads light (incident light) from a subject, to the solid-state image pickup element 1004 such that an image is formed on the light-receiving face of the solid-state image pickup element 1004.

The shutter device 1003 is disposed between the optical system 1002 and the solid-state image pickup element 1004, and controls, in accordance with the control of the drive circuit 1005, the light-irradiation period and light-blocking period to the solid-state image pickup element 1004.

The solid-state image pickup element 1004 includes a package including the solid-state image pickup element described above. The solid-state image pickup element 1004 accumulates signal electric charge for a certain period, in response to light formed as an image on the light-receiving face through the optical system 1002 and the shutter device 1003. The signal electric charge accumulated in the solid-state image pickup element 1004 is transferred in accordance with a drive signal (timing signal) supplied from the drive circuit 1005.

The drive circuit 1005 outputs respective drive signals of controlling the transfer operation of the solid-state image pickup element 1004 and the shutter operation of the shutter device 1003, to drive the solid-state image pickup element 1004 and the shutter device 1003.

The signal processing circuit 1006 performs various types of signal processing to the signal electric charge output from the solid-state image pickup element 1004. An image (image data) acquired by the signal processing performed by the signal processing circuit 1006 is supplied to the monitor 1007 for display or is supplied to the memory 1008 for storage (record).

Application of the solid-state image pickup device 1 to the image pickup device 1001 provided as above, instead of the optical system 1002, the shutter device 1003, and the solid-state image pickup element 1004 described above, enables inhibition of a deterioration in yield due to densification.

<17. Exemplary Usage of Solid-State Image Pickup Device>

Figure 26:
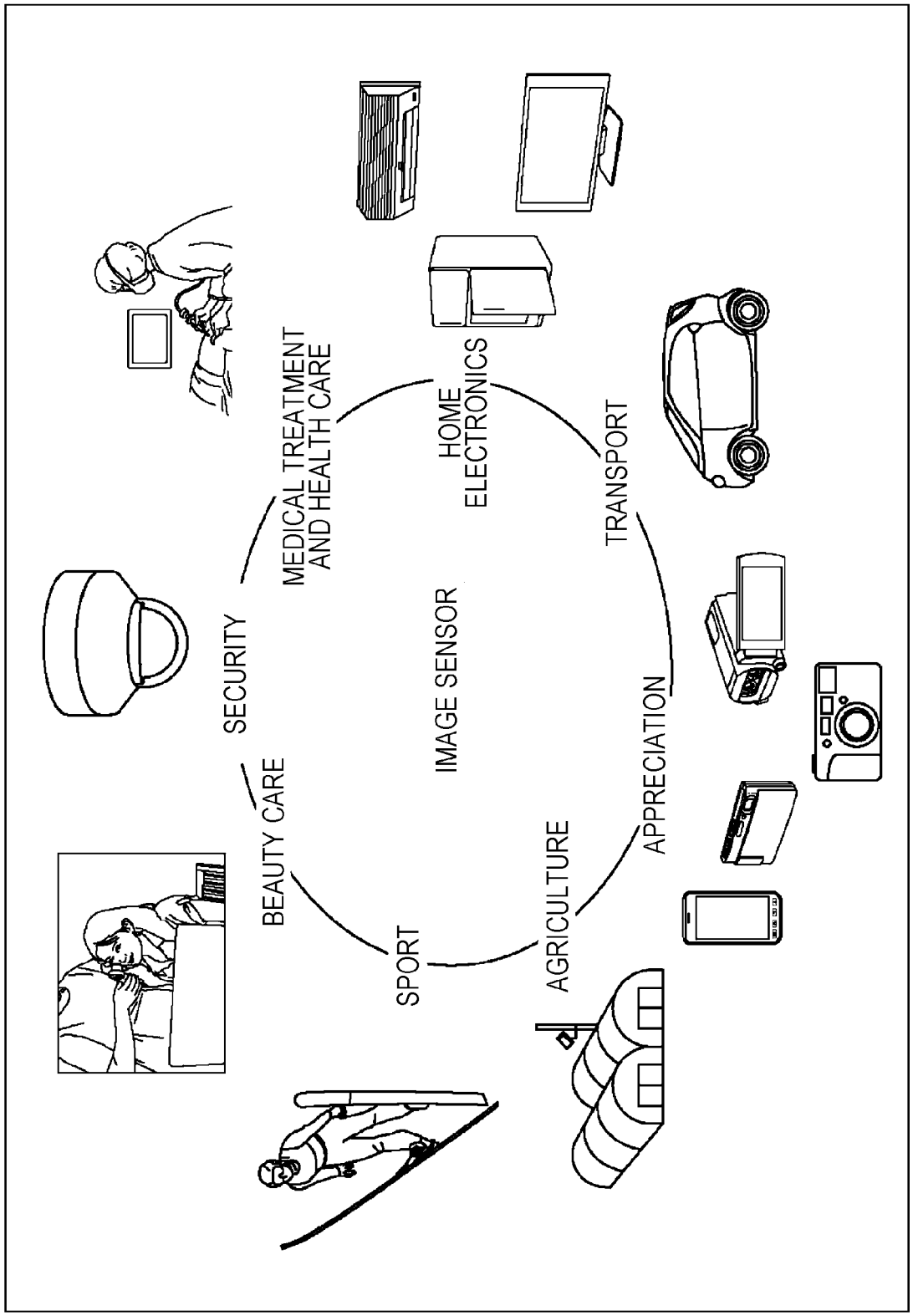
FIG. 26 is an explanatory diagram of exemplary usage of the solid-state image pickup device to which the technology of the present disclosure is applied.

FIG. 26 is a diagram of exemplary usage of the solid-state image pickup device 1 described above.

The camera module described above can be, for example, used in various cases where light, such as visible light, infrared light, ultraviolet light, and X rays, is sensed, as below.

- Devices that shoot images for use in appreciation, such as a digital camera and a mobile device having a camera function.
- Devices for use in transport, such as an in-vehicle sensor that shoots, for example, the front, rear, periphery, or inside of the automobile for driving safety, such as automatic stop, or for recognition of the state of the driver, a surveillance camera that monitors traveling vehicles and roads, and a ranging sensor that measures, for example, the distance between vehicles.
- Devices for use in home electronics, such as a TV, a refrigerator, and an air conditioner, the devices each shooting a gesture of a user such that a device operation is performed in accordance with the gesture.
- Devices for use in medical treatment and health care, such as an endoscope and a device that shoots a blood vessel with reception of infrared light.
- Devices for use in security, such as a surveillance camera for crime prevention and a camera for person authentication.
- Devices for use in beauty care, such as a skin measuring instrument that shoots skin and a microscope that shoots a scalp.
- Devices for use in sport, such as an action camera and a wearable camera for sport and the like.
- Devices for use in agriculture, such as a camera for monitoring the state of a field or crops.

<18. Exemplary Application to Endoscopic Surgery System>

The technology according to the present disclosure (present technology) can be applied to various products. For example, the technology according to the present disclosure may be applied to an endoscopic surgery system.

Figure 27:
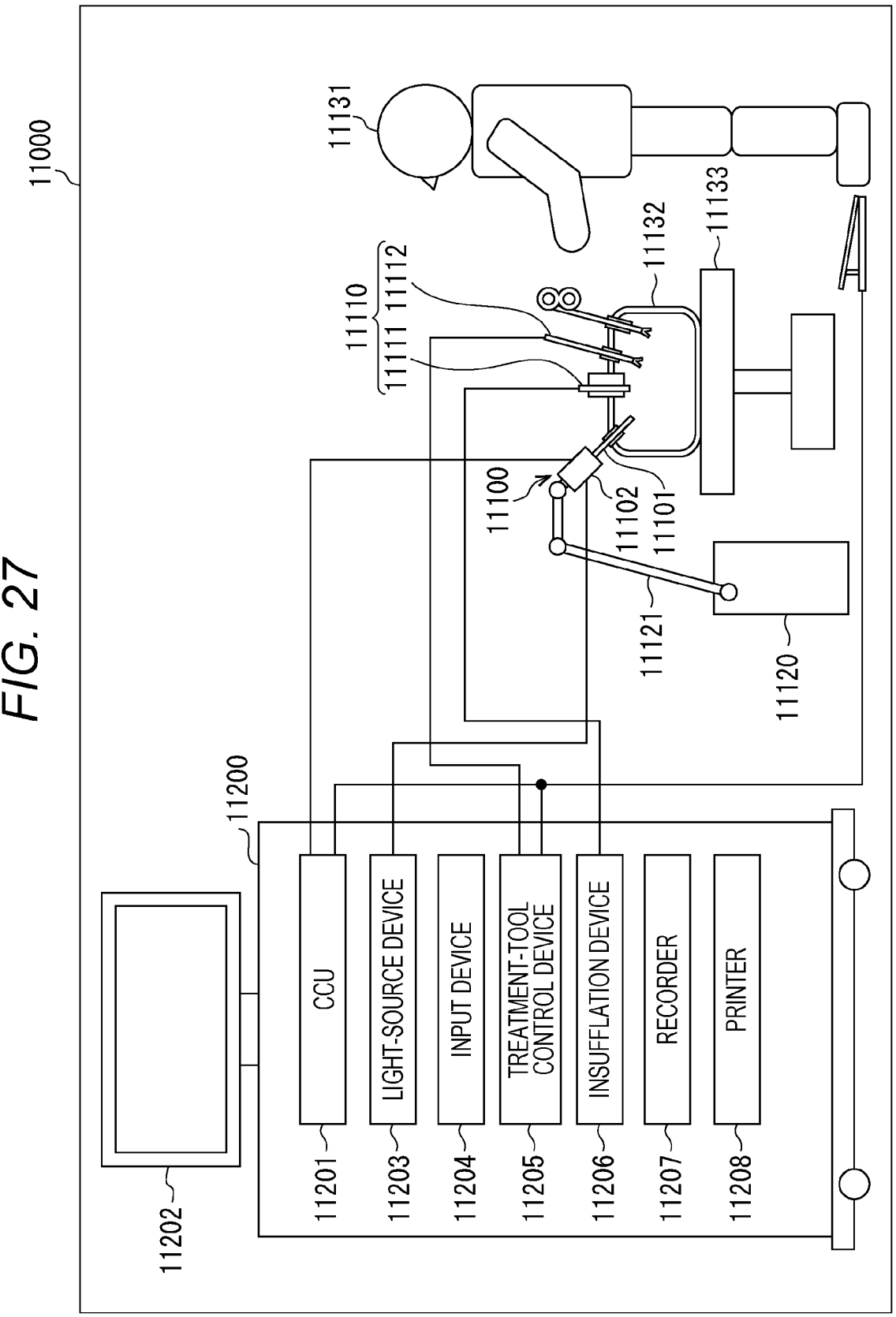
FIG. 27 is a diagram of an exemplary schematic configuration of an endoscopic surgery system.

FIG. 27 is a diagram of an exemplary configuration of an endoscopic surgery system to which the technology according to the present disclosure (present technology) can be applied.

FIG. 27 illustrates that a surgical operator (surgeon) 11131 is performing surgery to a patient 11132 on a patient bed 11133 with an endoscopic surgery system 11000. As illustrated, the endoscopic surgery system 11000 includes an endoscope 11100, other surgical tools 11110, such as an insufflation tube 11111 and an energy treatment tool 11112, a support arm device 11120 that supports the endoscope 11100, and a cart 11200 on which various types of devices for endoscopic surgery are mounted.

The endoscope 11100 includes an endoscopic barrel 11101 of which a predetermined length of region from its distal end is inserted into a body cavity of the patient 11132 and a camera head 11102 connected to the proximal end of the endoscopic barrel 11101. In the illustrated example, the endoscope 11100 of which the endoscopic barrel 11101 is hard is provided as a so-called rigid endoscope. The endoscope 11100 may be provided as a so-called flexible endoscope having a flexible endoscopic barrel.

The distal end of the endoscopic barrel 11101 is provided with an opening to which an objective lens is fit. A light-source device 11203 is connected to the endoscope 11100. Light generated by the light-source device 11203 is guided to the distal end of the endoscopic barrel by a light guide extending inside the endoscopic barrel 11101, so that an observation target in the body cavity of the patient 11132 is irradiated with the light through the objective lens. Note that the endoscope 11100 may be a forward-viewing endoscope, an oblique-viewing endoscope, or a side-viewing endoscope.

The camera head 11102 is provided inside with an optical system and an image pickup element. Reflected light (observation light) from the observation target is condensed on the image pickup element by the optical system. The observation light is photoelectrically converted by the image pickup element, so that an electric signal corresponding to the observation light, namely, an image signal corresponding to an observation image is generated. The image signal is transmitted as RAW data to a camera control unit (CCU) 11201.

The CCU 11201 includes, for example, a central processing unit (CPU) or a graphics processing unit (GPU), and controls the operation of the endoscope 11100 and the operation of a display device 11202 in a centralized manner. Moreover, the CCU 11201 receives the image signal from the camera head 11102, and performs various types of image processing for display of an image based on the image signal, such as development processing (demosaic processing), to the image signal.

Under the control of the CCU 11201, the display device 11202 displays the image based on the image signal subjected to the image processing by the CCU 11201.

The light-source device 11203 includes a light source, such as a light emitting diode (LED), and supplies the endoscope 11100 with irradiation light at the time of shooting of an operative part or the like.

An input device 11204 is an input interface to the endoscopic surgery system 11000. A user can input various types of information or an instruction to the endoscopic surgery system 11000 through the input device 11204. For example, the user inputs an instruction for change of the image pickup conditions of the endoscope 11100 (e.g., the type of irradiation light, magnification, and focal length).

A treatment-tool control device 11205 controls the drive of the energy treatment tool 11112 for cauterization and incision of tissue, occlusion of blood vessels, or the like. For the purpose of securement of the field of view through the endoscope 11100 and securement of the surgical space of the surgical operator, an insufflation device 11206 insufflates gas into the body cavity through the insufflation tube 11111 such that the body cavity of the patient 11132 expands. A recorder 11207 is a device capable of recording various types of information regarding surgery. A printer 11208 is a device capable of printing various types of information regarding surgery in various types of formats, such as a text format, an image format, and a graph format.

Note that the light-source device 11203 that supplies the endoscope 11100 with irradiation light at the time of shooting of the operative part, can include a white-light source including an LED, a laser light source, or a combination thereof. In a case where a white-light source is provided by a combination of R, G, and B laser light sources, the output intensity and output timing of each color (each wavelength) can be controlled with high accuracy. Thus, the white balance of a captured image can be adjusted by the light-source device 11203. Furthermore, in this case, the observation target is irradiated with laser light from each of the R, G, and B laser light sources on the time-division basis, and the drive of the image pickup element in the camera head 11102 is controlled in synchronization with the irradiation timing. Thus, an image corresponding to each of the R, G, and B can be captured on the time-division basis. According to the method, a color image can be acquired even with the image pickup element having no color filter.

Furthermore, the light-source device 11203 may control the drive of the light source such that the intensity of output light is changed every predetermined period of time. The drive of the image pickup element in the camera head 11102 is controlled in synchronization with the timing of change of the intensity of light, and images are acquired on the time-division basis. Then, the images are combined, so that an image having a high dynamic range without so-called black defects and halation can be generated.

Furthermore, the light-source device 11203 may be capable of supplying light in a predetermined wavelength band corresponding to special illumination imaging. In special illumination imaging, for example, so-called narrow band imaging is performed, in which predetermined tissues, such as blood vessels in the superficial layer of a mucous membrane, are shot with high contrast by irradiation of light narrower in band than irradiation light (namely, white light) at the time of normal imaging, with the dependence of light absorption in body tissue on wavelength. Alternatively, in special illumination imaging, fluorescence imaging may be performed, in which an image is acquired on the basis of fluorescence generated by irradiation of excitation light. In fluorescence imaging, for example, body tissue is irradiated with excitation light so that fluorescence from the body tissue can be observed (auto fluorescence imaging) or body tissue is locally injected with a reagent such as indocyanine green (ICG) and additionally the body tissue is irradiated with excitation light corresponding to the fluorescent wavelength of the reagent, so that a fluorescent image can be acquired. The light-source device 11203 can be provided so as to supply light narrow in band and/or excitation light corresponding to such special illumination imaging as above.

Figure 28:
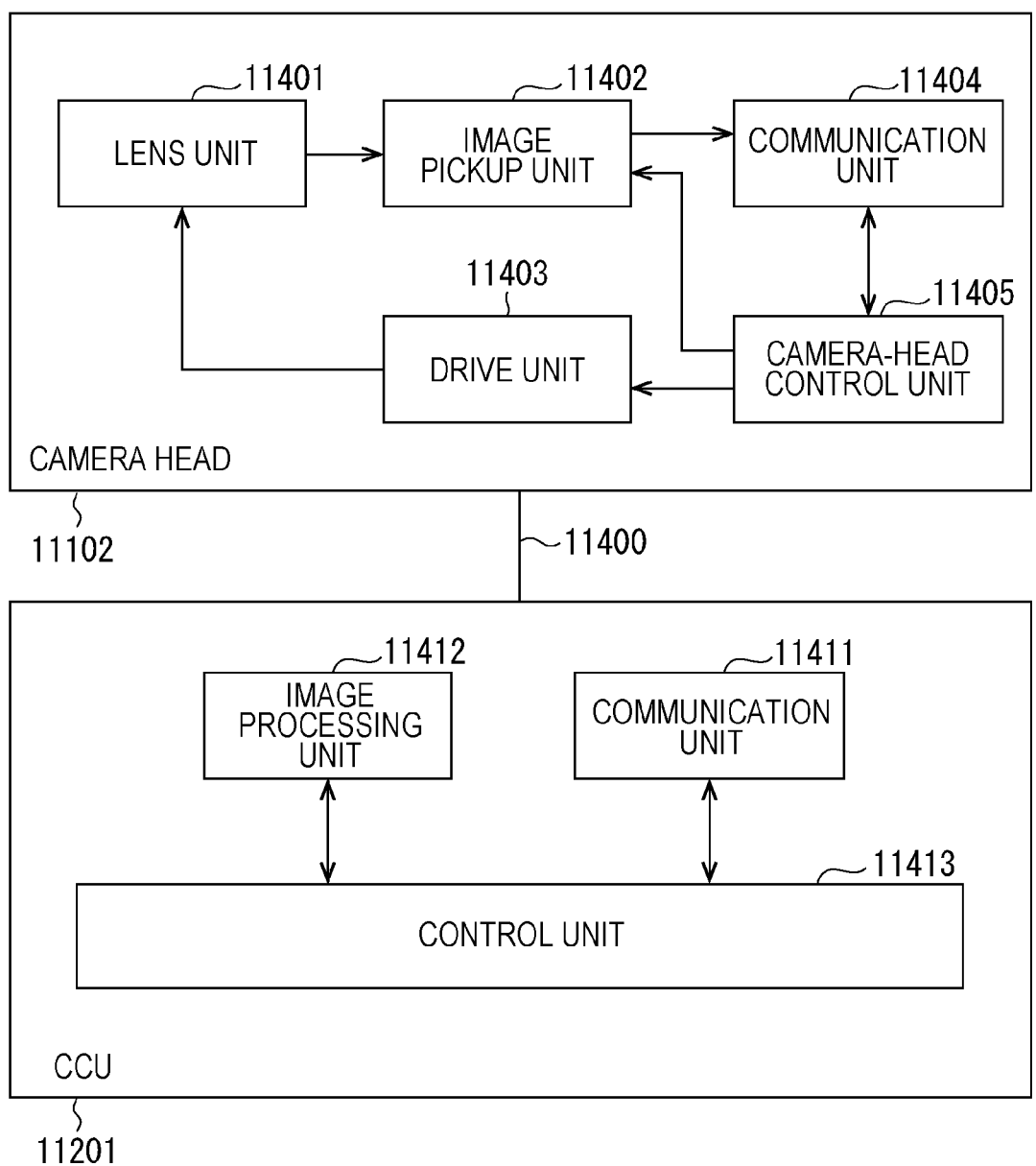
FIG. 28 is a block diagram of exemplary functional configurations of a camera head and a CCU.

FIG. 28 is a block diagram of exemplary functional configurations of the camera head 11102 and the CCU 11201 illustrated in FIG. 27.

The camera head 11102 includes a lens unit 11401, an image pickup unit 11402, a drive unit 11403, a communication unit 11404, and a camera-head control unit 11405. The CCU 11201 includes a communication unit 11411, an image processing unit 11412, and a control unit 11413. The camera head 11102 and the CCU 11201 are connected mutually communicably through a transmission cable 11400.

The lens unit 11401 is an optical system provided at the connection with the endoscopic barrel 11101. Observation light taken in from the distal end of the endoscopic barrel 11101 is guided to the camera head 11102 and then enters the lens unit 11401. The lens unit 11401 includes a plurality of lenses including a zoom lens and a focusing lens, in combination.

The image pickup unit 11402 includes an image pickup element. The number of image pickup elements included in the image pickup unit 11402 may be one (so-called single element) or at least two (so-called multiple elements). In a case where the image pickup unit 11402 includes multiple image pickup elements, for example, the image pickup elements may each generate an image signal corresponding to R, G, or B, and a color image may be acquired by combination thereof. Alternatively, the image pickup unit 11402 may include a pair of image pickup elements for acquisition of an image signal for right eye and an image signal for left eye corresponding to three-dimensional (3D) display. The 3D display enables the surgical operator 11131 to grasp the depth of living tissue in the operative part, more accurately. Note that, in a case where the image pickup unit 11402 includes multiple image pickup elements, a plurality of lens units 11401 corresponding one-to-one to the image pickup elements can be provided.

Furthermore, the image pickup unit 11402 is not necessarily provided in the camera head 11102. For example, the image pickup unit 11402 may be provided just behind the objective lens inside the endoscopic barrel 11101.

The drive unit 11403 includes an actuator, and moves the zoom lens and the focusing lens in the lens unit 11401 by predetermined distances along the optical axis, in response to control from the camera-head control unit 11405. This arrangement enables appropriate adjustment of the magnification and focal point of a captured image by the image pickup unit 11402.

The communication unit 11404 includes a communication device that transmits or receives various types of information to or from the CCU 11201. The communication unit 11404 transmits, as RAW data, an image signal acquired from the image pickup unit 11402, to the CCU 11201 through the transmission cable 11400.

Furthermore, the communication unit 11404 receives, from the CCU 11201, a control signal for controlling the drive of the camera head 11102, and supplies the control signal to the camera-head control unit 11405. The control signal includes information regarding capturing conditions, such as information regarding specifying the frame rate of a captured image, information regarding specifying an exposure value at the time of capturing, and/or information regarding specifying the magnification and focal point of a captured image.

Note that the capturing conditions, such as the frame rate, exposure value, magnification, and focal point, may be appropriately specified by the user or may be automatically set by the control unit 11413 of the CCU 11201 on the basis of the acquired image signal. In the latter case, the endoscope 11100 has so-called auto exposure (AE), auto focus (AF), and auto white balance (AWB) functions.

The camera-head control unit 11405 controls the drive of the camera head 11102, on the basis of the control signal received from the CCU 11201 through the communication unit 11404.

The communication unit 11411 includes a communication device that transmits or receives various types of information to or from the camera head 11102. The communication unit 11411 receives the image signal transmitted from the camera head 11102 through the transmission cable 11400.

Furthermore, the communication unit 11411 transmits a control signal for controlling the drive of the camera head 11102, to the camera head 11102. The image signal or the control signal can be transmitted, for example, by electric communication or optical communication.

The image processing unit 11412 performs various types of image processing to the image signal as RAW data transmitted from the camera head 11102.

The control unit 11413 performs various types of control regarding capture of the operative part or the like with the endoscope 11100 and display of a captured image acquired by the capture of the operative part or the like. For example, the control unit 11413 generates a control signal for controlling the drive of the camera head 11102.

Furthermore, the control unit 11413 causes the display device 11202 to display the captured image showing the operative part or the like, on the basis of the image signal subjected to image processing by the image processing unit 11412. In this case, the control unit 11413 may recognize various types of objects in the captured image, with various types of image recognition technology. For example, the control unit 11413 detects the edge shape, color, or the like of an object including the captured image, so that a surgical tool, such as forceps, a particular living part, bleeding, mist at the time of use of the energy treatment tool 11112, or the like can be recognized. At the time of display of the captured image on the display device 11202, with a result of such recognition, the control unit 11413 may cause superimposition-display of various types of surgical assistance information onto the image of the operative part. Presentation of surgical assistance information in superimposition-display to the surgical operator 11131 enables reduction of the burden of the surgical operator 11131 and enables the surgical operator 11131 to proceed reliably with the surgery.

The transmission cable 11400 connecting the camera head 11102 and the CCU 11201 is an electric-signal cable corresponding to electric-signal communication, an optical fiber corresponding to optical communication, or a composite cable thereof.

Here, in the illustrated example, wired communication with the transmission cable 11400 is provided. However, the communication between the camera head 11102 and the CCU 11201 may be performed wirelessly.

The endoscopic surgery system to which the technology according to the present disclosure can be applied, has been exemplarily described above. The technology according to the present disclosure can be applied to, for example, the endoscope 11100, the camera head 11102 (image pickup unit 11402 thereof) and the CCU 11201 (image processing unit 11412 thereof)) in the configuration described above. Specifically, for example, the solid-state image pickup device 1 of FIG. 1 can be applied to the image pickup unit 10402. With the image pickup unit 10402 to which the technology according to the present disclosure is applied, for example, execution of failure detection/relief processing before product shipment enables inhibition of a deterioration in yield, for example, due to a disconnection in the wiring of an image pickup element high in density, so that a reduction can be made in product cost. Note that, as the configuration of the image pickup unit above, a so-called mirrorless structure having no shutter mechanism may be provided.

Note that, the endoscopic surgery system has been exemplarily described herein. In addition, the technology according to the present disclosure may be applied to, for example, a microscopic surgery system.

<19. Exemplary Application to Movable Object>

The technology according to the present disclosure (present technology) can be applied to various products. For example, the technology according to the present disclosure may be achieved as a device to be mounted on a movable object in any type of an automobile, an electric vehicle, a hybrid electric vehicle, a motorcycle, a bicycle, a personal transporter, an airplane, a drone, a ship, a robot, and the like.

Figure 29:
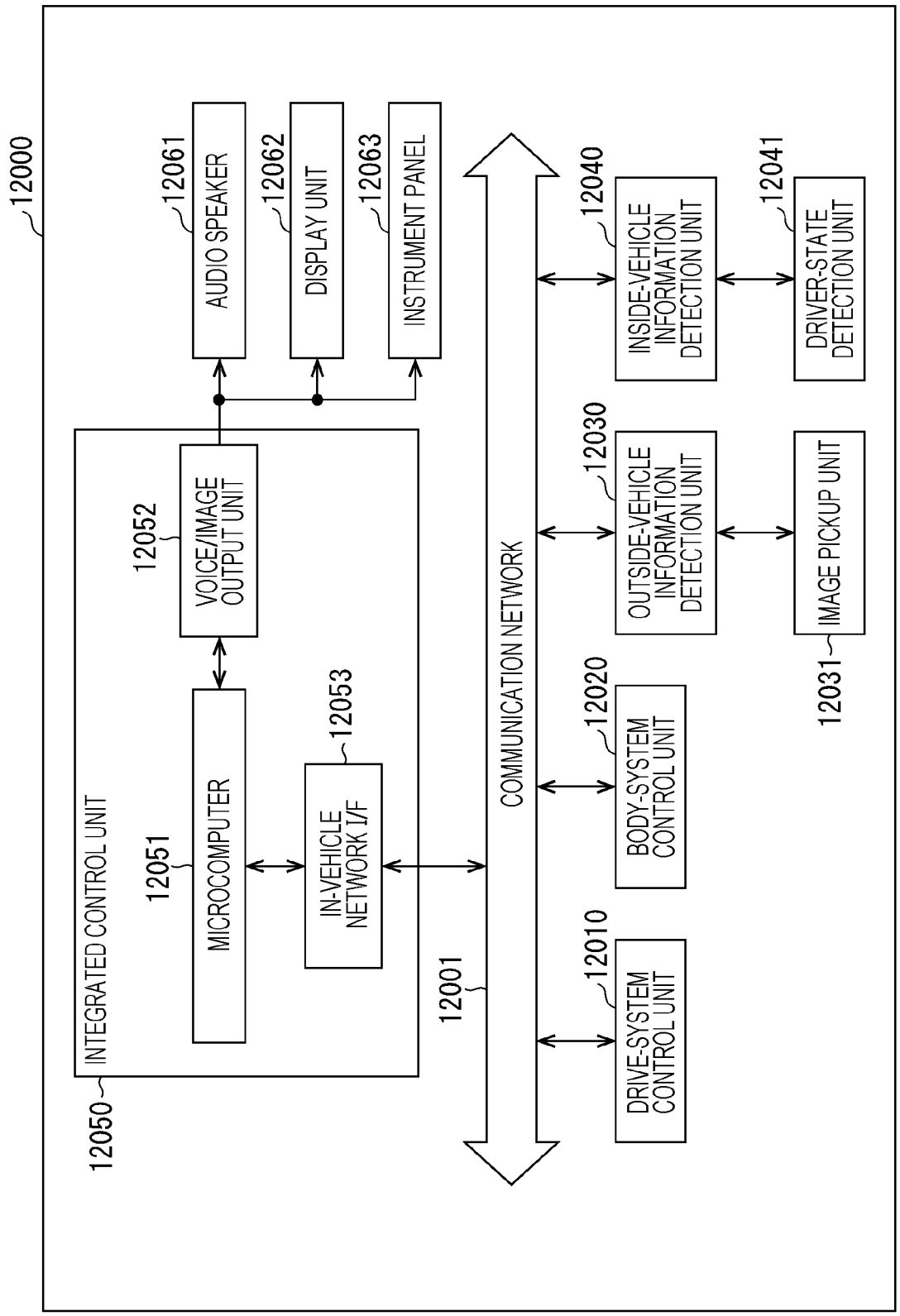
FIG. 29 is a block diagram of an exemplary schematic configuration of a vehicle control system.

FIG. 29 is a block diagram of an exemplary schematic configuration of a vehicle control system that is an exemplary movable-object control system to which the technology according to the present disclosure can be applied.

The vehicle control system 12000 includes a plurality of electronic control units connected through a communication network 12001. In the example illustrated in FIG. 29, the vehicle control system 12000 includes a drive-system control unit 12010, a body-system control unit 12020, an outside-vehicle information detection unit 12030, an inside-vehicle information detection unit 12040, and an integrated control unit 12050.

Furthermore, as the functional configuration of the integrated control unit 12050, a microcomputer 12051, a voice/image output unit 12052, and an in-vehicle network interface (I/F) 12053 are illustrated.

The drive-system control unit 12010 controls the operations of devices related to the drive system of the vehicle, in accordance with various types of programs. For example, the drive-system control unit 12010 functions as a control device for a driving-force generation device that generates the driving force of the vehicle, such as an internal combustion engine or a motor for drive, a driving-force transmission mechanism for transmitting the driving force to the wheels, a steering mechanism for adjusting the rudder angle of the vehicle, a braking device that generates the breaking force of the vehicle, and the like.

The body-system control unit 12020 controls the operations of various types of devices installed on the body, in accordance with various types of programs. For example, the body-system control unit 12020 functions as a control device for a keyless entry system, a smart key system, a power window device, and various types of lamps, such as head lamps, rear lamps, brake lamps, blinkers, and fog lamps. In this case, a radio wave transmitted from a mobile device that is a substitute for the key or signals of various types of switches can be input into the body-system control unit 12020. The body-system control unit 12020 receives the input of the radio wave or each signal and then controls, for example, the door lock device, power window device, or lamps of the vehicle.

The outside-vehicle information detection unit 12030 detects information regarding the outside of the vehicle equipped with the vehicle control system 12000. For example, the outside-vehicle information detection unit 12030 is connected with an image pickup unit 12031. The outside-vehicle information detection unit 12030 causes the image pickup unit 12031 to capture an image outside the vehicle, and additionally receives the captured image. On the basis of the received image, the outside-vehicle information detection unit 12030 may perform object detection processing or distance detection processing to, for example, a person, a car, an obstruction, a sign, or characters on a road surface.

The image pickup unit 12031 is an optical sensor that receives light and outputs an electric signal corresponding to the quantity of the received light. The image pickup unit 12031 is capable of outputting the electric signal as an image or as range information. Furthermore, light that the image pickup unit 12031 receives may be visible light or invisible light, such as infrared rays.

The inside-vehicle information detection unit 12040 detects information regarding the inside of the vehicle. For example, the inside-vehicle information detection unit 12040 is connected with a driver-state detection unit 12041 that detects the state of the driver. The driver-state detection unit 12041 includes, for example, a camera that captures the driver, and the inside-vehicle information detection unit 12040 may calculate the degree of fatigue or the degree of concentration of the driver or may discriminate whether or not the driver is drowsy, on the basis of detection information input from the driver-state detection unit 12041.

On the basis of information regarding the outside of the vehicle or the inside of the vehicle acquired by the outside-vehicle information detection unit 12030 or the inside-vehicle information detection unit 12040, the microcomputer 12051 computes a control target value for the driving-force generation device, the steering mechanism, or the braking device, so that a control command can be output to the drive-system control unit 12010. For example, the microcomputer 12051 is capable of performing cooperative control for achievement of the function of an advanced driver assistance system (ADAS) including, for example, collision avoidance or impact alleviation of the vehicle, follow-up travelling, speed-kept travelling, and collision warning of the vehicle, based on the inter-vehicle distance, and lane-departure warning of the vehicle.

Furthermore, the microcomputer 12051 is capable of performing cooperative control for, for example, automated driving for autonomous travelling without an operation of the driver, in which, for example, the driving-force generation device, the steering mechanism, or the braking device is controlled on the basis of information regarding the periphery of the vehicle acquired by the outside-vehicle information detection unit 12030 or the inside-vehicle information detection unit 12040.

Furthermore, on the basis of information regarding the outside of the vehicle acquired by the outside-vehicle information detection unit 12030, the microcomputer 12051 is capable of outputting a control command to the body-system control unit 12020. For example, the microcomputer 12051 is capable of performing cooperative control for antiglare achievement, in which the head lamps are controlled in accordance with the position of the preceding vehicle or an oncoming vehicle detected by the outside-vehicle information detection unit 12030 such that, for example, switching from high beam to low beam is performed.

The voice/image output unit 12052 transmits an output signal of at least one of a voice or an image, to an output device capable of notifying any occupant in the vehicle or the outside of the vehicle of information visually or aurally. In the example of FIG. 29, as the output device, an audio speaker 12061, a display unit 12062, and an instrument panel 12063 are exemplified. For example, the display unit 12062 may include at least one of an on-board display or a head-up display.

Figure 30:
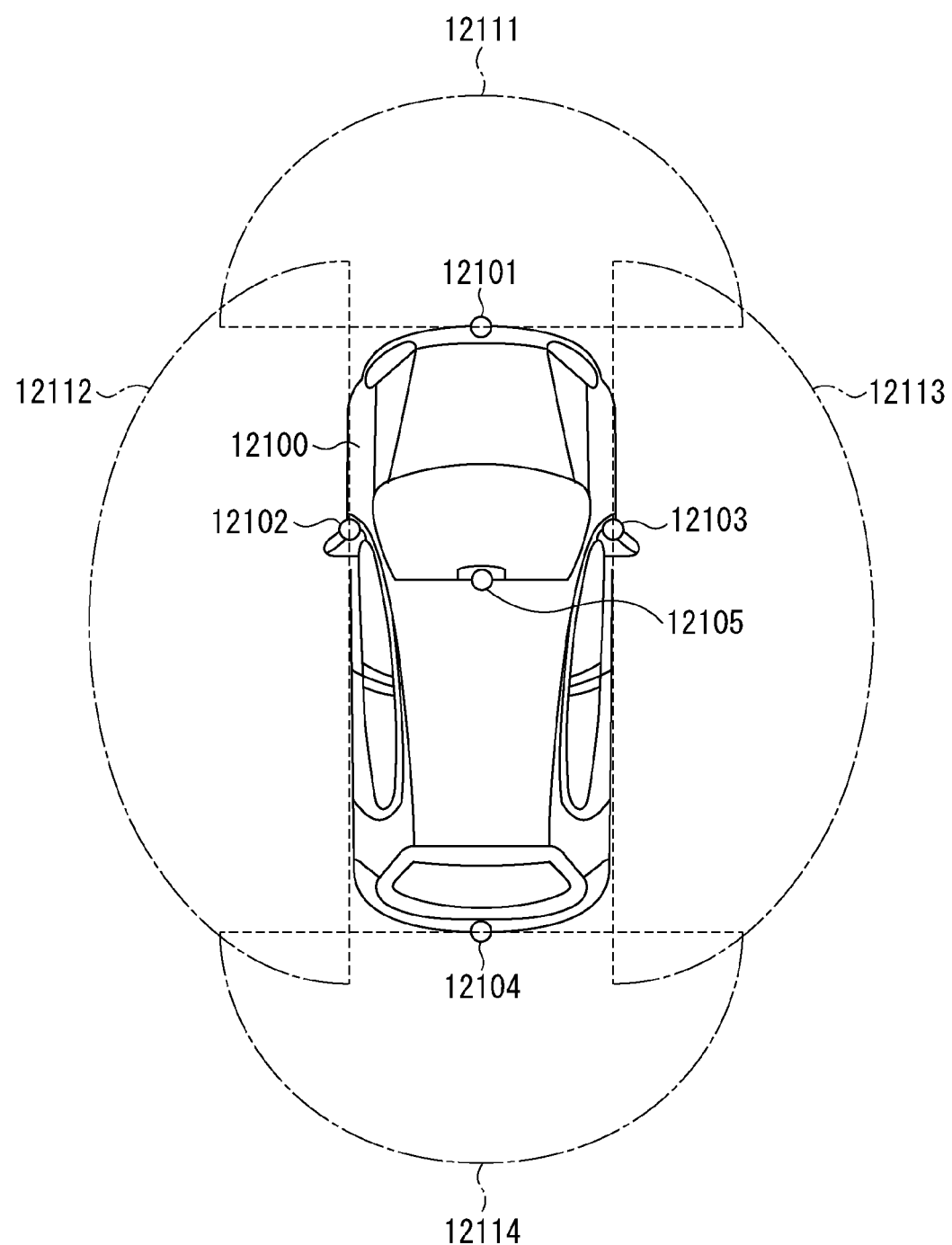
FIG. 30 is an explanatory view of exemplary installed positions of an outside-vehicle information detection unit and an image pickup unit.

FIG. 30 is a view of exemplary installed positions of the image pickup unit 12031.

In FIG. 30, a vehicle 12100 includes image pickup units 12101, 12102, 12103, 12104, and 12105 as the image pickup unit 12031.

The image pickup units 12101, 12102, 12103, 12104, and 12105 are provided in position, for example, at the front nose, sideview mirrors, rear bumper or back door, and upper portion of the windshield in the room of the vehicle 12100. The image pickup unit 12101 provided at the front nose and the image pickup unit 12105 provided at the upper portion of the windshield in the room mainly acquire images ahead of the vehicle 12100. The image pickup units 12102 and 12103 provided at the sideview mirrors mainly acquire images lateral to the vehicle 12100. The image pickup unit 12104 provided at the rear bumper or the back door mainly acquires an image behind the vehicle 12100. The images ahead acquired by the image pickup units 12101 and 12105 are mainly used in detection of, for example, the preceding vehicle, a pedestrian, an obstruction, a traffic light, a traffic sign, or a lane.

Note that FIG. 28 illustrates exemplary shooting ranges of the image pickup units 12101 to 12104. A capturing range 12111 indicates the capturing range of the image pickup unit 12101 provided at the front nose. Capturing ranges 12112 and 12113 indicate, respectively, the capturing ranges of the image pickup units 12102 and 12103 provided at the sideview mirrors. A capturing range 12114 indicates the capturing range of the image pickup unit 12104 provided at the rear bumper or the back door. For example, pieces of image data captured by the image pickup units 12101 to 12104 are overlapped, resulting in acquisition of an overhead image in which the vehicle 12100 is viewed from above.

At least one of the image pickup units 12101 to 12104 may have a function of acquiring distance information. For example, at least one of the image pickup units 12101 to 12104 may be a stereo camera including a plurality of image pickup elements or may be an image pickup element including pixels for detection of phase difference.

For example, on the basis of distance information acquired from the image pickup units 12101 to 12104, the microcomputer 12051 acquires the distance to each three-dimensional object in the capturing ranges 12111 to 12114 and the variation of the distance in time (relative speed to the vehicle 12100), so that, particularly, a three-dimensional object that is closest on the path of travel of the vehicle 12100 and travels at a predetermined speed (e.g., 0 km/h or more) in substantially the same direction as the vehicle 12100 can be extracted as the preceding vehicle. Moreover, the microcomputer 12051 sets the inter-vehicle distance to be previously secured behind the preceding vehicle, so that, for example, automated brake control (including follow-up stop control) or automated acceleration control (including follow-up start control) can be performed. As above, performed can be cooperative control for, for example, automated driving for autonomous traveling without an operation of the driver.

For example, on the basis of distance information acquired by the image pickup units 12101 to 12104, the microcomputer 12051 classifies three-dimensional data regarding three-dimensional objects, into two-wheeled vehicles, ordinary vehicles, large-size vehicles, pedestrians, utility poles, and other three-dimensional objects. Then, the microcomputer 12051 extracts the classified three-dimensional data for automatic avoidance of obstructions. For example, the microcomputer 12051 separates obstructions on the periphery of the vehicle 12100 into obstructions that the driver of the vehicle 12100 can visually identify or obstructions difficult for the driver of the vehicle 12100 to visually identify. Then, the microcomputer 12051 determines collision risk indicating the degree of risk of collision with each obstruction. In a situation in which collision is likely to occur with the collision risk at a set value or more, the microcomputer 12051 outputs an alert to the driver through the audio speaker 12061 or the display unit 12062 or performs forced deceleration or avoidant steering through the drive-system control unit 12010, so that driving assistance for collision avoidance can be performed.

At least one of the image pickup units 12101 to 12104 may be an infrared camera that detects infrared rays. For example, the microcomputer 12051 determines whether or not any pedestrian is present in respective captured images of the image pickup units 12101 to 12104, so that a pedestrian can be recognized. The recognition of a pedestrian is performed through a step in which feature points are extracted from respective captured images of the image pickup units 12101 to 12104, for example, as infrared cameras and a step in which pattern matching processing is performed to a series of feature points indicating the outline of an object, to discriminate whether or not the object is a pedestrian. After the microcomputer 12051 determines that a pedestrian is present in any of the respective captured images of the image pickup units 12101 to 12104 and recognizes the pedestrian, the voice/image output unit 12052 controls the display unit 12062 such that a quadrate contour is superimposition-displayed on the recognized pedestrian for emphasis. Furthermore, the voice/image output unit 12052 may control the display unit 12062 such that, for example, an icon indicating a pedestrian is displayed at a desired position.

The exemplary vehicle control system to which the technology according to the present disclosure can be applied has been described above. The technology according to the present disclosure can be applied to, for example, the image pickup unit 12031 in the configuration described above. For example, with the image pickup unit 12031 to which the technology according to the present disclosure is applied, for example, execution of failure detection/relief processing before product shipment enables inhibition of a deterioration in yield, for example, due to a disconnection in the wiring of an image pickup element high in density, so that a reduction can be made in product cost. Note that, as the configuration of the image pickup unit above, a so-called mirrorless structure having no shutter mechanism may be provided.

Note that the present disclosure can have the following configurations.

<1> A solid-state electronic circuit including:

a plurality of transfer paths allowing bitwise transfer of a predetermined bit length of digital code after a signal is converted into a digital signal;

a determination unit configured to determine presence or absence of abnormality in each of the transfer paths; and a replacement unit configured to replace the plurality of transfer paths for use in transfer of the predetermined bit length of digital code, on the basis of a determination result of the determination unit.

<2> An image pickup element including:

a plurality of transfer paths allowing bitwise transfer of a predetermined bit length of time code for use in conversion of a pixel signal corresponding to a quantity of light received in a pixel into a digital signal;

a determination unit configured to determine presence or absence of abnormality in each of the transfer paths; and a replacement unit configured to replace the plurality of transfer paths for use in transfer of the predetermined bit length of time code, on the basis of a determination result of the determination unit.

<3> The image pickup element according to <2>, in which the determination unit compares an expected value to a transfer result of transfer of predetermined data through the transfer paths and the transfer result of the predetermined data transferred through the transfer paths, to determine presence or absence of abnormality in each of the transfer paths.

<4> The image pickup element according to <3>, in which the plurality of transfer paths each includes a storage unit that stores the time code for the corresponding bit.

<5> The image pickup element according to <4>, in which in the transfer of the predetermined data through the transfer paths, the predetermined data is written in the storage units corresponding one-to-one to the transfer paths and additionally is transferred, and the determination unit compares a transfer result of the predetermined data transferred through the transfer paths and the expected value, to determine presence or absence of abnormality in each of the transfer paths.

<6> The image pickup element according to <5>, in which in a case where the expected value is a predetermined value, the determination unit compares the expected value and each of a transfer result of the predetermined data set to 1 and a transfer result of the predetermined data set to 0, to determine presence or absence of abnormality in each of the transfer paths.

<7> The image pickup element according to <5>, in which on the basis of the determination result, the replacement unit replaces a transfer path determined to have the abnormality with a transfer path of a time code for a bit low in priority in the predetermined bit length of time code among the plurality of transfer paths.

<8> The image pickup element according to <7>, in which on the basis of the determination result, the replacement unit replaces the transfer path for a bit determined to have the abnormality with a transfer path of a time code for a least significant bit as the transfer path of the time code for the bit low in priority in the predetermined bit length of time code among the plurality of transfer paths.

<9> The image pickup element according to <7>, in which the replacement unit is provided between the transfer paths adjacent, and the replacement unit performs replacement such that a time code input to one of the transfer paths is output through the one of the transfer paths and a time code input to another of the transfer paths is output through the another of the transfer paths or such that the time code input to the one of the transfer paths is output through the another of the transfer paths and the time code input to the another of the transfer paths is output through the one of the transfer paths.

<10> The image pickup element according to <9>, in which the replacement unit includes:

a pre-stage replacement unit that replaces, on the basis of the determination result, the transfer path determined to have the abnormality with the transfer path of the time code for the bit low in priority in the predetermined bit length of time code among the plurality of transfer paths, at respective pre-stages of the transfer paths; and a post-stage replacement unit that replaces the transfer path determined to have the abnormality with the transfer path of the time code for the bit low in priority in the predetermined bit length of time code among the plurality of transfer paths, replaced by the pre-stage replacement unit, at respective post-stages of the transfer paths such that the transfer paths return to respective original transfer paths.

<11> The image pickup element according to <10>, in which the pre-stage replacement unit and the post-stage replacement unit in each of a plurality of the replacement units provided one-to-one between the transfer paths are symmetric across the corresponding transfer paths.

<12> The image pickup element according to <10>, in which the replacement unit is multistage in a transfer direction of the transfer paths, on the basis of the determination result, a replacement unit including the pre-stage replacement unit at a front stage and the post-stage replacement unit at a last stage replaces a transfer path for a bit highest in priority among a plurality of transfer paths each determined to have the abnormality, with a transfer path of a time code for a bit lowest in priority in the predetermined bit length of time code among the plurality of transfer paths, and a replacement unit including the pre-stage replacement unit at a next stage to the pre-stage replacement unit at the front stage and the post-stage replacement unit at a preceding stage to the post-stage replacement unit at the last stage replaces a transfer path for a bit high in priority next to the bit highest in priority among the plurality of transfer paths each determined to have the abnormality, with a transfer path of a time code for a bit high in priority next to the bit lowest in priority in the predetermined bit length of time code among the plurality of transfer paths.

<13> The image pickup element according to any of <7> to <12>, further including:

a randomizer configured to generate 0 or 1 randomly, in which a time code output by the randomizer is output as a time code output through the transfer path of the time code for the bit low in priority in the predetermined bit length of time code.

<14> The image pickup element according to <13>, in which when the replacement unit replaces, on the basis of the determination result, the transfer path determined to have the abnormality with the transfer path of the time code for the bit low in priority in the predetermined bit length of time code among the plurality of transfer paths, the time code output by the randomizer is output as the time code output through the transfer path of the time code for the bit low in priority in the predetermined bit length of time code.

<15> The image pickup element according to <4>, in which in the transfer of the predetermined data through the transfer paths, after the predetermined data is written in the storage units corresponding one-to-one to the transfer paths, the predetermined data is read out and additionally is transferred, and the determination unit compares the expected value and a transfer result of the predetermined data read out and transferred through the transfer paths after the predetermined data is written in the storage units, to determine presence or absence of abnormality in each of the storage units corresponding one-to-one to the transfer paths.

<16> The image pickup element according to <15>, in which in a case where the expected value is a predetermined value, the determination unit compares the expected value and each of a transfer result of the predetermined data set to 1 and a transfer result of the predetermined data set to 0, to determine presence or absence of abnormality in each of the storage units corresponding one-to-one to the transfer paths.

<17> The image pickup element according to <15>, in which on the basis of the determination result, the replacement unit replaces a transfer path corresponding to a storage unit determined to have the abnormality with a transfer path corresponding to a storage unit of a time code for a bit low in priority in the predetermined bit length of time code among the plurality of transfer paths.

<18> The image pickup element according to <4>, in which the determination unit compares the expected value and a transfer result of the predetermined data transferred through the transfer paths to determine presence or absence of abnormality in each of the transfer paths, and then compares the expected value and a transfer result of the predetermined data read out and transferred through the transfer paths after the predetermined data is written in the storage units, to determine presence or absence of abnormality in each of storage units corresponding one-to-one to the transfer paths, and on the basis of the determination result, the replacement unit replaces a transfer path determined to have the abnormality and a storage unit corresponding to the transfer path, respectively, with a transfer path allowing transfer of a time code for a bit low in priority in the predetermined bit length of time code among the plurality of transfer paths and a storage unit corresponding to the transfer path.

<19> A method of controlling an image pickup device including a plurality of transfer paths allowing bitwise transfer of a predetermined bit length of time code for use in conversion of a pixel signal corresponding to a quantity of light received in a pixel into a digital signal, the method including:

determining presence or absence of abnormality in each of the transfer paths; and replacing the plurality of transfer paths for use in transfer of the predetermined bit length of time code, on the basis of a determination result.

<20> An electronic device including:

a plurality of transfer paths allowing bitwise transfer of a predetermined bit length of time code for use in conversion of a pixel signal corresponding to a quantity of light received in a pixel into a digital signal;

a determination unit configured to determine presence or absence of abnormality in each of the transfer paths; and a replacement unit configured to replace the plurality of transfer paths for use in transfer of the predetermined bit length of time code, on the basis of a determination result of the determination unit.

REFERENCE SIGNS LIST

1 Solid-state image pickup device
21 Pixel
22 Pixel array unit
23 Time-code transfer unit
26 Time-code generation unit
28 Output unit
29 Controller
41 Pixel circuit
42 ADC
51 Comparison circuit
52 Data storage unit
61 Comparator
62 Voltage conversion circuit
63 Positive feedback circuit
71 Input/output control circuit
72 Signal storage unit
101, 103 Wiring replacement unit
401, 401-1 to 401-$m$ Repeater circuit
411 Control-signal generation circuit
412 FUSE circuit
413 Data-line selection-signal generation circuit
421, 421-0 to 421-$n$ Determination circuit
422 ERR-information storage latch
423 FUSE-information generation circuit
441, 441-0 to 441-$n$ Time-code transfer 1-bit columns (Bit_0) to (Bit_n)
471-1 to 471-$n$, 481-1 to 481-$n$ Replacement circuit
511 Randomizer
521 Randomizer control unit

The invention claimed is:

1. An image pickup element comprising:
a plurality of transfer paths allowing bitwise transfer of a predetermined bit length of time code for use in conversion of a pixel signal corresponding to a quantity of light received in a pixel into a digital signal;
a determination unit configured to directly determine presence or absence of abnormality in each of the transfer paths; and
a replacement unit configured to replace the plurality of transfer paths for use in transfer of the predetermined bit length of time code, on a basis of a determination result of the determination unit,
wherein
the determination unit compares an expected value to a transfer result of transfer of predetermined data through the transfer paths and the transfer result of the predetermined data transferred through the transfer paths, to determine presence or absence of abnormality in each of the transfer paths,
the plurality of transfer paths each includes a storage unit that stores the time code for the corresponding bit,
in the transfer of the predetermined data through the transfer paths, the predetermined data is written in the storage units corresponding one-to-one to the transfer paths and additionally is transferred, and
the determination unit compares the transfer result of the predetermined data transferred through the transfer paths and the expected value, to determine presence or absence of abnormality in each of the transfer paths,
on the basis of the determination result, the replacement unit replaces a transfer path determined to have the abnormality with a transfer path of a time code for a bit low in priority in the predetermined bit length of time code among the plurality of transfer paths,
the replacement unit is provided between the transfer paths adjacent, and
the replacement unit performs replacement such that a time code input to one of the transfer paths is output through the one of the transfer paths and a time code input to another of the transfer paths is output through the another of the transfer paths or such that the time code input to the one of the transfer paths is output through the another of the transfer paths and the time code input to the another of the transfer paths is output through the one of the transfer paths, and the replacement unit includes:

a pre-stage replacement unit that replaces, on the basis of the determination result, the transfer path determined to have the abnormality with the transfer path of the time code for the bit low in priority in the predetermined bit length of time code among the plurality of transfer paths, at respective pre-stages of the transfer paths; and a post-stage replacement unit that replaces the transfer path determined to have the abnormality with the transfer path of the time code for the bit low in priority in the predetermined bit length of time code among the plurality of transfer paths, replaced by the pre-stage replacement unit, at respective post-stages of the transfer paths such that the transfer paths return to respective original transfer paths.

2. The image pickup element according to claim 1, wherein in a case where the expected value is a predetermined value, the determination unit compares the expected value and each of a transfer result of the predetermined data set to 1 and a transfer result of the predetermined data set to 0, to determine presence or absence of abnormality in each of the transfer paths.

3. The image pickup element according to claim 1, wherein on the basis of the determination result, the replacement unit replaces the transfer path for a bit determined to have the abnormality with a transfer path of a time code for a least significant bit as the transfer path of the time code for the bit low in priority in the predetermined bit length of time code among the plurality of transfer paths.

4. The image pickup element according to claim 1, wherein the pre-stage replacement unit and the post-stage replacement unit in each of a plurality of the replacement units provided one-to-one between the transfer paths are symmetric across the corresponding transfer paths.

5. The image pickup element according to claim 1, wherein the replacement unit is multistage in a transfer direction of the transfer paths, on the basis of the determination result, a replacement unit including the pre-stage replacement unit at a front stage and the post-stage replacement unit at a last stage replaces a transfer path for a bit highest in priority among a plurality of transfer paths each determined to have the abnormality, with a transfer path of a time code for a bit lowest in priority in the predetermined bit length of time code among the plurality of transfer paths, and a replacement unit including the pre-stage replacement unit at a next stage to the pre-stage replacement unit at the front stage and the post-stage replacement unit at a preceding stage to the post-stage replacement unit at the last stage replaces a transfer path for a bit high in priority next to the bit highest in priority among the plurality of transfer paths each determined to have the abnormality, with a transfer path of a time code for a bit high in priority next to the bit lowest in priority in the predetermined bit length of time code among the plurality of transfer paths.

6. An image pickup element comprising:

a plurality of transfer paths allowing bitwise transfer of a predetermined bit length of time code for use in conversion of a pixel signal corresponding to a quantity of light received in a pixel into a digital signal;

a determination unit configured to directly determine presence or absence of abnormality in each of the transfer paths; and a replacement unit configured to replace the plurality of transfer paths for use in transfer of the predetermined bit length of time code, on a basis of a determination result of the determination unit, wherein the determination unit compares an expected value to a transfer result of transfer of predetermined data through the transfer paths and the transfer result of the predetermined data transferred through the transfer paths, to determine presence or absence of abnormality in each of the transfer paths, the plurality of transfer paths each includes a storage unit that stores the time code for the corresponding bit, in the transfer of the predetermined data through the transfer paths, the predetermined data is written in the storage units corresponding one-to-one to the transfer paths and additionally is transferred, and the determination unit compares the transfer result of the predetermined data transferred through the transfer paths and the expected value, to determine presence or absence of abnormality in each of the transfer paths, on the basis of the determination result, the replacement unit replaces a transfer path determined to have the abnormality with a transfer path of a time code for a bit low in priority in the predetermined bit length of time code among the plurality of transfer paths; and a randomizer configured to generate 0 or 1 randomly, wherein a time code output by the randomizer is output as a time code output through the transfer path of the time code for the bit low in priority in the predetermined bit length of time code.

7. The image pickup element according to claim 6, wherein when the replacement unit replaces, on the basis of the determination result, the transfer path determined to have the abnormality with the transfer path of the time code for the bit low in priority in the predetermined bit length of time code among the plurality of transfer paths, the time code output by the randomizer is output as the time code output through the transfer path of the time code for the bit low in priority in the predetermined bit length of time code.

8. An image pickup element comprising:

a plurality of transfer paths allowing bitwise transfer of a predetermined bit length of time code for use in conversion of a pixel signal corresponding to a quantity of light received in a pixel into a digital signal;

a determination unit configured to directly determine presence or absence of abnormality in each of the transfer paths; and a replacement unit configured to replace the plurality of transfer paths for use in transfer of the predetermined bit length of time code, on a basis of a determination result of the determination unit, wherein
the determination unit compares an expected value to a transfer result of transfer of predetermined data through the transfer paths and the transfer result of the predetermined data transferred through the transfer paths, to determine presence or absence of abnormality in each of the transfer paths,
the plurality of transfer paths each includes a storage unit that stores the time code for the corresponding bit, and
in the transfer of the predetermined data through the transfer paths, after the predetermined data is written in the storage units corresponding one-to-one to the transfer paths, the predetermined data is read out and additionally is transferred, and the determination unit compares the expected value and a transfer result of the predetermined data read out and transferred through the transfer paths after the predetermined data is written in the storage units, to determine presence or absence of abnormality in each of the storage units corresponding one-to-one to the transfer paths.

9. The image pickup element according to claim 8, wherein
in a case where the expected value is a predetermined value, the determination unit compares the expected value and each of a transfer result of the predetermined data set to 1 and a transfer result of the predetermined data set to 0, to determine presence or absence of abnormality in each of the storage units corresponding one-to-one to the transfer paths.

10. The image pickup element according to claim 8, wherein
on the basis of the determination result, the replacement unit replaces a transfer path corresponding to a storage unit determined to have the abnormality with a transfer path corresponding to a storage unit of a time code for a bit low in priority in the predetermined bit length of time code among the plurality of transfer paths.

11. An image pickup element comprising:
a plurality of transfer paths allowing bitwise transfer of a predetermined bit length of time code for use in conversion of a pixel signal corresponding to a quantity of light received in a pixel into a digital signal;
a determination unit configured to directly determine presence or absence of abnormality in each of the transfer paths; and
a replacement unit configured to replace the plurality of transfer paths for use in transfer of the predetermined bit length of time code, on a basis of a determination result of the determination unit,
wherein
the determination unit compares an expected value to a transfer result of transfer of predetermined data through the transfer paths and the transfer result of the predetermined data transferred through the transfer paths, to determine presence or absence of abnormality in each of the transfer paths,
the plurality of transfer paths each includes a storage unit that stores the time code for the corresponding bit, and
the determination unit compares the expected value and a transfer result of the predetermined data transferred through the transfer paths to determine presence or absence of abnormality in each of the transfer paths, and then compares the expected value and a transfer result of the predetermined data read out and transferred through the transfer paths after the predetermined data is written in the storage units, to determine presence or absence of abnormality in each of storage units corresponding one-to-one to the transfer paths, and
on the basis of the determination result, the replacement unit replaces a transfer path determined to have the abnormality and a storage unit corresponding to the transfer path, respectively, with a transfer path allowing transfer of a time code for a bit low in priority in the predetermined bit length of time code among the plurality of transfer paths and a storage unit corresponding to the transfer path.

\* \* \* \* \*